United States Patent [19]
Ueno

[11] 4,211,083
[45] Jul. 8, 1980

[54] METHOD FOR DRIVING A VEHICLE DRIVEN BY AN INTERNAL COMBUSTION ENGINE

[76] Inventor: Takahiro Ueno, 5-11, 4-Bancho, Wakayama City, Japan

[21] Appl. No.: 658,601

[22] Filed: Feb. 17, 1976

Related U.S. Application Data

[63] Continuation-in-part of Ser. No. 369,119, Jun. 11, 1973, which is a continuation-in-part of Ser. No. 182,613, Sep. 22, 1971, which is a continuation-in-part of Ser. No. 873,881, Nov. 4, 1969.

[51] Int. Cl.² ........................ F01B 29/04; F02N 9/04
[52] U.S. Cl. ...................................... 60/626; 60/628; 60/629; 60/712
[58] Field of Search .......................... 60/625–631, 60/712

[56] References Cited

U.S. PATENT DOCUMENTS

| | | | |
|---|---|---|---|
| 948,248 | 2/1910 | Reaugh | 60/527 |
| 1,013,528 | 1/1912 | Broderick | 60/712 |
| 1,169,672 | 1/1916 | Palm | 60/629 |
| 2,591,892 | 4/1952 | Townshend | 60/630 X |
| 3,783,610 | 1/1974 | Gano | 60/628 |

Primary Examiner—Allen M. Ostrager
Attorney, Agent, or Firm—Armstrong, Nikaido, Marmelstein & Kubovcik

[57] ABSTRACT

A method for driving a vehicle driven by an internal combustion engine having a plurality of compression chambers divided into a first set and a second set, each of said sets being able to be separately operated and to be convertible in operation so as to take an compression action.

9 Claims, 90 Drawing Figures

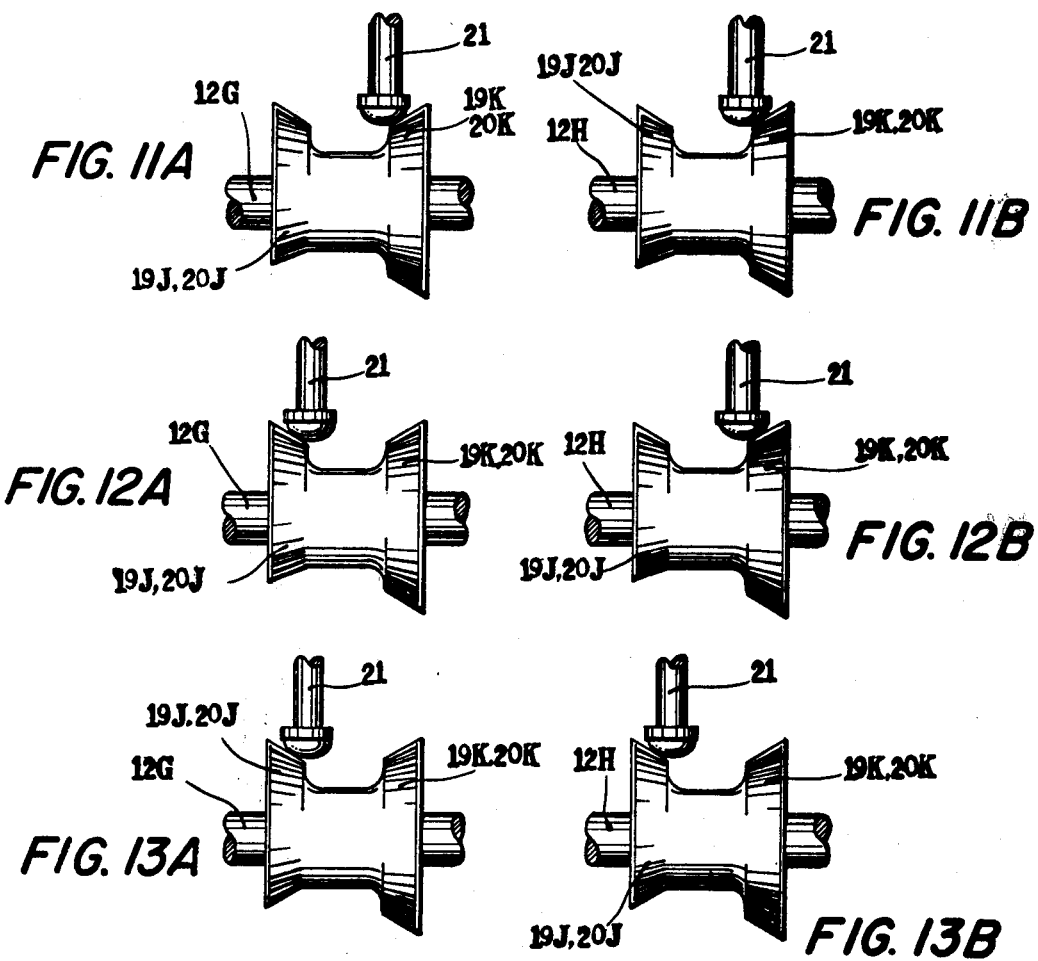

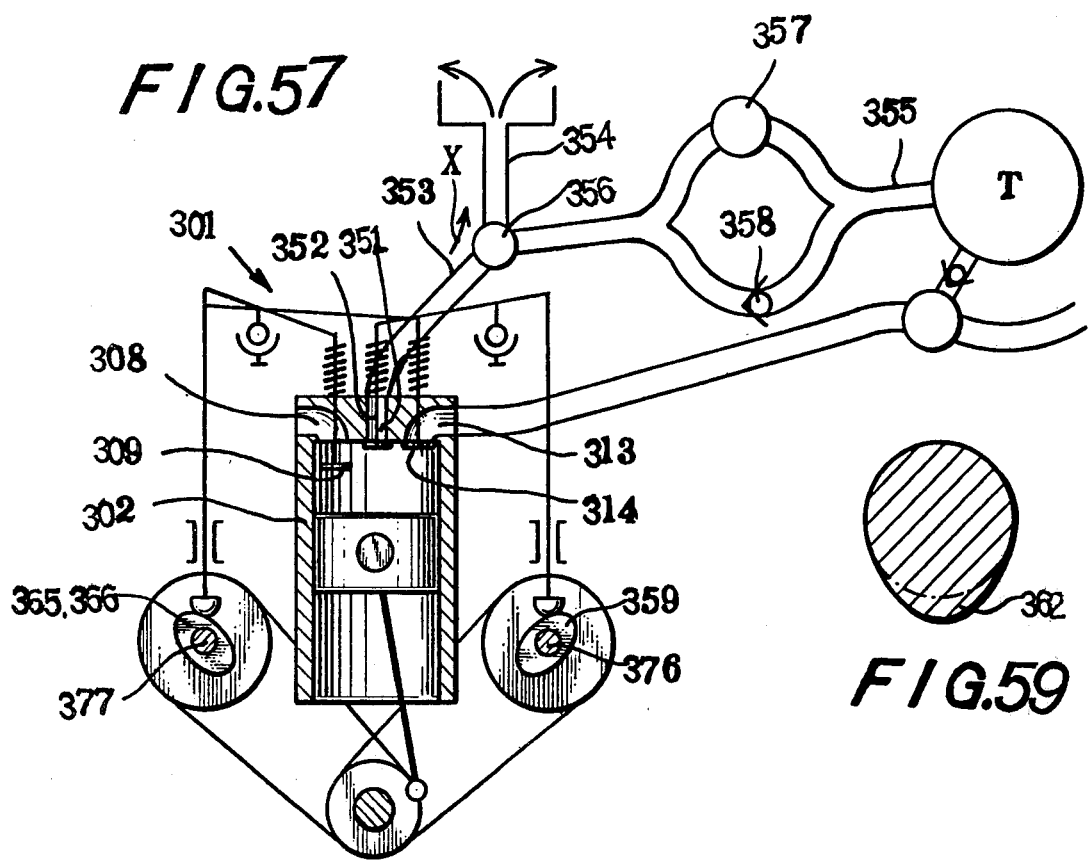
FIG.57
FIG.59
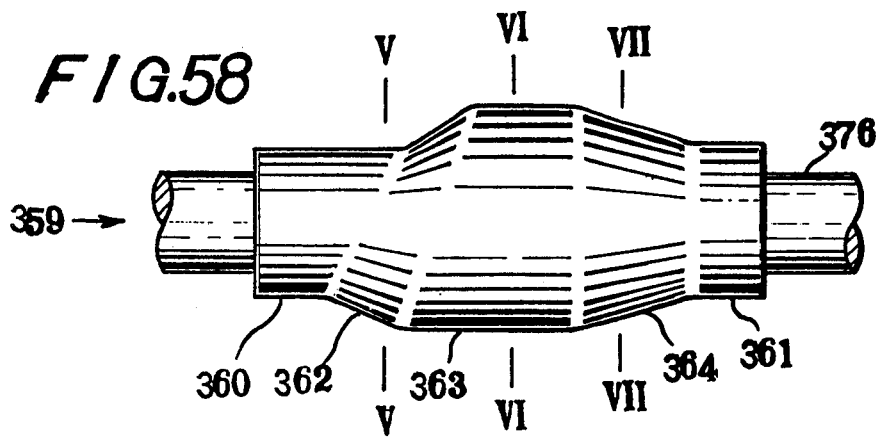
FIG.58
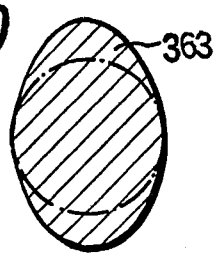
FIG.60
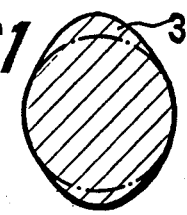
FIG.61

FIG.75
FIG.76
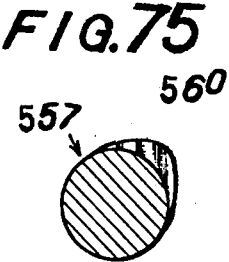
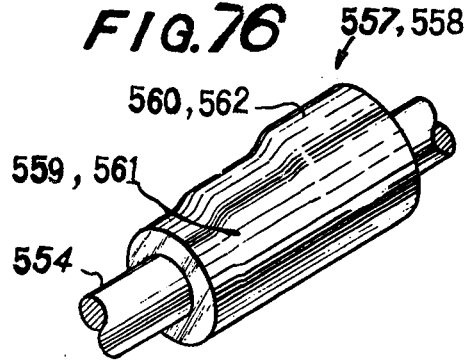
FIG.77
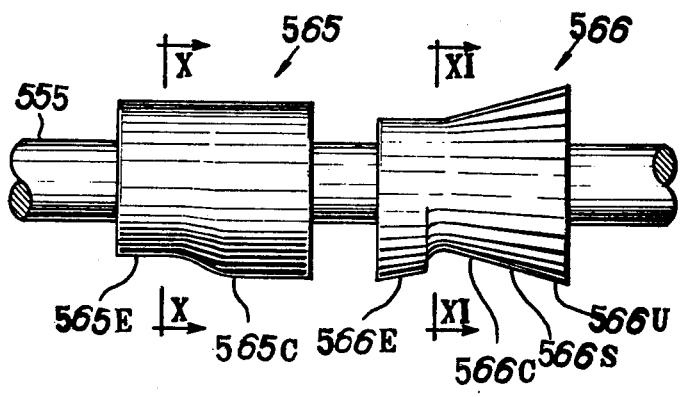
FIG.78    FIG.79
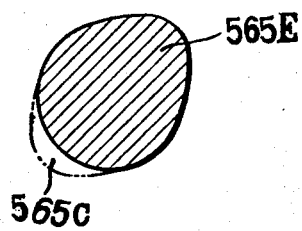
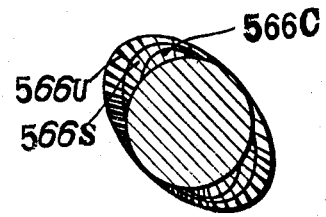

METHOD FOR DRIVING A VEHICLE DRIVEN BY AN INTERNAL COMBUSTION ENGINE

RELATED APPLICATION

This application is a continuation-in-part of Ser. No. 369,119, filed June 11, 1973, which was a continuation-in-part of Ser. No. 182,613, filed Sept. 22, 1971, which was a continuation-in-part of Ser. No. 873,881, filed Nov. 4, 1969.

The present invention relates to a vehicle provided thereon with an engine adapted to serve as an air-compressor.

Further, the present invention is applicable to engines of every kind, for example, gasoline engines, or Diesel engines, and 4-cycle engines or 2-cycle engines or rotary engines thereof which are to be installed in vehicles, vessels, aircrafts and the like. For the purpose of simplicity, the description of the present invention will be exclusively of the engine installed in vehicles.

With such engines, a mixture of gasoline and air is compressed in the compression chambers or some fuel is sprayed into the compressed air, to be exploded to generate heat energy, which is in turn converted into mechanical energy. It can be said, therefore, that concerning any engine, a process for compression is included and if fuel is cut off and air only is supplied during operation, the air is compressed in the compression chambers and then expanded to be expelled outside through the exhaust ports, so long as the engine and the vehicle in which the said engine is installed possess kinetic energy.

Therefore, as for kinetic energy which acts on an engine, there may be the one which the engine itself owns and the one which the vehicle in which the said engine is installed owns.

In order to control the kinetic energy, conventionally a mechanical brake unit, for example, is used for absorbing kinetic energy.

If, upon stopping the engine or reducing the speed thereof . . . when the kinetic energy generated will be consumed in vain . . . , fuelling is stopped and air only, including however lubricating oil, is supplied and the valve timing of the exhaust ports is changed, the kinetic energy of the engine itself is directed to compress the air inhaled in the compression chambers and consequently absorbed by the air as compression energy. By achieving the action mentioned above artificially, the kinetic energy of the vehicle and the engine is carried off and the speed of the said vehicle will be controlled.

Further, if the above action to feed no fuel but air only is taken place in some of the compression chambers of an engine, while the other chambers do an engine action, successive air-compression will be achieved.

Further, the control action in this invention means a consequential action which the vehicle and the engine thereof receive when the engine does a compression action, working as an air compressor.

Conventional brake units for motor vehicles include friction brakes and engine brakes. With friction brakes, wear of a friction board is accompanied by pulverization of asbestos, causing asbestus environmental pollution. With engine brakes, imperfectly burned gas is exhausted, causing not only an environmental pollution but also an accidental fire, damage of lubricating oil, after-burn and/or car-knock—all result in troubles of motor vehicles. Further, with exhaust brakes, especially of Diesel engines, there are a lot of defects such as blow back caused by overlap and unusual noise caused thereby.

Recently, environmental pollution caused by exhaust gas of cars is a serious problem. It is because cars are obliged to stop and start frequently due to traffic congestion, signal turns or the like so that cars exhaust much gas at the time of starting and acceleration, and further at such times, much fuel is consumed.

It is an earnest demand to eliminate such disadvantages of cars thus preventing exhaust gas pollution and achieving reduction of energy required.

The present invention can meet with such a social demand. That is, the present invention relates to a vehicle provided with an engine in which compressed air, obtained by making an engine of the vehicle to take an air compression action at the time of stopping or deceleration of the vehicle, and supplying the engine with said compressed air to make it to serve as an air motor.

The conventional engine is used only for driving a vehicle, and hardly applied for any other purpose. However, it is known that an engine has substantially the same structure with an air-compressor, and can work as an air-compressor by stopping fuelling, supplying only air and at the same time changing the timing of opening and closing an exhaust port. Therefore, by dividing a number of chambers into two, and making one group of chambers to take engine action, and making the other group to take continuously compression action by using driving force of said engine, or by making all chambers of the engine temporarily to work as air-compressor at the time of deceleration of the car, using kinetic energy belonging to the car and the engine of its own. In this connection, it is also possible to make an engine with a single cylinder to take an compression action during the time of reduction.

Further, it is well-known that engine can be driven by introducing high pressure air into chambers at suction step, and by periodically supplying chambers with said high pressure air the engine (not fuelled) can be driven to work as an air-motor (air engine). In case of thus driving as an air-motor, the engine is in the state for a compression action, and high pressure air is supplied instead of air, thereby turning a crank-shaft to drive the engine.

Further, compressed air obtained by a compression action of the engine can be used not only for operating the engine as an air-motor, but for controlling the vehicle by applying vacuum by means of an air ejector and converting vacuum force resulting from said vacuum effect into suction force.

The inventor has suggested that a plurality of cylinders of such an engine are divided into two sets to obtain separate operation of said each set of cylinders and actions of said sets are combined in such various manners as all the cylinders taking an engine action, one set of cylinders taking an engine action with the other taking an air compression action, all the cylinders taking an air compression action or the like, so that said single engine can be used for many applications. The inventor further suggested that such an engine is mounted on a vehicle so that travelling of the vehicle is improved, and that particularly in case of being used for an engine-brake, fuel expense is saved and environmental pollution is prevented.

The inventor has further suggested that compressed air obtained during a vehicle being braked can be used for starting an engine, operating an engine as an air-motor, or operating a vacuum suction device for braking a vehicle.

The present invention is a further improvement of such an engine, and mainly relates to an engine provided with double cam shafts and an engine supercharged with compressed air obtained at the time of braking or at a desired time. The present invention further discloses constructions for braking, stopping air-starting and rotating, and starting and continuing reverse rotation of such an engine in case of said engine is applied in a ship.

An engine according to the present invention is, even if it is a single cylinder engine, able to be operated as an air compressor or an air motor.

An important object of the invention is to provide a method for driving a vehicle driven by an internal combustion engine having a plurality of compression chambers divided into a first set and a second set, each of said sets being able to be separately operated and to be convertible in operation so as to take an compression action, comprising starting the engine by making at least said first set take an engine action, making the vehicle run with said first and second sets taking an engine action, putting said second set into an unloaded state during the vehicle running and controlling the engine by making at least said second set take a compression action.

An important object of the invention is to provide a method for driving a vehicle driven by an internal combustion engine having a plurality of compression chambers divided into a first set and second set, each of said sets being able to be separately operated and to be convertible in operation so as to take an compression action, comprising starting the engine by making at least first set take an engine action, idling the engine by keeping the engine action of said first set and by putting said second set into an unloaded state, making the vehicle run by making said first and second sets take an engine action, making the vehicle run by putting said second set into an unloaded state, controlling the engine by making at least said second set take a compression action and supercharging at least one set taking an engine action.

An important object of the invention is to provide a convertible engine—air compressor apparatus mounted on a vehicle for driving said vehicle adapted to achieve an air compression action and consequently obtain compressed air and resultant control force by feeding all the air chambers of an engine in operation temporarily with no fuel but air only to fulfil a compression action.

Another important object of the invention is to provide a convertible engine—air compressor apparatus which acts as an air compressor by making the number of opening and closing of the valves of the 4-stroke engine twice, changing gas which is to be supplied to the compression chambers and changing the flow path of the gas exhausted from the compression chambers, whereby the engine works as an air compressor.

Another important object of the invention is to provide a convertible engine—air compressor apparatus adapted to work as an air compressor by providing the 2-stroke engine with inlet ports and outlet ports, inlet valves and outlet valves thereof, and valve-actuating mechanisms and, as is the case with the 4-stroke engine, changing the flow paths of gas supplied and gas to be exhausted, whereby the engine works as an air compressor.

Another important object of the invention is to provide a convertible engine—air compressor apparatus adapted to do a compression action by providing a rotary engine with inlet ports and exhaust ports on a position of point symmetry with its proper inlet port and exhaust port, and further providing all the inlet ports and exhaust ports with valves and driving units therefor.

Another important object of the invention is to provide a convertible engine—air compressor apparatus adapted to produce compressed air continuously by actuating some of the compression chambers of the engine as an air compressor and at the same time actuating the others as an engine.

Another object of the invention is to provide a convertible engine—air compressor, apparatus, wherein the engine is adapted to do a compression work so that the combination engine and air compressor apparatus may work as a highly effecient and non environmentally disruptive engine brake which has no defects of conventional engine brakes.

Another object of the invention is to provide a convertible engine—air compressor apparatus adapted to be a load-diminishing means (commonly known as an unloader) by keeping the engine working as an air compressor while keeping the both valves closed or opened, keeping one of them closed while the other being kept opened very slightly.

Another object of the invention is to provide a convertible engine—air compressor apparatus having a residual-air exhaust valve which exhausts compressed air remaining in the clearance volume when the engine is used as an air compressor and then increases substantial amount of air inhaled.

Another object of the invention is to provide a convertible engine—air compressor apparatus having auxiliary valve-actuating mechanisms which increase stretching force of valve springs, working as means for offering resistance against a strong back pressure given rise in high-speed rotation of the engine or during the compression action of the engine so that the opening and closing action of the valves may be effected correctly.

Another important object of the present invention is to provide a vehicle on which is mounted a convertible engine—air compressor apparatus in which air motor action (air engine action) is achieved by setting the engine in the state of compression action and introducing compressed air through an inlet or exhaust port into chambers.

A further important object of the present invention is to provide a convertible engine—air compressor apparatus in which provided on each valve spring of an inlet and an exhaust valves is a spring force adjusting means for suitably adjusting the spring forces to be of middle strength during engine action, strong during air compression action and air motor action, and reduced at the time of change-over of each action.

A further important object of the present invention is to provide an engine which can serve as an air compressor and which is adapted to be rotated by introducing high pressure air through an air port provided between an inlet port and an exhaust port into chambers.

A further important object of the present invention is to provide a braking apparatus adapted to brake a vehicle by dropping a suction device onto a travelling surface, taking out air out of the space between said suction device and said travelling surface and thereby make said suction device to be suckedly attached to said travelling surface.

An important object of the present invention is to provide an engine adapted to be made to take an air compression action by changing rotation angle of a cam shaft for an exhaust valve with respect to a crank shaft and by rotating cam shafts for an inlet and exhaust valves at the same rotational frequency with the crank shaft.

Another important object of the present invention is to provide an engine adapted to take an compression action or a no-load operation action by stopping fuel-supply to half a plurality of chambers and supplying them with air only, thereby saving fuel expense and preventing atmosphere pollution.

A further important object of the present invention is to provide an engine adapted to serve as an air compressor, which can suck air through an exhaust port by changing rotation angle of a cam shaft for an exhaust valve with respect to a crank shaft, and can exhaust air by means of an automatic valve provided on the cylinderhead.

A further object of the present invention is to provide an engine adapted to serve as an air compressor in which provided are two pairs of transmitting means for transmitting rotation of a crankshaft to each cam shaft one pair being for an engine action with the others being for an air compression action to cause an inlet and an exhaust valve to suck air.

A further important object of the present invention is to provide an engine adapted to serve as an air compressor in which by dividing a plurality of cylinders into two sets, the first set of cylinders is operated for an engine action while the second set for an compression action, and high pressure air obtained by said compression action set is reduced in pressure and used for supercharging the first set thereby increasing driving force of the engine and obtaining continuous operation without causing seisure.

A further object of the present invention is to provide an engine adapted to serve as an air-compressor in which by driving a compressed air machine or device by compressed air obtained in an air compression action segment, and by restoring the low pressure air after use and residual air in the air compression action segment in order to be used for supercharging an engine segment, thereby effectively using compressed air and preventing noise of the compressed air machine or device.

A further object of the present invention is to provide an engine adapted to serve as an air compressor, in which by injecting compressed air through a residual gas exhaust port the engine is rotated in the normal direction, and by changing valve-timings of inlet, exhaust and residual gas exhaust valves the engine is rotated in the reverse direction.

A further object of the present invention is to provide an engine adapted to serve as an air compressor, in which at the time of convertion from normal rotation into reverse rotation, the engine is braked by changing an engine action into an air compression action and absorbing kinetic energy for normal rotation belonging to the engine so that quickly responding reverse rotation is obtained without waste of kinetic energy.

A further object of the present invention is to provide an engine adapted to serve as an air compressor, in which by injection high pressure air through an exhaust port of the engine the engine is actuated to rotate in the normal or reverse direction.

Further features and advantages of the present invention will be more clearly understood in connection with the following detailed description of the preferred examples of the invention, with reference to the following drawings:

FIGS. 11, 12, 13 are partial elevations of cam-shafts in the engine of the present invention;

FIG. 57 gives a schematic cross-sectional view of a cylinder provided with a port and a valve for residual-air exhaust or high pressure-air supply associated therewith.

FIG. 58 gives a front view of a cam actuating the valve for residual-air exhaust and high pressure air supply.

FIG. 59 gives an end view taken along the line V—V of FIG. 58.

FIG. 60 gives an end view taken along the line VI—VI of FIG. 58.

FIG. 61 gives an end view taken along the line VII—VII of FIG. 58.

Figure 62:
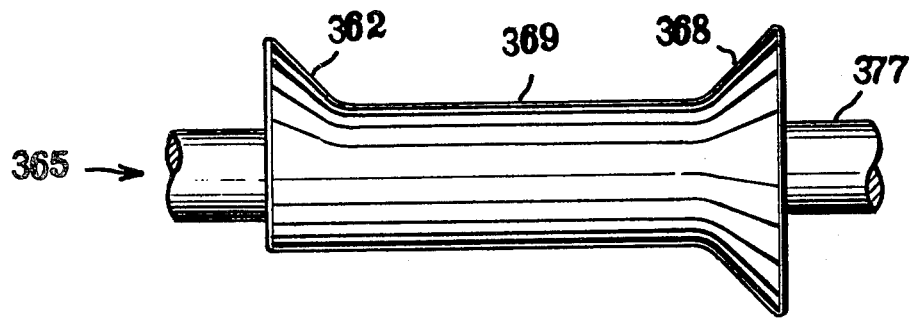

FIG. 62 gives a front view of the suction cam.

Figure 63:
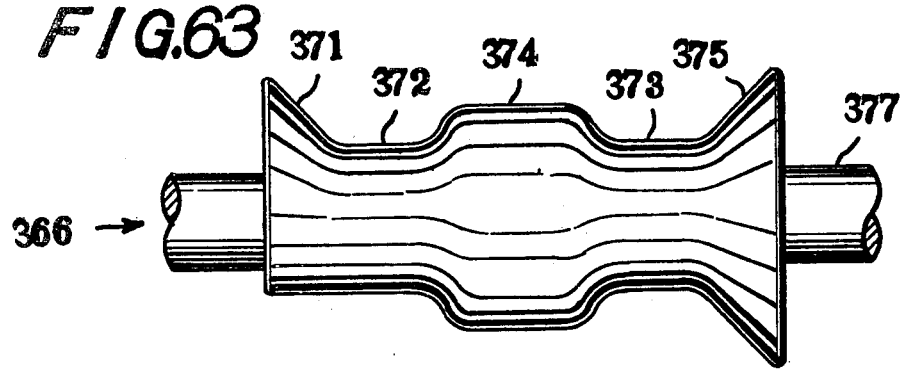

FIG. 63 gives a front view of the exhaust cam.

Figure 64:
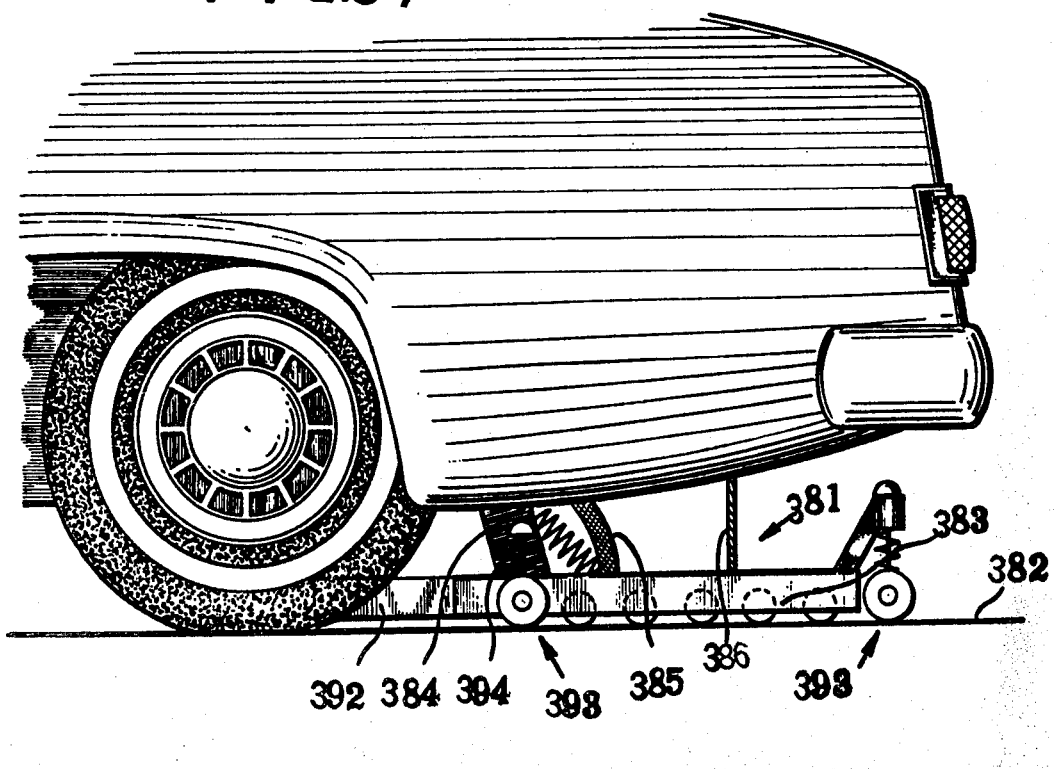
Figure 65:
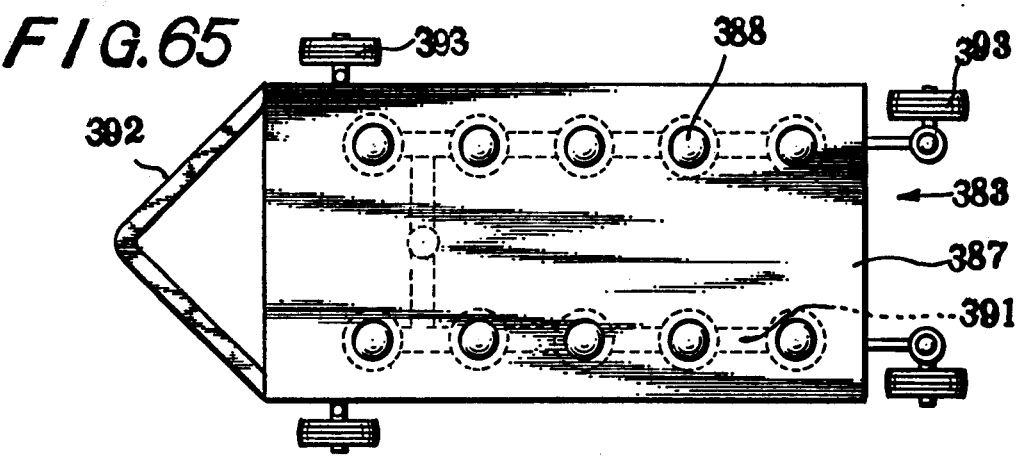
Figure 66:
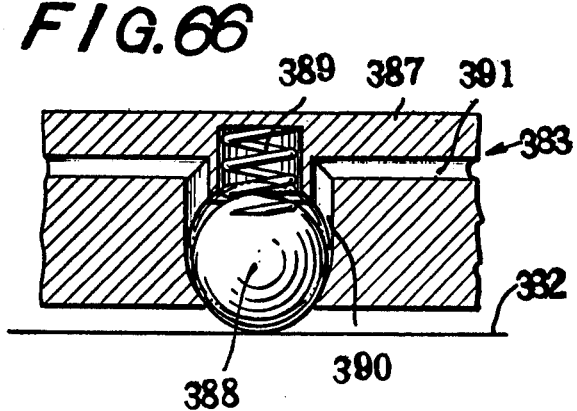
Figure 67:
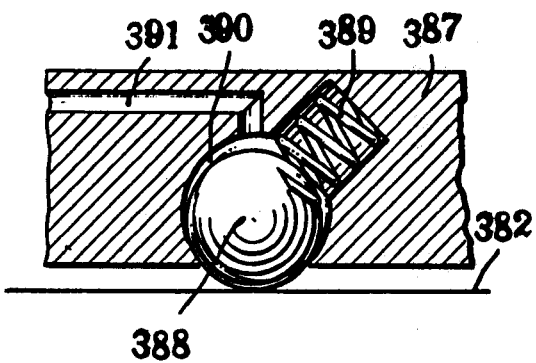

FIG. 64 illustrates a braking apparatus mounted on a vehicle and braked;

FIG. 65 is a bottom elevation of a suction device;

FIG. 66 is a cross-section illustrating an embodiment of ball's attachment;

FIG. 67 is a cross-section of a modified embodiment of ball's attachment; and

Figure 68:
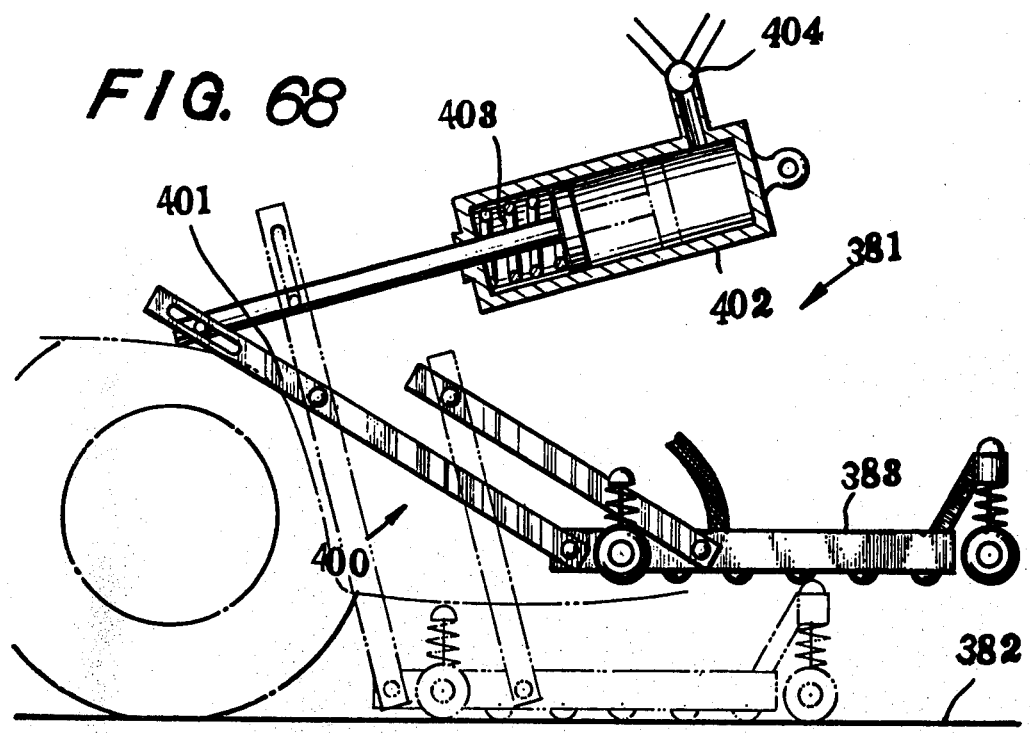

FIG. 68 illustrates a supporting means.

Figure 69:
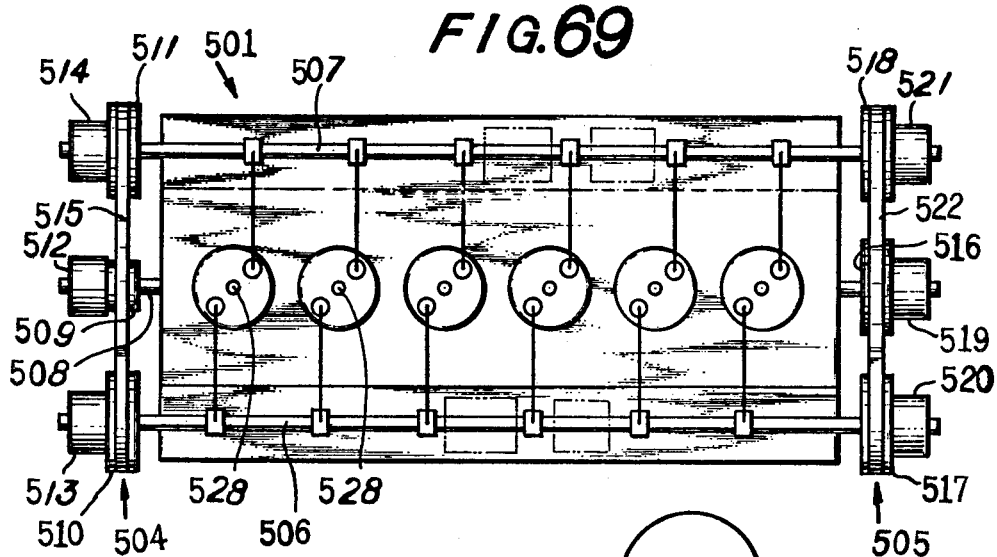
Figure 70:
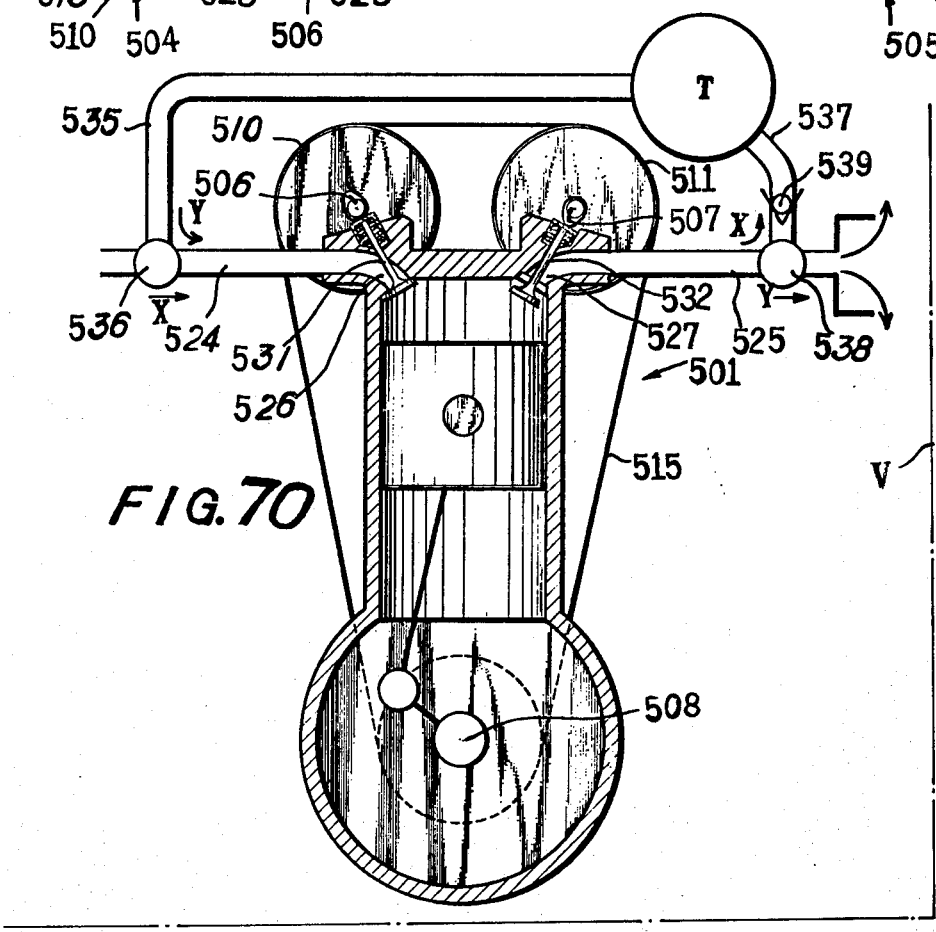
Figure 71:
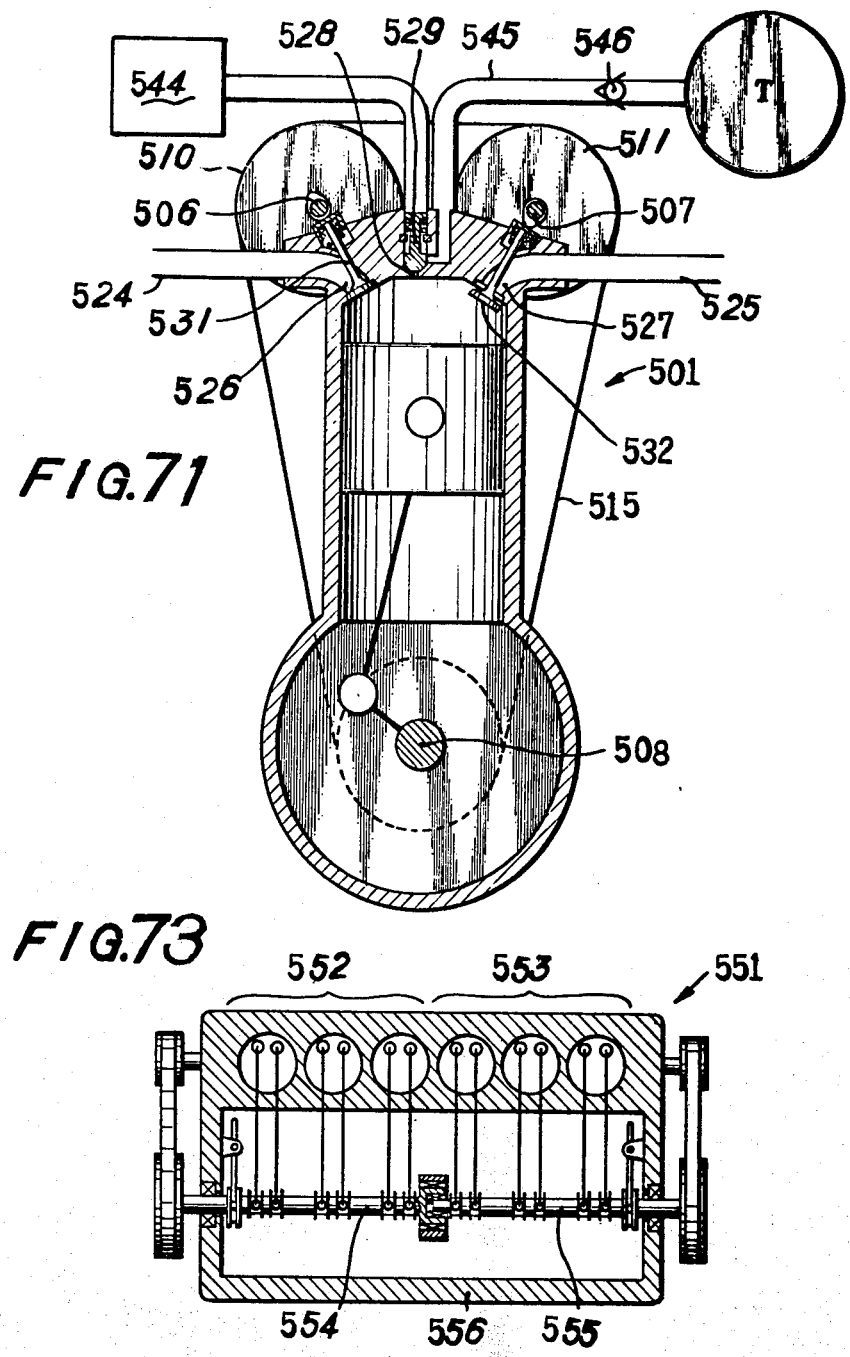
Figure 72:
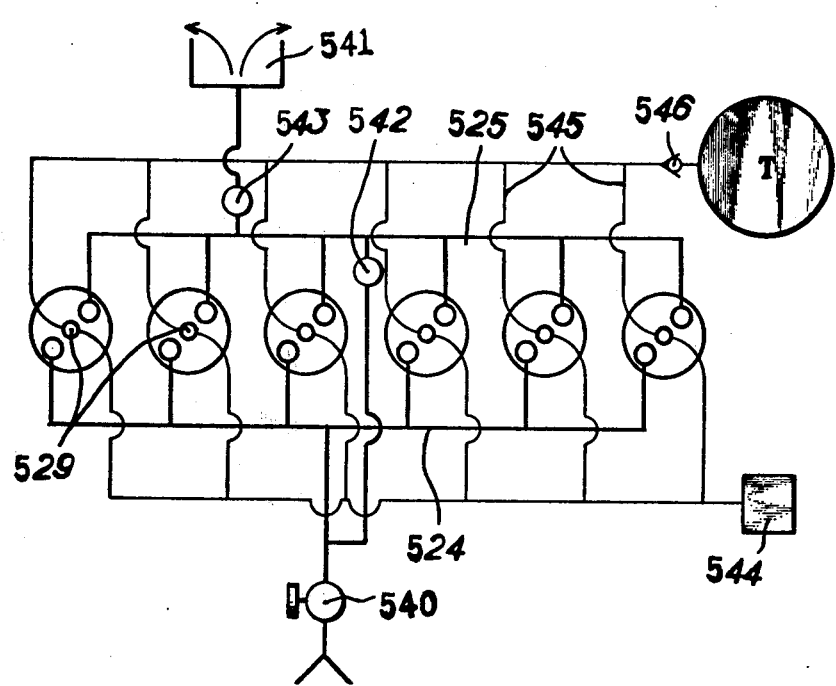
Figure 74:
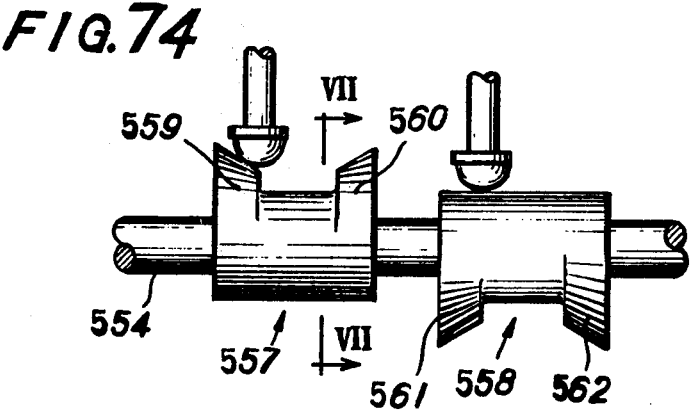
Figure 80:
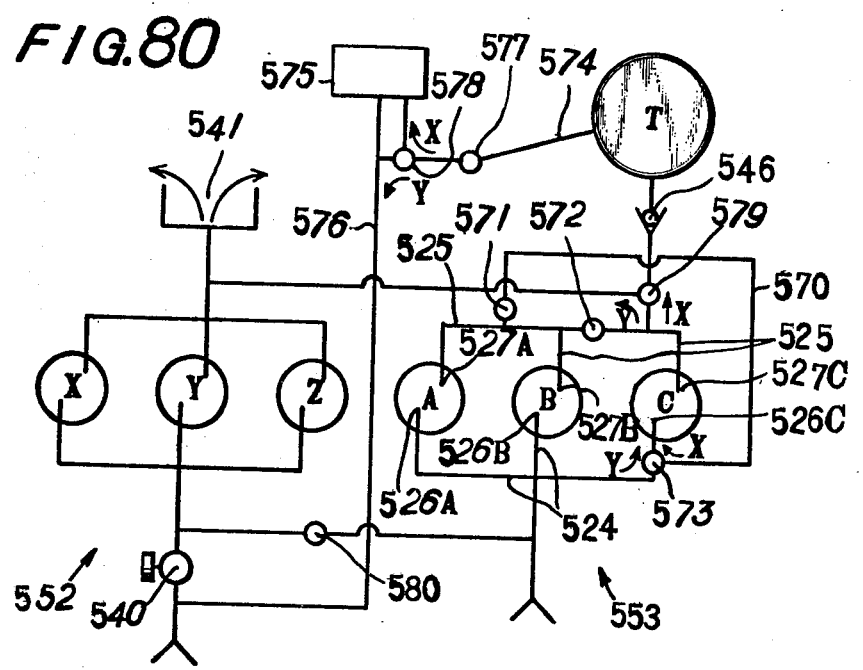
Figure 81:
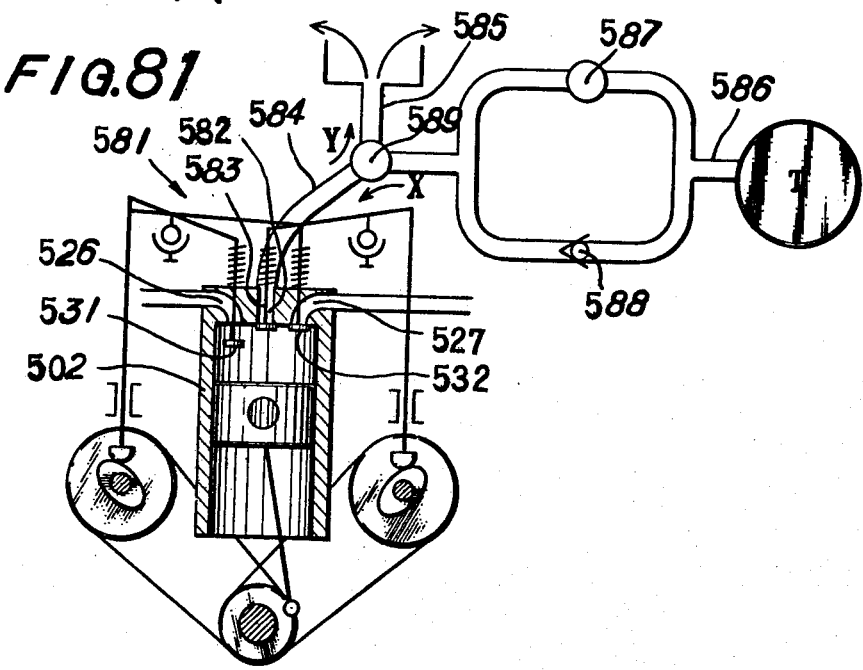
Figure 82:
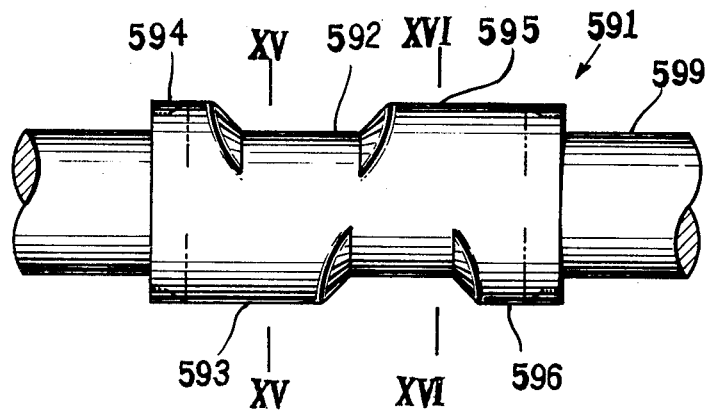
Figure 85:
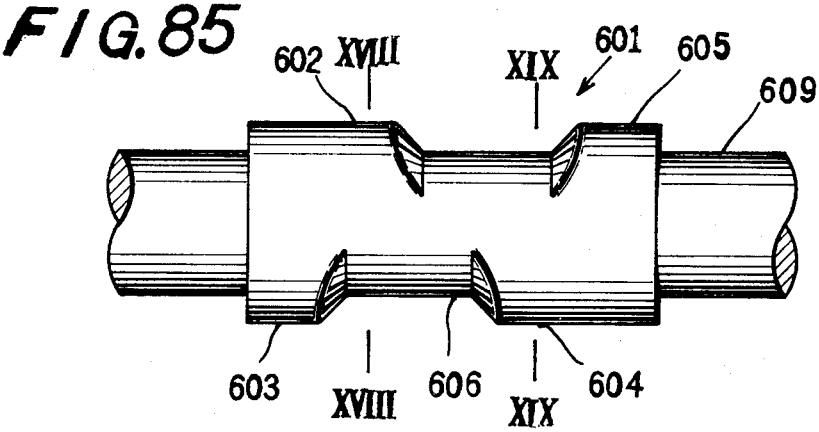
Figure 88:
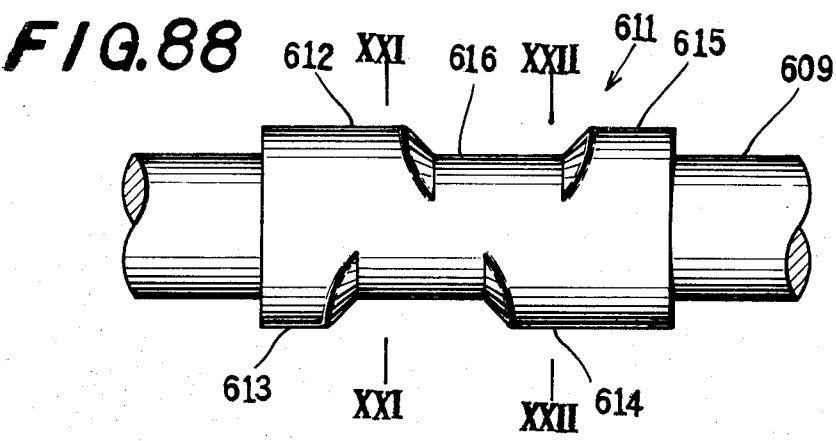
Figure 83:
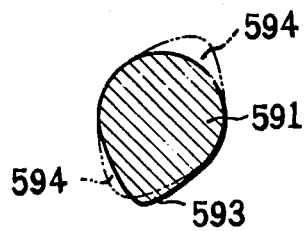
Figure 84:
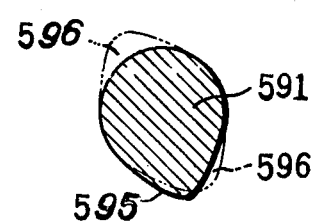
Figure 86:
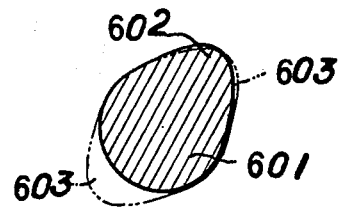
Figure 87:
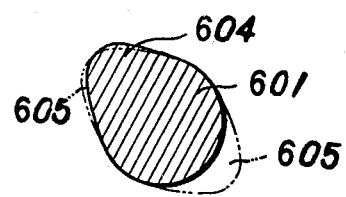
Figure 89:
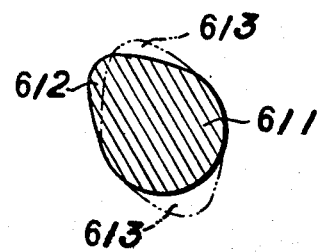

FIG. 69 is a schematic plan view for illustration of the first and the second embodiments of the present invention;

FIG. 70 is a section of a cylinder of an engine of the first embodiment of the present invention;

FIG. 71 is a section of the second embodiment for illustration of a cylinder of an engine of the second embodiment;

FIG. 72 is a schematic view of inlet ane exhaust passages of the second embodiment;

FIG. 73 is a sectional plan view for illustration of the third embodiment of the present invention;

FIG. 74 is a front view for illustration of a cam for an inlet valve and a cam for an exhaust valve of the first set of cylinders of the third embodiment;

FIG. 75 is a section taken along line VII—VII of FIG. 74;

FIG. 76 is a perspective view for illustration of modifications of cams for inlet and exhaust valves of the first set of the cylinders of the third embodiment;

FIG. 77 is a front view for illustration of cams for inlet and exhaust valves of the second set of the third embodiment;

FIG. 78 is a section taken along line X—X of FIG. 77;

FIG. 79 is a section taken along line XI—XI of FIG. 77;

FIG. 80 is an explanatory view of inlet and exhaust passages of the engine of the third embodiment;

FIG. 81 is a section for illustration of a cylinder provided with an air port and an air port valve of the engine of the fourth embodiment of the present invention;

FIG. 82 is a schematic front view of a cam for operating a residual gas exhaust port;

FIG. 83 is an end view taken along line XV—XV of FIG. 82;

FIG. 84 is an end view taken along line XVI—XVI of FIG. 82;

FIG. 85 is a schematic front view of a cam for operating an inlet valve;

FIG. 86 is an end view taken along line XVIII—XVIII of FIG. 85;

FIG. 87 is an end view taken along line XIX—XIX of FIG. 85;

FIG. 88 is a schematic front view of a cam for operating an exhaust valve;

FIG. 89 is an end view taken along line XXI—XXI of FIG. 88; and

Figure 90:
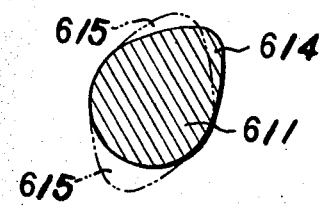

FIG. 90 is an end view taken along line XXII—XXII of FIG. 88.

Figure 1:
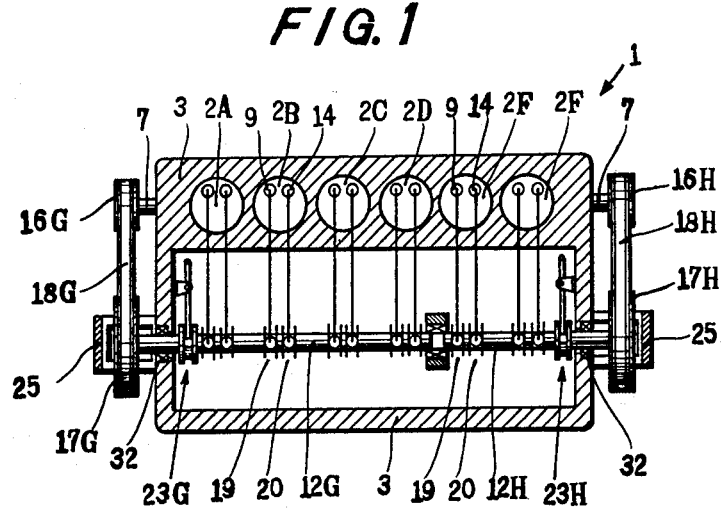
FIG. 1 is a diagramatic plan view of a combination engine and air compressor apparatus according to the present invention.
Figure 2:
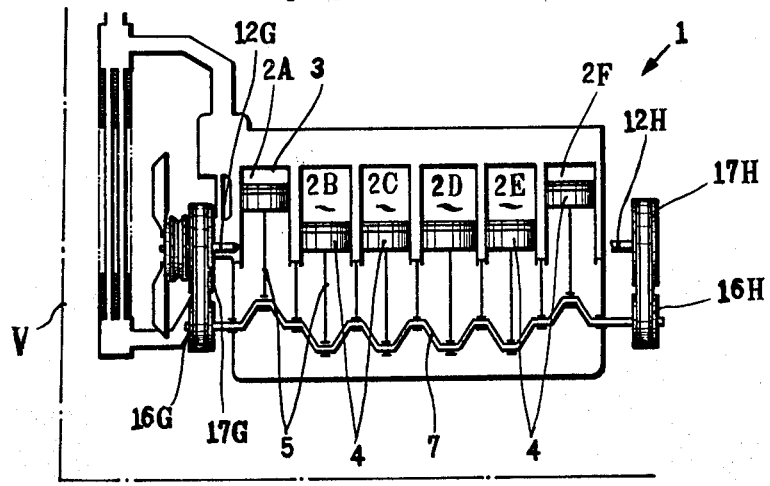
FIG. 2 is a vertical-sectional view of FIG. 1.
Figure 3:
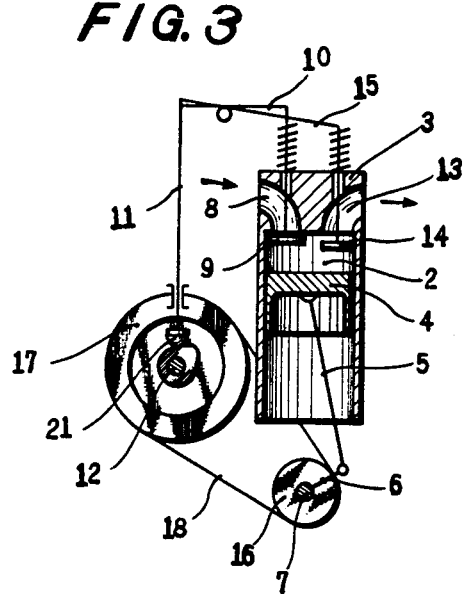
FIG. 3 is a schematic view showing a compression chamber in the engine according to the present invention.

Referring now to the appended drawings, FIG. 1, FIG. 2 and FIG. 3 show a typical embodiment of a convertible engine—air compressor apparatus according to the invention. The numeral 1 indicates a four-cycle six-cylinder gasoline engine having six compression chambers 2A, 2B, 2C, 2D, 2E, 2F which is installed in a conventional motor vehicle six compression chambers are arranged in a line in the body 3 of the engine 1 and the pistons 4A 4B, 4C, 4D, 4E and 4F in the compression chambers are connected with a crank-shaft 7 through connecting rods and crank arms respectively.

The numeral 8 indicates an inlet port opened and closed by an inlet valve 9 which is actuated in turn by a cam-shaft 12 through a rocker arm 10 and a valve push rod 11. The numeral 13 represents an exhaust port opened and closed by an exhaust valve 14 which, similarly to the inlet valve 9, is actuated by a cam-shaft 12 through a rocker arm 15 and a valve push rod (not shown).

A valve-actuating mechanism for driving each valve of the engine 1 is, as shown in FIG. 1, divided into two parts—a left valve-actuating mechanism for the left four compression chambers and a right valve-actuating mechanism for the right two compression chambers. Thus, it will be seen that the engine having six compression chambers is divided into two parts which work independently of each other.

The said cam-shaft 12 is divided into two parts—the cam shaft 12G for the left four compression chambers and the cam-shaft 12H for the right two compression chambers, each cam-shaft 12G, 12H being actuated by the crank-shaft 7 through small sprockets 16G, 16H mounted on the crank-shaft 7, large sprockets 17G, 17H mounted on the cam-shaft and chains 18G, 18H connecting the said small sprockets with the large ones. Each of said large sprockets 17 has the number of teeth twice as much as that of each small sprocket 16, so that the crank-shaft 7 turns once, while the cam-shaft 12 turns half. The said cam-shaft 12G has thereon four suction cams and four exhaust cams by which the engine is made to do a compression action and also the cam-shaft 12H has thereon two suction cams and exhaust cams which are similar in shape to those on the cam shaft 12G. The inlet cam 19 consists of a cam 19J for achieving the working for an engine action and a cam 19K for achieving the working for a compression action and the exhaust cam 20 consists likewise of a cam 20J for a engine action and a cam 20K for a compression action. Said cams 19J and 19K and the cams 20J and 20K are located with proper space therebetween and forming a required angle with each other.

Figure 5:
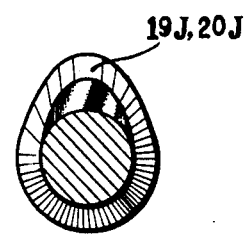
FIG. 5 is a sectional view taken along the line V—V of FIG. 4.
Figure 6:
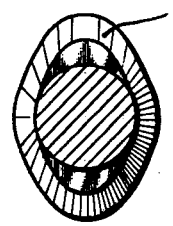
FIG. 6 is a sectional view taken along the line VI—VI of FIG. 4.
Figure 7:
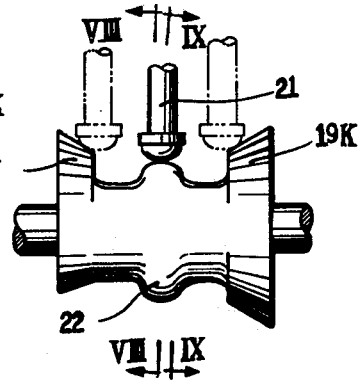
FIG. 7 is a front view of a cam of the first example wherein a load-diminishing mechanism is installed on the valve-actuating cam of the engine according to the present invention.
Figure 8:
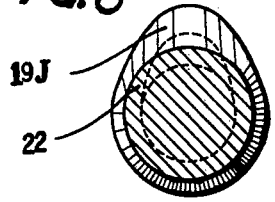
FIG. 8 is a sectional view taken along the line VIII—VIII of FIG. 7.
Figure 10:
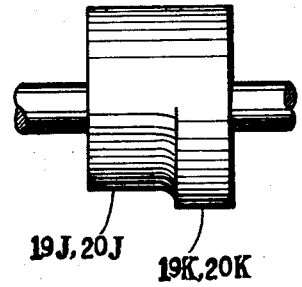
FIG. 10 is a front view of a cam of the second example of the valve-actuating cam of the invention.
Figure 9:
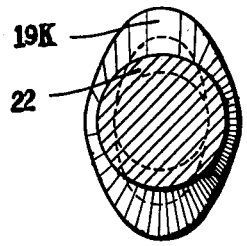
FIG. 9 is a sectional view taken along the line IX—IX of FIG. 7.

The cams for an engine action 19J, 20J, as shown in FIG. 5, are inclined cams with the inclined outer peripheral surface of an egg-shaped cam employed in the conventional internal-combustion engine and the cams for a compression action 19K, 20K, as shown in FIG. 6, are inclined cams having projections located on both sides symmetrically on the center of the egg-shaped cam, and for one rotation of the cam-shaft, each of the cams 19K, 20K drives the tappet 21 twice while each of the cams for the engine action drives the tappet 21 once. The cam shown in FIG. 7, FIG. 8 and FIG. 9 is a suction cam, which comprises a cam for an engine action as well as a cam for a compression action which are inclined cams of the same shape as that of the said cam for the engine action 19J and the cam for the compression action 19K, and the middle part thereof or middle coupling part connection the cam for the engine action and the cam for the compression action is provided with a ring-shaped projection 22 as shown in section in FIG. 8 and FIG. 9. When the tappet 21 is brought into contact with the said projection, as seen from FIG. 7, the inlet valve is opened slightly and remains as it is opened with a slight clearance and the inlet valve is closed completely at the state where the tappet is fallen in the grooves on both sides of the projection. That is, the projection 22 is a load-diminishing means which serves for diminishing load without actuating the engine for a compression action by opening the inlet valve at the time of starting the engine as an air compressor, or at the time of keeping stable the pressure in the storage tanks of compressed air. The cam shown in FIG. 10 is a modified embodiment of the cams for an engine action as well as for a compression action. The cam of the embodiment is formed in a series of the cams which can be used both for an engine and a compression action (where a rotor tappet should be employed). The said cam-shafts 12G, 12H are provided at their proper location with a fuel-pump actuating cam (not shown) for driving the engine and with a distributor actuating gear (not shown) respectively, and the said cams for an engine action, cams for a compression action, fuel-pump actuating cams and distributor actuating gears are formed integrally with the cam-shaft and only the large sprockets 17G, 17H are mounted axially and slidably through a key. The cam-shafts 12G 12H are also carried at both ends thereof rotatably and slidably through the bearing (for example, a slide bearing), and are at the same time each mounted at one end thereof with a cam-change-over mechanism 23, namely a mechanism for sliding the cam-shafts axially.

Cam arrangements with which the engine is acuated as an engine and/or compressor and described with reference to FIG. 11, FIG. 12 and FIG. 13. The drawings on the left of FIG. 1, FIG. 12 and FIG. 13 respectively show cams for an engine action and cams for a compression action which govern suction and exhaustion of the left four compression chambers and the drawings on the right show cams for an engine action and cams for a compression action which govern suction and exhaustion of the right two compression chambers.

Referring to FIG. 11, the drawing on the left as well as on the right show that the cam-shaft 12 is moved to make the cams for a compression action 19K, 20K bear against the tappet 21 which moves twice up and downwardly for one rotation of the cam-shaft.

Referring to FIG. 12, in the drawing on the left the cams for an engine action 19J, 20J are borne against the tappets 21 and in the drawing on the right, the cams for a compression action 19K, 20K are borne against the tappets 21, thus actuating the left four compression chambers as an internal-combustion engine and the right two compression chambers as an air compressor.

Referring to FIG. 13, the drawings on both sides show the case where the cam-shaft is not moved and the cams for an engine action 19J, 20J are made to bear against the tappets, thus six compression chambers of the engine as a whole doing an engine action.

Thus, by the movement of the said cam-shafts 12G 12H, cams for the engine action are converted into cams for the compression action and the engine doing an engine action has come to do a compression action as an air compressor where the inlet valves and the exhaust valves are opened and closed twice for the four strokes thereof.

Figure 14:
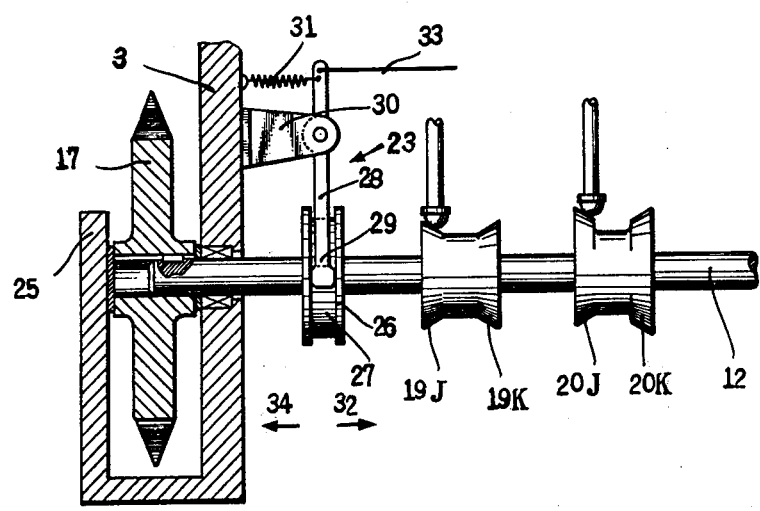
FIG. 14 is a schematic view of a cam change-over mechanism of the engine according to the invention.
Figure 15:
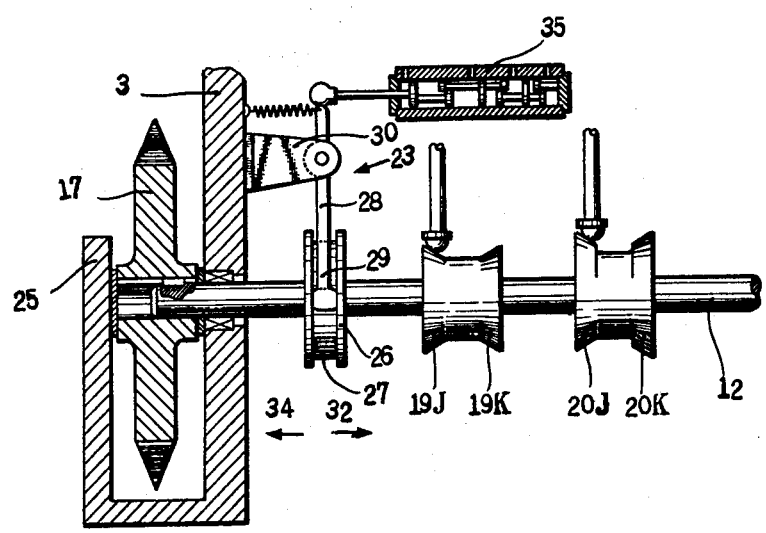
FIG. 15 is also a schematic view of a modified example of the cam change-over mechanism.

Referring further to FIG. 14, an embodiment of the cam change-over mechanism 23 for moving the said cam-shafts 12G, 12H is shown, and in FIG. 15 an application thereof is illustrated. The large sprocket 17 located at the end of the cam-shaft 12 is mounted to be slidably relative to the cam-shaft through a slide key and the said sprocket is held secured by means of the stop member 25 fixed on or formed integrally with the body 3, antifrictional metal being interposed between the member 25 and the body 3. The numeral 26 represents a grooved pulley fixed on or, like the cam, formed integrally with the cam-shaft and with the groove or channel 27 of the said grooved pulley 26 mated are the fork ends 29 of a shifter lever 28, this shifter lever 28 which is supported rockably through a pin to the supporting structure 30 has its center part secured to the body 3. The shifter lever 28 is at the upper end latched to one end of a strong spring 31, the other end of which is latched to the body 3, and the force to move the fork ends 29 of the shifter lever 28 is the direction of the arrow 32 of FIG. 14 is applied by the spring. The said force is controlled by a stopper (not shown) provided on the supporting structure 30. And in the vicinity where the one end of the spring 31 is latched to the upper end of the said shifter lever 28, an operation wire 33 is connected to the said lever 28, the said wire being in turn connected on the other end to the brake mechanism of the engine through an electric control means which is to be explained later, and at the same time as a driver operates the brake mechanism, the said operation wire is also strained to push the grooved pulley 26 in the direction of the arrow 34 and move the cam-shaft 12 to change the cams. And also an operating means may be provided separately from the said brake mechanism of a motor vehicle. The said cham change-over mechanism 23 is mounted one for each of the left four compression chambers and the right two compression chambers. Further, it is desirable that such a means for operating the operation wire as, for example in case of an oil pressure brake, a mechanism adapted to operate only the operation wire through an oil-pressure change-over magnet valve is provided for connecting the said operation wire to the brake mechanism. As for another method for driving the shifter of the said cam change-over mechanism, there is for example a way utilizing oil pressure as well as water pressure and air pressure shown in FIG. 15 which comprises locating a multi-step oil-pressure cylinder 35 along the axis of the cam and making the piston rod of this oil pressure cylinder 35 rotatably connected with the upper end of the shifter lever 28 to move the cam-shaft; or another way (not shown in the drawings) which comprises locating a solenoid in place of the grooved pulley 26, fixing it to the body 3, locating further a spring between the end surface and the supporting member 25 of the cam-shaft, and between the spring and the cam-shaft is provided a means which does not convey the rotation of the cam-shaft to the spring, so that the cam-shaft is pushed by means of the force of the solenoid and the spring.

Further, the oil pressure of the multi-step oil pressure cylinder 35 of FIG. 15 may be obtained from the brake master cylinder.

Still further, when the said modified cams for a suction action (shown in FIGS. 7, 8 and 9) are employed for the said cam change-over mechanism, at least three steps must be taken for cam change-over. That is, when employed for an engine action during the operation of a motor vehicle, the cam for an engine action 19J should be borne against the tappet 21 and when the brake is operated, the cam for a compression action 19K will be borne against the tappet and when the engine is started or the pressure in the storage tank of the compressed air is kept invariable, the middle ring-shaped projection 22 should be borne against the tappet.

Further, the cam change-over may be achieved at 5 steps, wherein another location may be each provided outside the location of the said tappets which are used for achieving cam change-over at 3 steps so as to make the tappet bear against the inclined cam at two locations to adapt the valve opening-closing stroke to be changeable. In this case, however, a means should be provided in order to achieve a perfect valve opening-closing at a location where the inclined cam bears against the outside of the location of the tappet used for 3-step cam change-over.

As seen in the above description, the valve action of the engine can be simply and readily converted into the valve action for an air compressor, and vice versa.

Figure 20:
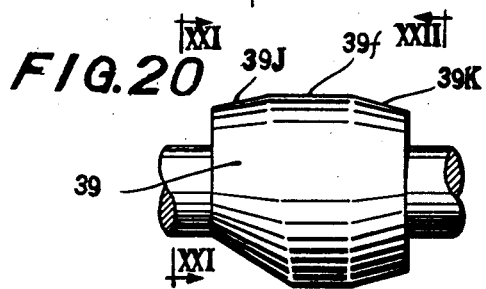
FIG. 20 is a front view of the fourth example of the valve-actuating cam.
Figure 21:
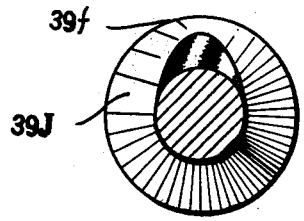
FIG. 21 is a sectional view taken along the line XXI—XXI of FIG. 20.
Figure 22:
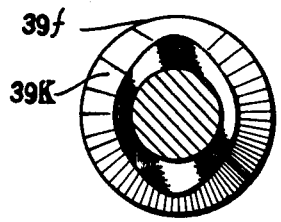
FIG. 22 is a sectional view taken along the line XXII—XXII of FIG. 20.

FIGS. 20 to 22 show as well modified embodiments of the cam according to the invention, whereby change-over is achieved by using the 3-step cam change-over mechanism with cam 39. The cam 39 is a barrel-shaped cam comprising a cam part 39J for an engine action adapted reversely to the inclined cam of FIG. 4, a cam part 39K for a compression action and an intermediate part 39f therebetween.

Figure 4:
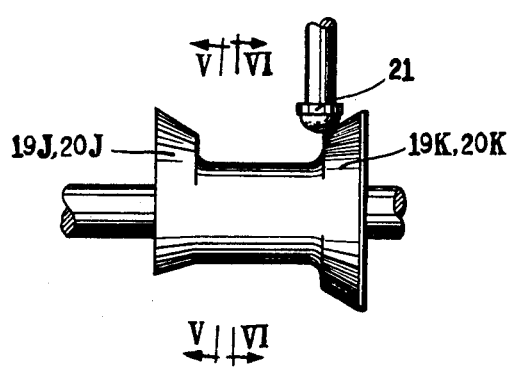
FIG. 4 is a front view of a valve-actuating cam of the engine according to the present invention.

When the tappet against which the cam part 39J for an engine action bears moves towards the intermediate part 39f, the valve is opened and the air is not compressed, the engine remaining at a state completely unloaded, and then fuelling is kept naturally stopped. When the tappet moves from the intermediate part 39f to the cam part 39K for a compression action, a regular compression action is carried out. The cam 39 may be employed for one valve—either for the inlet valve or for the exhaust valve—, whereby the cam shown in FIG. 4 is employed for the other valve.

Figure 16:
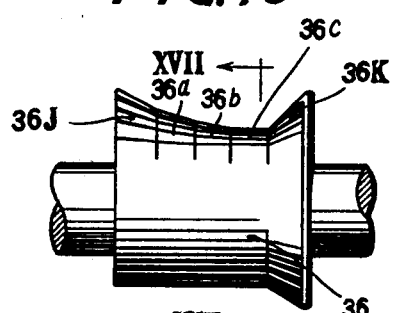
FIG. 16 is a front view of a cam for an exhaust valve of the third modified example of the valve-actuating cam.
Figure 17:
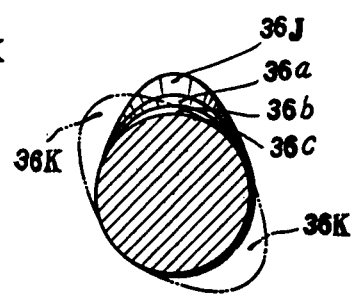
FIG. 17 is a sectional view taken along the line XVII—XVII of FIG. 16.
Figure 18:
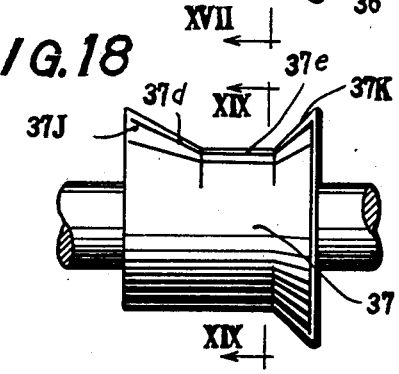
FIG. 18 is a front view of a cam for an intake valve of the third example of the valve-actuating cam.
Figure 19:
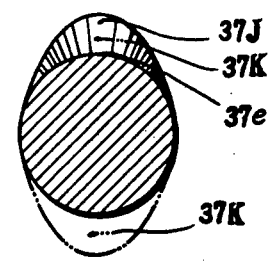
FIG. 19 is a sectional view taken along the line XIX—XIX of FIG. 18.

FIGS. 16 to 19 show modified embodiments of the cam according to the invention in which the cam is formed so as to achieve a smooth movement of the tappet from an engine action to a compression action. In FIGS. 16 and 17, there are shown cams for an exhaust action and in FIGS. 18 and 19 cams for an intake action are illustrated: these cams should be used for sure with the said 5-step cam change-over mechanism.

The cam 36 for an exhaust action comprises a cam part 36J for an engine action, a cam part 36a of small stroke with a somewhat shorter valve stroke, a cam part 36b of smaller stroke with a further shorter valve stroke, a closing cam part 36c for keeping the valve closed, and a cam part 36K for a compression action. For the said parts of the cam 36, the cam 37 for an intake action comprises a cam part 37J for an engine action and a cam part 37d of small stroke aligned with the cam part 37J and a closing cam part 37e and a cam part 37K for a compression action.

Five-step movement of an engine wherein the said cam 36 for exhaustion and the cam 37 for an intake action are employed is described in detail as follows:

When the cams 36J, 37J for an engine action are borne against the tappets, an usual engine action will be carried out in the compression chamber. In other cases than the above, fuelling is stopped completely and air only is supplied into the compression chamber. When the cam parts 36a, 37d of small stroke are borne against the tappets, air is taken in and exhausted once for every 4 cycles in the compression chamber, wherein a compression action of considerably light load will be effected. When the tappet is brought into contact with the cam part 36b of smaller stroke and the closing cam part 37e, there arises a small draft of air through the exhaust valve, and accordingly the load is somewhat heavier than before, that is, when the tappet is borne against the cam part of small stroke. Further, when the tappet is brought into contact with the closing cams 36c, 37e, the inlet valve as well as the exhaust valve are closed completely, causing the engine to work as an engine brake. If the tappet is brought into contact with the cam parts 36K, 37K for a compression action, a compression action will be carried out twice for every 4 cycles just as mentioned before.

A modified intermediate part provided between the cam for an engine action and the cam for a compression action similarly with the above may diminish the load on starting the engine, moderate the shock caused on the conversion of the engine action into the compression action and achieve an engine brake action which gains controlling power gradually and stepwise.

When the engine is switched over to be an air compressor, the method for suction as well as for exhaustion must be changed accordingly, since gas to be inhaled is different from gas to be exhausted.

Figure 23:
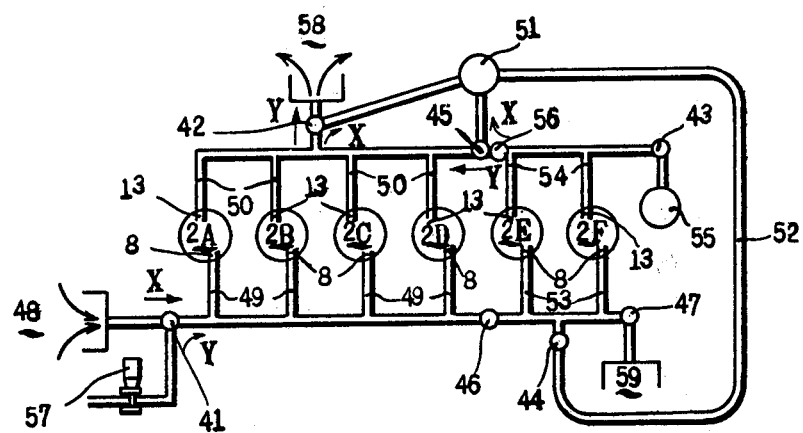
FIG. 23 is a diagrammatic view showing a flow path of gas for the 4-cycle engine of the invention.
Figure 24:
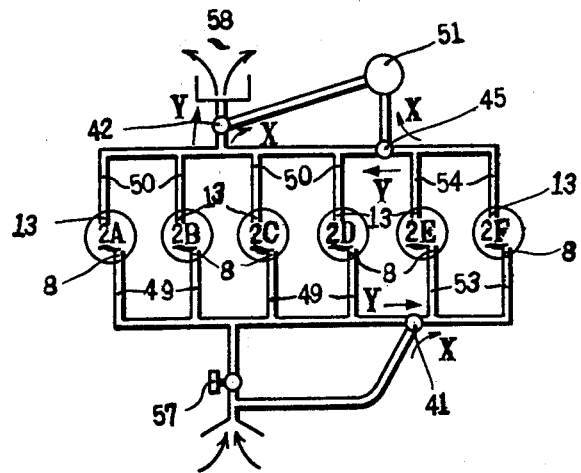
FIG. 24 is also a diagrammatic view of a modified example of the flow path of gas for the 4-cycle engine of the present invention.

In FIGS. 23 and 24 there are shown an embodiment of the paths for the gas inhaled and to be exhausted. X and Y in FIGS. 23 and 24 represent the direction of a flow changed by means of the opening and closing of magnet valves.

When the six compression chambers 2A 2B, 2C, 2D, 2E and 2F are all used as an air compressor, three-way magnet valves 41, 42 are opened to lead a flow therethrough in the direction represented by X, two-way magnet valves 43, 44 being opened and three-way magnet valves 45 is opened to lead a flow therethrough in the direction represented by Y, two-way magnet valves 46, 47, 56 being closed, so that the air inhaled through the air intake 48 flows through each conduit 49 to be drawn into the compression chambers 2A, 2B, 2C and 2D through each inlet port 8 thereof and then, when a given pressure is obtained, the air is exhausted from each exhaust port 13 to be flowed into the low pressure tank 51 through each conduit 50 thereof. The low pressure tank 51 is provided with an intercooler (not shown in the drawings). The compressed air which is drawn into the low pressure tank and cooled properly by the intercooler passes through conduits 52, 53 to be drawn into compression chambers 2E, 2F, where the air is compressed further to be drawn through the conduit 54 into the high pressure tank 55. That is, the air compressed in the compression chambers 2A, 2B, 2C, 2D is, after being subjected to double compression in the compression chambers 2E, 2F, stored in the high pressure tank 55. This is because the most commonly applicable air pressure is about 8–10 kg/cm$^2$ and the most efficient pressure for the gasoline engine is 4–5 kg/cm$^2$, and double compression is to bring about a desired compressed air. If compressed air of high pressure is not necessary, however, the three-way magnet valves 41, 42 are opened to lead a flow therethrough in the direction of X and the three-way magnet valve 45 in the direction of Y, the two-way magnet valves 46, 56 are opened and the two-way magnet valves 43, 44, 47 are closed, so that the air drawn from the intake port 48 is breathed through conduits 49, 52 into the compression chambers 2A, 2B, 2C, 2D, 2E, 2F through each inlet pipe 8 thereof and, after compression, the air is exhausted from the exhaust port 13, flowing through conduits 50, 54 to be stored in the low pressure tank 51. Additionally, the tanks 51, 54 are each provided with a means (not shown) for storing compressed air always at a same pressure and a means (not shown) for exhausting the compressed air In case that the six compression chambers 2A, 2B, 2C, 2D, 2E, 2F are used properly and originally as an internal-combustion engine, each of the three-way magnet valves 41, 42, 45 is opened to lead a flow therethrough in the direction of Y, the two-way magnet valves 46, 56 are opened and the two-way magnet valves 43, 44, 47 are closed so that a mixture from the carburetor 57 is drawn through the conduits 49, 53 into all the chambers through each intake pipe thereof and, after the precesses of compression, explosion and expansion are completed, the air is led out of the exhaust port 13 as waste gas, which is then exhausted out of the eduction port through the conduits 50, 54.

Further, when the left four compression chambers are used as internal combustion engine and the right two compression chambers as an air compressor, the three-way magnet valves 41, 42 are opened each to lead a flow therethrough in the direction of Y and the three-way magnet valve 45 is opened to lead a flow therethrough in the direction of X and the two-way magnet valves 47, 56 are opened and the two-way magnet valves 43, 44, 46 are closed, so that the mixture from the carburetor 57 is inhaled via the conduit 49 into the left compression chambers 2A, 2B, 2C, 2D through each inlet port 8 thereof and, after completing the compression, explosion and expansion processes, the air is exhausted out of the eduction port 58 through the exhaust port 13 and the conduit 50, and, at the same time, the air taken in from the other air intake port 59 is drawn through the conduit 53 and the inlet port 8 into the right compression chambers 2E, 2F and, after being compressed up to a given pressure, the air is led out of the exhaust port 13 to be taken into the low pressure tank 51 through the conduit 54. When the low pressure tank is filled with compressed air an electric signal is given rise while the two-way magnet valves 47, 56 are closed and the two-way magnet valves 43, 44 are opened, so that the compressed air in the low pressure tank is subjected to double compression to be drawn into the high pressure tank 55.

Instead of drawing the air from the intake port 48, a magnet valve for opening and closing a pipe may be provided on the fuel supply pipe leading to the carburetor 57 so that air may be inhaled through the carburetor 57.

The description above relates to a case where the engine is made to do a compression action and further adapted to do double compression in order to control the internal-combustion engine, in which, however, modified cams for the compression action can change the timing of the exhaustion of compressed air as well as the length of the time of exhaustion, so that the compression of air up to a pressure somewhere between 8 to 10 kg/cm$^2$ can be achieved at one time. In this case one storage tank of compressed air may suffice. Further, with the Diesel engine, compressed air of a pressure somewhere between 8–20 kg/cm$^2$ can be obtained and it is also possible to gain high pressure air of a pressure more or less than 30 kg/cm² by effecting double compression.

The pipe arrangement for suction and exhaustion in the case mentioned above are shown in FIG. 24. In case all the six compression chambers are employed as an air compressor, the fuel supply pipe leading to the carburetor 57 is closed by means of a magnet valve (not shown) and three-way magnet valves 41, 45 are opened to lead a flow therethrough in the direction of Y and the three-way magnet valve 42 is opened to lead a flow therethrough in the direction of X. When the six compression chambers are properly and originally used as an internal-combustion engine, the fuel supply pipe is opened and the three-way magnet valves 41, 42, 45 are opened to lead a flow therethrough in the direction of Y. When it is desired that the left four compression chambers are employed as an internal-combustion engine and the right two compression chambers are used as an air compressor, the fuel supply pipe is opened and three-way magnet valves 41, 45 are opened to lead a flow therethrough in the direction of X and the three-way magnet valve 42 is opened to lead a flow therethrough in the direction of Y.

Further, all the magnet valves are actuated by means of an electric control means (not shown) and the latter is connected to the brake pedal or the hand brake lever and is actuated through the operation of them. It is naturally possible to provide another operation mechanism exclusively for the said electric control means. The said electric control means is adapted to make the timing of the operation of the said plurality of magnet valves to be different from one another. This is because when the magnet valves are actuated all at one time the residual gas consisting of fuel and exhaust gas which remains in the inlet pipe and the exhaust pipe respectively is led into the storage tank of compressed air and then, after fuelling is stopped, the magnet valves are actuated in timed relation successively in the direction of the flow of gas.

When the engine constructed as above is made to do a compression action during the running of the motor vehicle installed with the said engine, compressed air is obtained and, at the same time, the speed of the vehicle is controlled. When the rotation of the engine slows down to a given speed, a rotation speed detecting means such as a tachometer generator or a stroboscope feels the speed and conveys a detection signal to an electric control means to stop the compression action and get the engine back to do the engine action.

According to the embodiments of the present invention, six compression chambers of an engine are divided into 2 groups, that is, 4 compression chambers and two compression chambers but the ratio may be 3:3 or 5:1 and in case there are four compression chambers, the ratio may be 3:1 or 1:1, and with three compression chambers the ratio is 2:1, and with eight compression chambers, the ratio may be 3:1 or 5:3 and so on, and further it is possible to make the cam-shaft 12 one without dividing the compression chambers. However, in case some of the plurality of compression chambers are employed for an engine action and the other is for an compression action, it is desirable that the number of compression chambers for engine action is more than the number of compression chambers for compression action, and particularly, when compression action is desired to be done continuously, energy generated in the internal-combustion engine should be sufficiently larger than energy to be consumed as an air compressor, and the same procedure is to be taken based upon the same theory as the above in case of the engine whose cam-shafts for the inlet valve and for the exhaust valve are separately provided on both sides of the body 3 thereof.

As for the disposition of the combustion chambers of the internal-combustion engine of a car, there are in-line type, radial type, V type, X type and H type dispostions and all the dispositions of compression chambers may be divided.

Another embodiment of the invention will be explained with reference to FIGS. 25 to 36.

Figure 25:
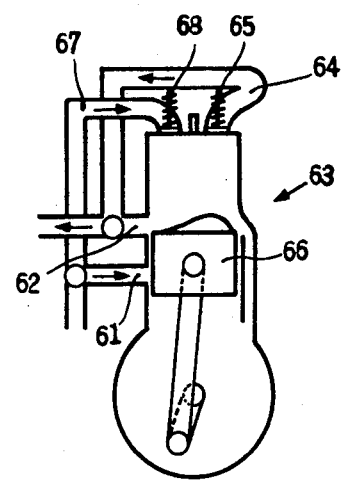
FIG. 25 is a schematic view of an improved 2-cycle gasoline engine.
Figure 27:
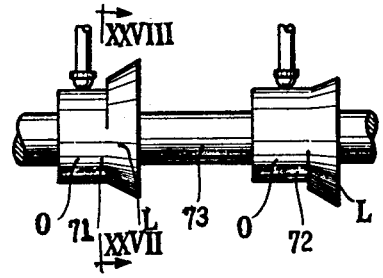
FIG. 27 is a front view of a valve-actuating cam employed in the 2-cycle gasoline engine.

In FIG. 25, a modified 2-cycle engine is illustrated. An usual 2-cycle gasoline engine has neither inlet valve nor exhaust valve, whereas the modified 2-cycle engine of the invention is provided with a scavenging port 61 and a exhaust port 62. In order to make the compression chamber 63 of the engine do a compression action, further an exhaust port 64 and an exhaust valve 65 therefor should be provided anew.

And as for the lubricating method of a 2-cycle gasoline engine, there are a separate lublicating system and a mix lubricating system; with the former system, lubricating oil may be mixed into together with air, and with the latter system, an oil pump should be provided anew. Further, it is most desirable that the same lubrication is done just as is the case with a 2-cycle Diesel engine. In case an exhaust port 64 and an exhaust valve therefor 65 are provided anew to be employed to do compression action and the piston is located in the vicinity of the bottom dead center, a compression chamber is swept by air only through the scavenging port 61 through which fuel supply has already been stopped the magnet by means of valve, and, during the movement of the piston from the bottom dead center to the top dead center, the air is compressed and, when the piston arrives in the vicinity of the top dead center, the exhaust valve 65 is opened to exhaust the compressed air and, during the movement of the piston from the top dead center to the bottom dead center, there is little air in the compression chamber 63 and accordingly the piston works to produce a good vacuum in the compression chamber. In this case the exhaust port 62 should be closed by, for example, a magnet valve. Further, when an inlet port 67, an inlet valve 68, an exhaust port 64 and an exhaust valve 65 are provided anew and the piston 66 is located in the vicinity of the top dead center, the exhaust valve 65 is opened, and as soon as the exhaust valve 65 is closed upon completion of exhaustion, the inlet valve 68 is opened, and air only is taken in through the inlet port 67 during the movement of the piston 65 from the top dead center to the bottom dead center, and when the piston moves from the bottom dead center towards the top dead center, the inlet valve 68 is closed so that the compression process is to be achieved. In this case the scavenging port 61 and the exhaust port 62 should be closed and the fuel supply should be stopped.

Figure 26:
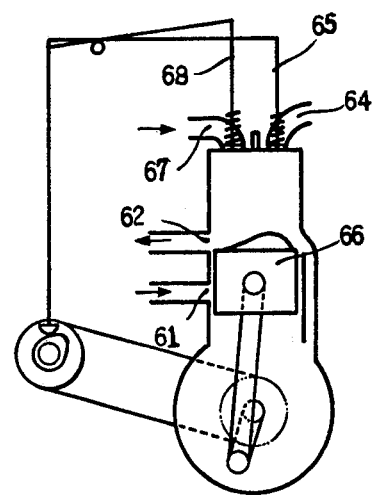
FIG. 26 is also a schematic view of an improved modified example of the 2-cycle gasoline engine.

Referring to the said 2-cycle gasoline engine illustrated in FIG. 25, a new inlet port 67 and a new exhaust port 64 are connected to the original scavenging port 61 and the exhaust port 62 respectively through a pipe or a three-way magnet valve but, if the ports 67, 64 are not connected to the ports 61, 62, the inlet port 67 and the exhaust port 64 may be connected with an air intake port and the storage tank of compressed air respectively as is, for example, shown in FIG. 26.

When the said 2-cycle gasoline engine and a 2-cycle Diesel engine which will be described later are provided with an inlet valve and an exhaust valve so that compression action may be achieved, a new valve-actuating mechanism should be provided at one side of the compression cylinder. And the said valve-actuating mechanism should be adapted to stop its action while the engine is doing the engine action, and to be actuated while the engine is doing the compression action. Then the valve-actuating mechanism is provided with a cam-shaft and a cam change-over mechanism (see FIGS. 14 and 15) which are similar to those of the said modified 4-cycle gasoline engine, and further the cam-shaft is adapted to be turned by the crank-shaft at the same speed therewith so that the rocker arm and the valve push rod are driven to open and close the valve. In this case an engine cam is not necessary just as is the case with the 4-cycle engine and therefore it is sufficient that an inclined cam 71 for inlet valve and an inclined cam 72 for exhaust valve are provided one pair for each compression chamber for the compression action. Described more in detail, the cam 71 for the inlet valve and the cam 72 for the exahust valve are each comprising a cylindrical part O and an inclined part L, and whose cam-shafts 73 (not shown) are adapted to be axially movable by means of the cam change-over mechanism shown in FIGS. 14 and 15, and when the tappet is in contact with the cylindrical part O, the inlet valve 68 and the exhaust valve 65 are closed and the engine does the engine action, while regarding the tappet contacting with the inclined part L, the inlet valve 68 and the exhaust valve 65 do the same valve action as that of the 4-cycle engine and the engine does the compression action.

In the above-mentioned embodiments of the 4-cycle engine and the 2-cycle engine, the cam for the engine action and the cam for the compression action are formed on one cam-shaft, but other types of cam arrangements, such as a separate type wherein cams are formed on separate cam-shafts, will do and cams can also be formed as an overhead cam-shaft type and so on.

Figure 29:
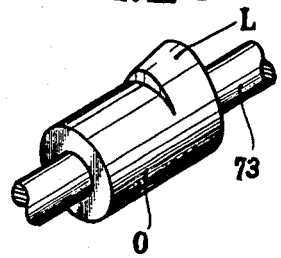
FIG. 29 is a perspective view of a modified example of an inclined cam.

Further, as has been described referring to the said 4-cycle engine, it is also possible that the switching of the cam change-over mechanism may be actuated on multi-step basis and the location of the tappet which bears against the said inclined part L is made to be two so that the both amounts of intake and exhaust may be varied. In this case, however, the shape of the inclined cams is so formed that, as shown in FIG. 29, one side of each inclined part L has the same radius as that of the cylindrical part, which can be equally said with the 4-cycle engine.

Figures 28, 31:
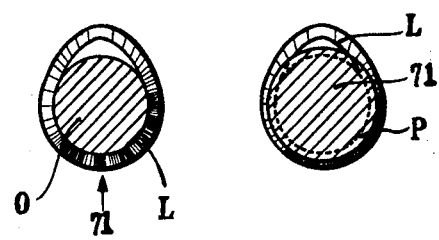
FIG. 28 is a sectional view taken along the line XXVIII—XXVIII of FIG. 27.
FIG. 31 is a sectional view taken along the line XXXI—XXXI of FIG. 30.
Figure 30:
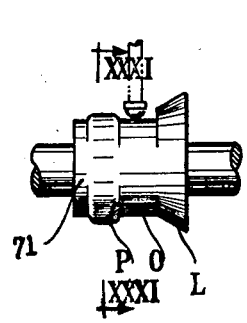
FIG. 30 is a front view of a modified example of the valve-actuating cam employed in the 2-cycle gasoline engine.

FIGS. 30 and 31 show a load-diminishing means which is a cam with a ring-shaped projection P thereon, the projection P keeps the valve slightly opened and the means is to reduce a load just like as the one described in regard to the 4-cycle engine referring to FIGS. 7, 8 and 9.

Figure 32:
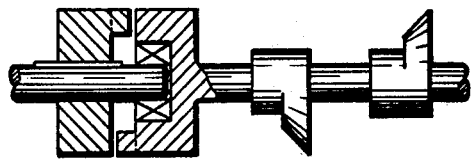
FIG. 32 is a partially sectional, fragmentary and partially diagrammatic view of a modified example of a cam and a cam change-over mechanism.

Further, in the case of the 2-cycle engine, a cam change-over mechanism may be replaced by a cam-shaft and a magnetic clutch: the former is similar to the one employed in the 4-cycle engine shown in FIG. 32 and the latter engages at a given location with the said cam-shaft to convey to it the rotation of the crank-shaft.

As for the 2-cycle Diesel engine, there are various kinds such as valve exhaustion type, opposed piston type, or U-type of uniflow scavenging system as well as traverse type or turn-round type of multi-flow scavenging, which are all provided with their suitable valve mechanisms, inlet ports and inlet valves, exhaust ports and exhaust valves or at least with exhaust ports and exhaust valves to do the compression action. The compression chambers of an Diesel engine of valve exhaustion type of uni-flow scavenging system may be worked as an air compressor by changing the opening and closing time of the exhaust valve so that the valve opens when the piston arrives in the vicinity of the top dead center but it is preferable to provide an inlet port and an inlet valve just as is the case with the saie 2-cycle gasoline engine, since the filling of air into the compression chamber is insufficient and therefore the efficiency as an air compressor is not very well when the piston is in the vicinity of the bottom dead center and the exhaust port is closed and the air is taken into through the scavenging port.

Figure 34:
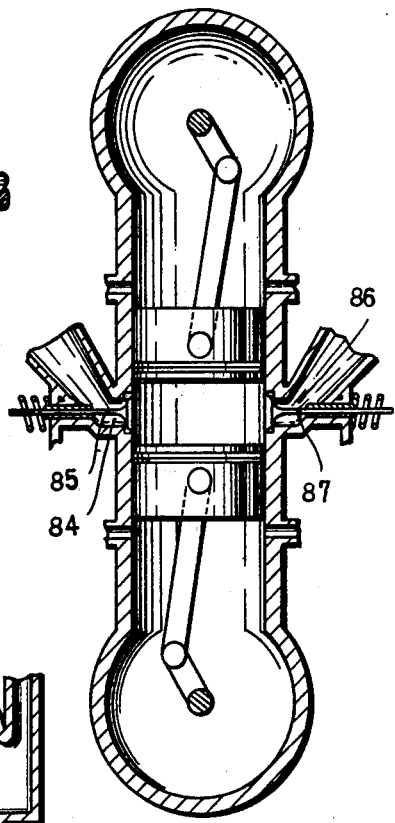
FIG. 34 is a schematic view of an improved uniflow scavenging 2-cycle Diesel engine.
Figure 33:
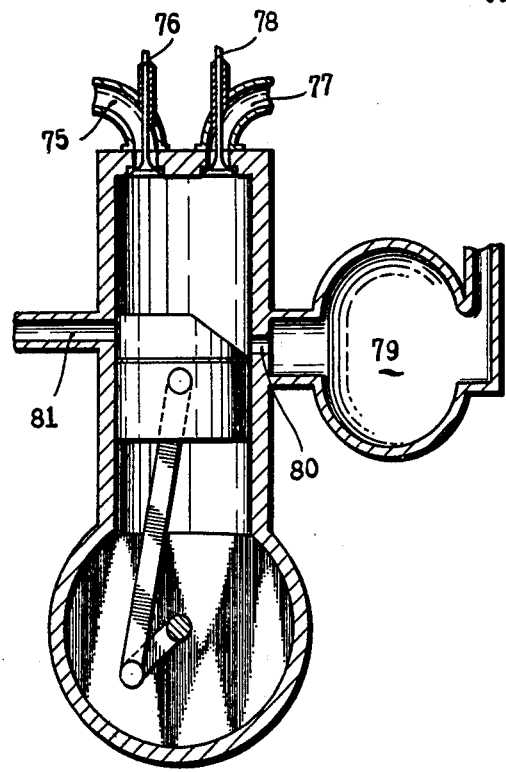
FIG. 33 is a schematic view of an improved cross-scavenging 2-cycle Diesel engine.

Referring to the traverse type or turn-around type of multi-flow scavenging system, the engine is, as shown in FIG. 33, newly provided with an inlet port 75, an inlet valve 76, and an exhaust port 77, and an exhaust valve 78; the new inlet port 75 is to be connected through a conduit to a scavenging pipe (not shown) which leads a flow therethrough from a supercharger 79 to a scavenging port 80. The exhaust port 81 for an engine action is closed and fuel supply is stopped by means of a magnet valve, respectively. In this case it is also possible to take advantage of the scavenging port 80 for an engine action without providing with a new inlet port 75 and an inlet valve 76 thereto. The said inlet port 75 and the inlet valve 76 may be opened and closed by a newly provided valve-actuating mechanism which is similar to that of the said 2-cycle gasoline engine. As for the opposed piston type of uni-flow scavenging system, the engine is, as shown in FIG. 34, newly provided at the intermediate portion of the opposed pistons inside the engine with an inlet port 84, an inlet valve 85, an exhaust port 84 and an exhaust valve 87, or only with an exhaust port 86 and an exhaust valve 87—the valves are also opened and closed by valve actuating mechanisms which are provided newly and similarly to the ones mentioned above.

Figure 35:
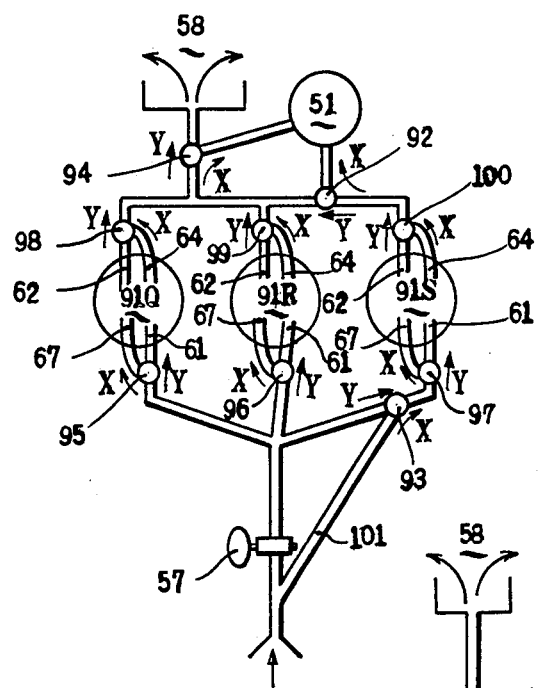
FIG. 35 is a diagrammatic view showing a flow path of gas for a typical 2-cycle engine having three compression chambers.
Figure 36:
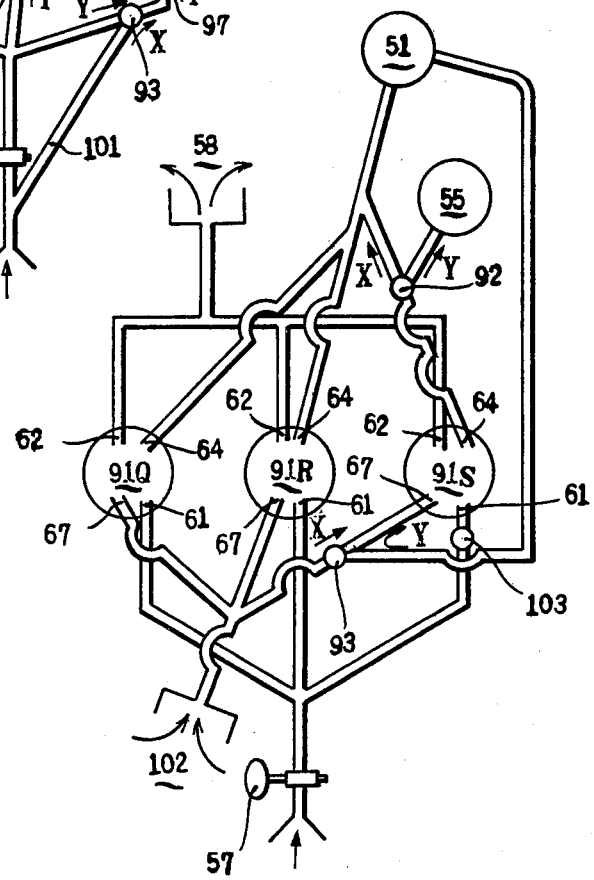
FIG. 36 is a diagrammatic view of a modified example of a flow path of gas for the three compression cylinders.

FIGS. 35 and 36 show by way of example the suction/exhaust flow paths which are formed when every three of the compression-chambers of the 2-cycle gasoline engine are arranged in parallel, which are the same with the 2-cycle Diesel engine whose compression chambers are arranged in parallel three by three. Further, FIG. 35 shows the channel of an improved engine of FIG. 25, while FIG. 36 shows that of FIG. 26. Numerals X, Y in FIGS. 35 and 36 represent the directions of the flow of air or a mixture which is led through or stopped by a magnet valve.

The explanation will be continued with reference to FIG. 35 as follows:

When three compression chambers 91Q, 91R and 91S are all employed as an air compressor, three way magnet valves 92, 93 are opened to lead a flow therethrough in the direction of Y and three way magnet valves 94, 95, 96, 97, 98, 99, 100 are opened to lead a flow therethrough in the direction of X respectively and a system for supplying fuel to the carburetor 57 or the path leading from the carburetor 57 to the intake pipe are cut off by the magnet valves. The air led in through the carburetor 57 is taken into the compression chamber through new inlet ports 67 and, after compression, led through new exhaust ports 64 to the low pressure tank 51 where it is to be stored. Although the pressure of air to be compressed in the said compression chamber can be varied by varying the timing of the exhaust valve 65, an air pressure of about 6–12 kg/cm² is preferable and highly applicable to other engines.

When the three compression chambers are used properly as an internal-combustion engine, three-way magnet valves 92, 93, 94, 95, 96, 97, 98, 99, 100 are each opened to lead a flow therethrough in the direction of Y and the carburetor 57 is supplied with fuel. A mixture generated from the carburetor 57 is led into the compression chamber through the original scavenging ports 61 and waste gas is led through the original exhaust ports 62 to be exhausted from the eduction port 58. In this case the inlet valves and exhaust valves which are newly provided are kept closed.

Further, when the left two compression chambers 91Q 91R are used as an internal-combustion engine and the right compression chamber 91S as an air compressor, three-way magnet valves 92, 93, 97, 100 are opened to lead a flow therethrough in the direction of X and three-way magnet valves 94, 95, 96, 98, 99 in the direction of Y and the carburetor 57 is supplied with fuel. A mixture generated in the carburetor 57 is led into compression chambers 91Q 91R to be combusted and then exhausted from the exhaust port 58 as waste gas. On the other hand, the compression chamber 91S takes in air only through a conduit 101 which does not pass through the carburetor 57 and, after the compression of the air, the compressed air is exhausted through the new exhaust port 64 into the tank 51 where the air is stored.

FIG. 36 shows, as mentioned before, the route of gas in case that the newly provided inlet port and exhaust port are not connected with the original scavenging port and the exhaust port respectively, and, when all the compression chambers are used as an air compressor, fuelling is stopped and three-way magnet valves 92, 93 are opened to lead a flow therethrough in the direction of X to take air in through the intake port 102. When all the compression chambers are employed as an internal-combustion engine, it will be sufficient that the newly provided inlet valve and exhaust valve are stopped opening and closing by means of magnet valve (not shown) and the two-way magnet valve 103 is opened and fuel is supplied. When it is desired that compression chambers 91Q, and 91R are used as an internal-combustion engine and the compression chamber 91S as an air compressor, fuel is supplied, and the newly provided valve of the compression chamber 91S only is opened and closed and the two-way magnet valve 103 is closed, and the three-way magnet valves 92, 93 are connected to lead a flow in the direction of X. Further, in FIG. 36, arrangement is such that double compression can be achieved and the route shown in FIG. 35 can be adapted to achieve double compression. As for the route for achieving double compression by making all the compression chambers do the compression action, it will be sufficient to connect the three-way magnet valves 92, 93 to lead a flow therethrough in the direction of Y and the air compressed once in the compression chambers 91Q, 91R will be led into the tank 51 and then into the compression chamber 91S and further compressed to be stored in the high pressure tank 55.

Figure 37:
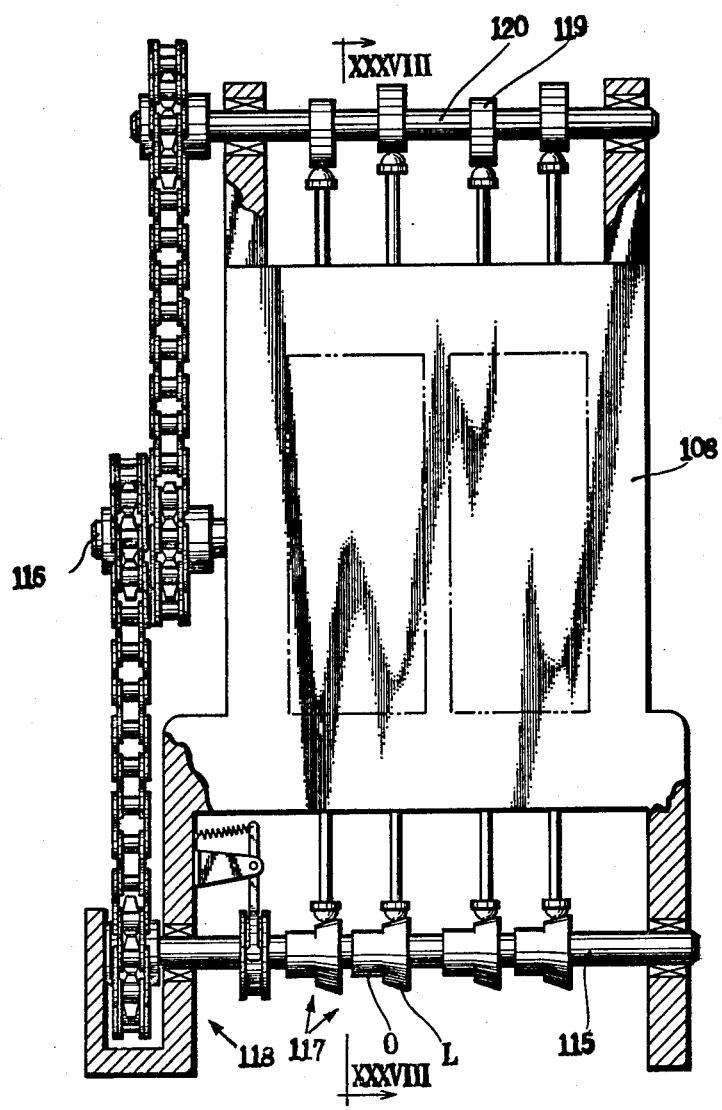
FIG. 37 is a side elevational view in section of an improved 2-rotor rotary engine.
Figure 38:
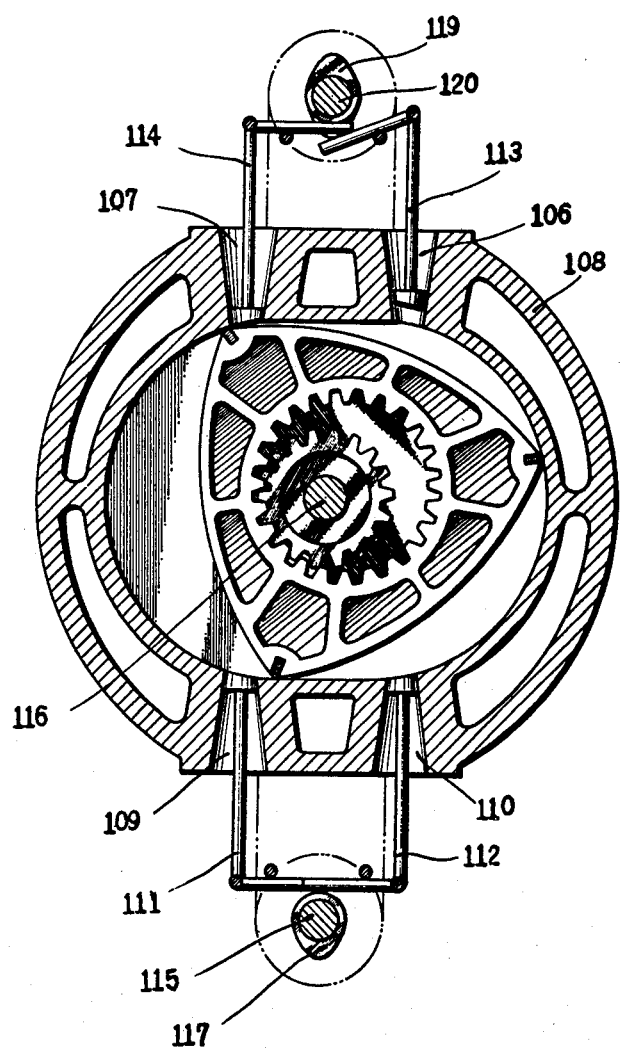
FIG. 38 is a sectional view taken along the line XXXVIII—XXXVIII of FIG. 37.

With the rotary engine, as shown in FIG. 37 and FIG. 38, a new inlet port 109 and a new exhaust port 110 are provided on an ordinary rotary housing 108 with an inlet port 106 and an exhaust port 107 formed thereon. These new inlet port 109 and exhaust port 110 are formed to be located nearly in point symmetry with the original inlet port 106 and exhaust port 107 centering around the eccentric shaft.

As for fundamental arrangement of through-the-port-inlet-exhaust system, there are three systems—peripheral port, side port and combination port system—and further it is conceivable to apply the side port system to the exhaust port and according to each one of those systems, the system of ports to be provided newly should be considered.

When, taking the above into consideration, it is desired to make the rotary engine do the compression action—the engine in this case being that of peripheral port suction system which is provided with a new inlet port and exhaust port according to peripheral port inlet system—, every one of the new and old inlet ports and exhaust ports should be each provided with a valve. In case that the engine of side port suction system is provided with an inlet port and an exhaust port according to side port suction system—in which system, however, the exhaust port is a peripheral port—, new exhaust ports and old exhaust ports only are to be provided each with a valve. When it is desired to provide the engine of peripheral port suction system with a new inlet port and exhaust port of side port suction system—the said exhaust port, however, being a peripheral port—, and vice versa, or when the case is of combination port suction system, provision of valves is to be done as above. Further, in case that the inlet port and the exhaust port are side ports and a new inlet port and exhaust port are also side ports, there is no need to provide them each with a valve. In other words, when the ports are side ports, valves are unnecessary therefor but if the ports are peripheral ports, valves are necessary therefor. As for side ports, however, there may be some overlap, and if the residual gas exhaust valve which will be described later is to be provided, valves also need be provided.

The rotary engine shown in FIG. 37 and FIG. 38 is provided with two pairs of inlet ports and exhaust ports of peripheral system—a new inlet port 109, an old inlet port 106, a new exhaust port 110, and old exhaust port 107 are provided with inlet valves 111 and 113 and exhaust valves 112 and 114, respectively.

Referring to the said valves, when the engine is made to be a compression action, they open the close as the valves of the reciprocating engine and when the engine is to be driven to do an engine action, the valves of the new inlet port and exhaust port should be closed, and those of the old inlet port and exhaust port should be opened. Further, regarding a rotary engine, the eccentric shaft thereof turns three times for one rotation of the rotor and explosions occur three times—that is to say with the eccentric shaft, one rotation of the eccentric shaft brings about one stroke of explosion. The said valves may be therefore interlocked with the eccentric shaft so that each valve is opened and closed at a proper time once for one rotation of the eccentric shaft.

A valve-actuating mechanism for actuating the valves provided on the said rotary engine is shown in FIGS. 37 and 38. Referring now to a new inlet port and a new exhaust port, a cam-shaft 115 is actuated by an eccentric shaft 116 through a sprocket and chain and is mounted axially rotatably. The cam-shaft 115, a cam 117 and a com change-over mechanism 118 are of similar mechanism to those of the valve-actuating mechanism shown in FIGS. 27, 28, 29, 30 and 31 and further in FIGS. 14 and 15 regarding the 4-cycle engine. Referring to the old inlet port and exhaust port, the cam-shaft 120 having a cam 119 similar to the cams of an ordinary 4-cycle gasoline engine is actuated by the eccentric shaft 116 through a sprocket and chain, and a valve releasing means such as an electromagnet, a solenoid (not shown) is appropriately mounted therein, the said means keeps the valves opened electrically while the engine action takes place. Further, the old inlet port and exhaust port may be provided with a valve-actuating mechanism which is similar to that of the new inlet port and exhaust port.

When the rotary engine is expected to do a compression action, the tappets of the valves on the new inlet ports and exhaust ports are in contact with the inclined portions L of the cams 117, and the valves 113, 114 of the old inlet ports and exhaust ports are also in contact with the cams 119, these valves achieve the same action as that of the valves of the 4-cycle gasoline engine. Naturally, the timing of opening and closing of the valves are selected properly. When an engine action is to be achieved, the tappets of the valves 111, 112 are brought into contact with the cylindrical parts 0 of the cams 117, whereby the inlet and exhaust ports are closed, whereas the valves 113, 114 are opened by the said valve-releasing means. And the said inlet valves and exhaust valves 111, 112 113, 114 are formed to have a shape forming part of such a curve as a two node epitrochoid curve forming a profile inside the rotary bousing 108, so that the construction has no clearance between the valve surface and apex seals of the rotar.

Figure 39:
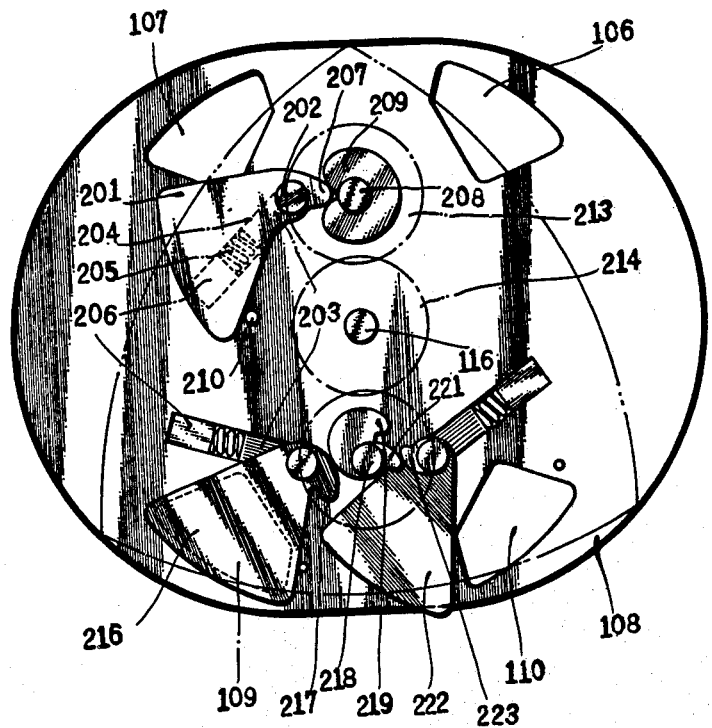
FIG. 39 is a diagrammatic plan view of an example of a valve mechanism which opens and closes side ports of the rotary engine.
Figure 40:
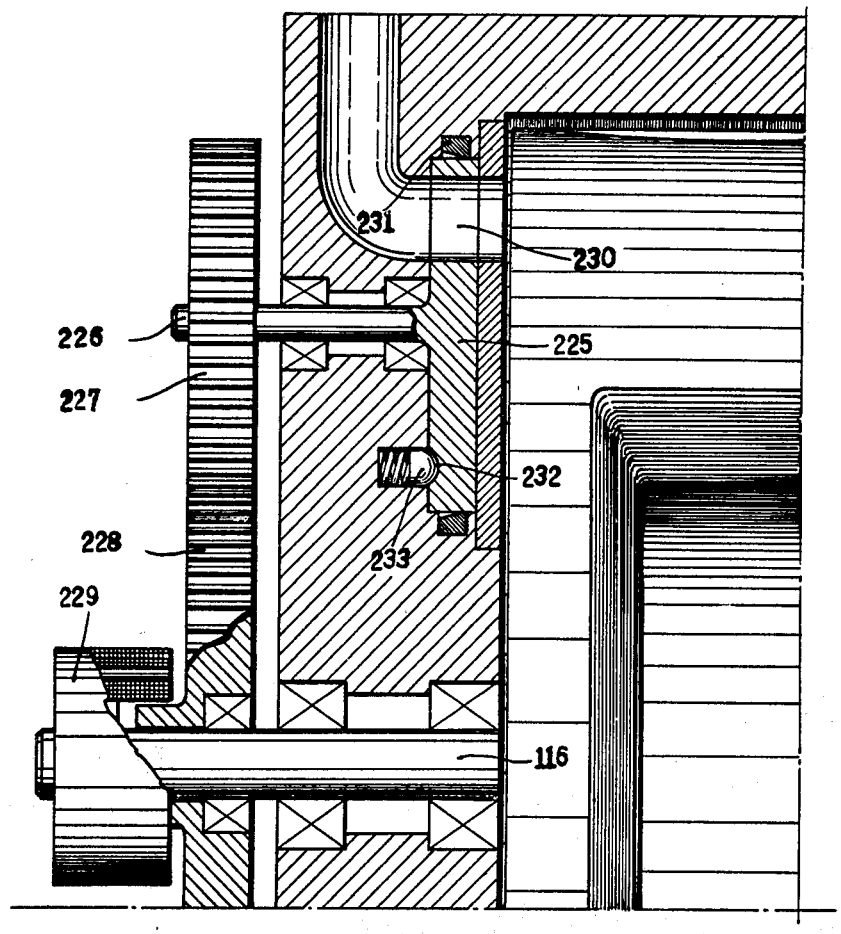
FIG. 40 is an explanatory sectional view of another example of the valve mechanism which opens and closes side ports of the rotary engine.

As for a mechanism which comprises a rotary engine having side ports provided thereon and valves to open and close the said ports, such mechanisms as shown in FIGS. 39 and 40 are conceivable.

Referring to FIG. 39, each port is provided with a valve but every port is operated in different manners.

The original inlet port 106 needs no valve since the timing and the length of the time are equal when a compression action takes place and when an engine action takes place.

The old exhaust port 107 is opened when an engine action takes place and, when a compression action takes place it is opened only a while during which the rotar reaches its top dead center. A rotary valve 201 for the old exhaust port is a segmentary valve supported rotatably on the shaft 202 which is protruded from a supporting member 203 inserted slidably in a channel 204 in which there are provided a spring 205 and a magnet 206—the former presses the said supporting member 203 into the corner of the said channel and the latter, overcoming the force of the said spring, makes the said supporting member 203 move slidably. A spring (not shown) is interposed between the said rotary valve 201 and the said supporting member 203, the said spring working to make the rotary valve 201 rotate in connection with the supporting member 203 so as to open the exhaust port 107. The numeral 207 represents a link formed integrally with the rotary valve 201, the said link 207 comes into rolling contact with a cam 209 which is fixed on a shaft 208. The numeral 210 represents a stopper of the rotary valve 201.

When the cam 209 is in rolling contact with the link 207, the rotary valve 201 overcomes the force of spring and closes the exhaust port 107 and when the link 207 is fallen in the concave part of the cam 209, the rotary valve 201 is rotated by the force of spring and open the exhaust port 107. The said shaft 208 is driven by the eccentric shaft 116 through gears 213, 214, and the gear 214 is driven through a magnetic clutch which engages therewith at a given position.

When the engine changes its action from an engine action into a compression action, the said magnetic clutch which engages at a given position is turned on and the gears 213, 214 are rotated and the rotation of the cam 209 drives the rotary valve 201 so that the exhaust port 107 is opened always at a predetermined time for exhaustion. And when the action of the engine is changed from the compression action into the engine action, the magnetic clutch is turned off and, at the same time, the magnet 206 works to move the shaft 202 so as to bring the link 207 out of rolling contact with the cam 209 and then the exhaust port 107 is opened. In other words, even when the magnetic clutch is turned off and the rotation of the cam 209 is stopped during the rolling contact of the link 207 with the cam 209 to keep the rotary valve in closed state, the exhaust port 107 is opened immediately, since the rotary valve 201 for the exhaust port 107 must be kept opened at the time of engine action.

A new inlet port 109 and a new exhaust port 110 are closed at the time of engine action and are opened at a predetermined time for a given length of time when a compression action takes place. A segmental rotary valve 216 and its shaft, a channel, a supporting member, a spring and a magnet of the new inlet port 109 are of almost similar to those of the said rotary valve 201, but the spring interposed between the rotary valve and the supporting member works upon the rotary valve to make the new inlet port 109 be opened. The link 217 is formed integrally with the rotary valve 216 and comes into rolling contact with the cam 219 fixed on the shaft 218.

A cam 221 is fixed to the said shaft 218 and the cam 221 comes into rolling contact with the link 223 of the rotary valve 222 of the new exhaust port. The rotary valve 222 acts similarly to the said rotary valve 216 so that the port may be closed.

Referring to FIG. 40, description will be made of an action of rotary valves.

A rotary valve 225 is provided in a side housing, whose shaft 226 is driven by the eccentric shaft 116 hrough gears 227, 228 and a magnetic clutch which engages therewith at a given position. The rotary valve 225 has an aperture 230 which is somewhat similar in shape to its port. The numeral 231 represents a sealing means to keep the housing air-sealed even when the rotary valve rotates at a high speed. Further, a means for stopping the rotary valve at a given position when en engine action takes place is provided at one side of the rotary valve, that is, the said means works so as to cause the valve to be opened regarding the old exhaust port and cause it to be closed regarding the new inlet port and the new exhaust port. To provide such a means, there will be ways and means wherein, for example, the rotary valve 225 comprises a permanent magnet which consists of two semicirculars each having opposite poles and another permanent magnet is placed on the plane in the side housing with which the rotary valve is kept in sliding contact so that the rotary valve 225 is stopped by the mutual magnetic force of the two permanent magnets; and as shown in FIG. 40, a shallow cavity 232 is formed in the side of the rotary valve 225 and a hemispherical body 233 is so buried in the side housing that the spring force therefrom always presses the rotary valve so that the rotation speed of the rotary valve may be lowered and the rotary valve may be stopped at the time when the hemispherical body is brought into engagement with the cavity 232.

Figure 41:
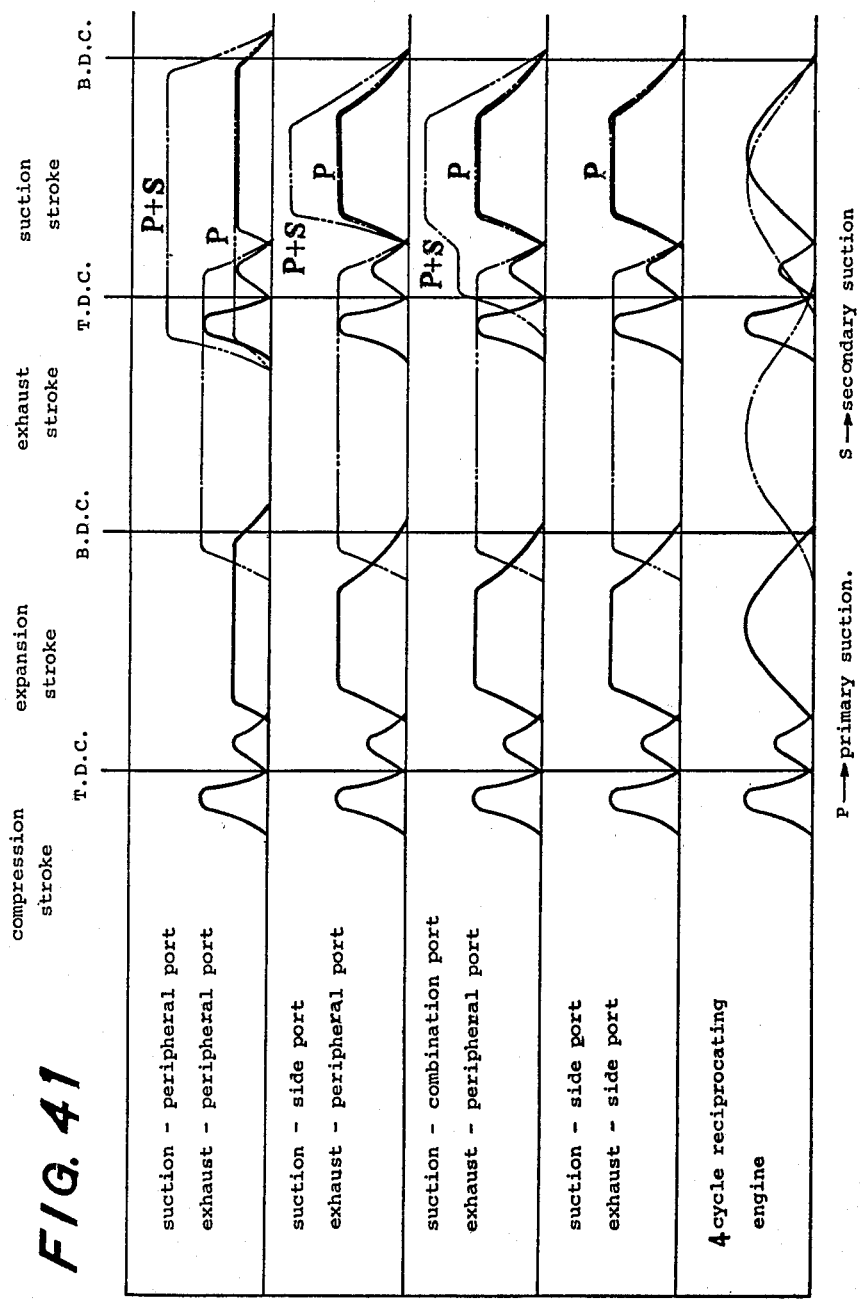
FIG. 41 is a table showing the length of time and the timing of opening and closing of the intake ports and exhaust ports of the rotary or 4-cycle engine which is provided with a residual-air exhaust valve, doing compression action.

FIG. 41 shows the opening and closing timing of port and the length of time in which the port is opened in case that, as mentioned before, peripheral ports or side ports of an engine are each provided anew with an inlet port and an exhaust port which have a valve each so that the engine is made to do a compression action. FIG. 41 shows also a situation where a residual-gas exhaust valve which will be described later has exhausted residual gas forcibly and at the same time it shows comparatively the opening and closing timing of ports and the period of time in case that the 4-cycle reciprocating engine is achieving compression action. Incidentally the imaginary line shows the opening the closing time of port and the length of time when the engine action is taken place.

Figure 42:
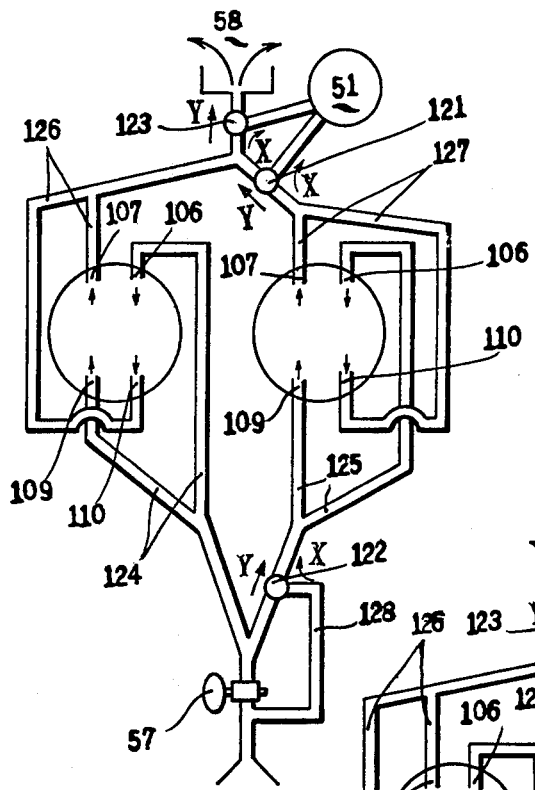
FIG. 42 is a diagrammatic view showing a flow path of gas for the 2-rotor rotary engine.

Following are descriptions of suction/exhaust flow paths of the two-rotor rotary engine in reference to FIG. 42.

When the two compression chambers M, N are expected to do a compression action, three-way magnet valves 121, 122 are opened to lead a flow therethrough in the direction of Y and the three-way magnet valve 123 in the direction of X and the fuel supply pipe for the carburetor is closed by means of a magnet valve and stops supplying fuel. The air taken in through the carburetor 57 passes through each of the conduits 124, 125 and gets into compression chambers through the inlet ports 106, 109 thereof where the are is compressed and exhausted from each of the exhaust valves 110, 107 and led into the tank 51 through exhaust pipes 126, 127.

When the compression chamber N is expected to do a compression action and the compression chamber M do an engine action, three-way magnet valves 121, 122 are opened to lead a flow therethrough in the direction of X and the three-way magnet valve 123 in the direction of Y and the carburetor 57 is supplied with fuel. A mixture generated from the carburetor 57 passes through the conduit 124 and is taken into the compression chamber M through the inlet port 106 thereof. The compression chamber M does an engine action and exhausts waste gas from the outlet 58 through the exhaust port 107. As for the compression chamber N, passing through conduits 128, 125, air only is led into the compression chamber N through the inlet port 106, 109, where the air is compressed to be led through the exhaust ports 107, 110, the conduit 127 and the magnet valve 121 into low pressure tank 51, where the air is stored.

When the compression chambers M, N are expected to do an engine action, three-way magnet valves 121, 122, 123 are each opened to lead a flow therethrough in the direction of Y and the carburetor 57 is supplied with fuel. A mixture obtained passes through the conduits 124, 125 and the inlet port 106 into the compression chambers M, N. Waste gas comes through the exhaust port 107 out of compression chambers M, N to be exhausted through the conduits 126, 127 out of the exhaust port 58.

Figure 43:
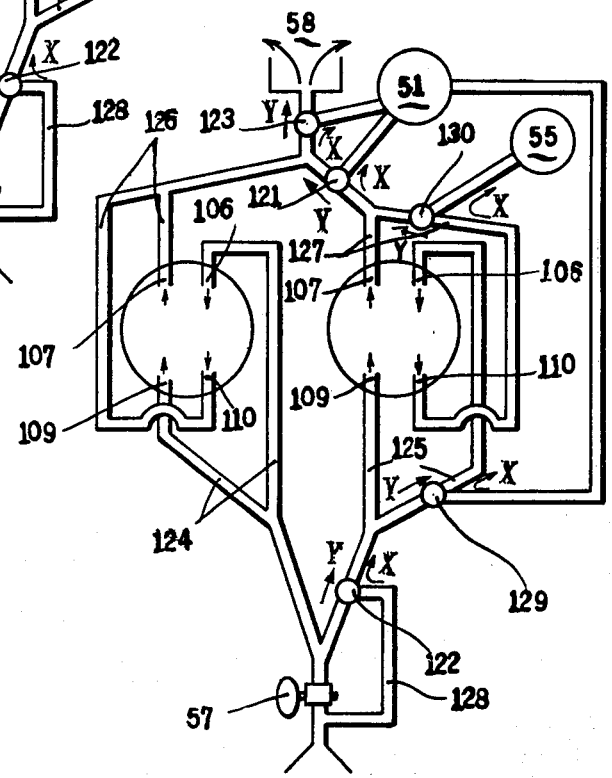
FIG. 43 is a diagrammatic view showing a modified example of a flow path of gas for the 2-rotor rotary engine.

When the two-rotor rotary engine is to be adapted to be an air compressor of two-step compression mechanism in FIG. 43, fuelling is stopped, and the three-way magnet valves 121, 123, 129, 130 are opened to lead a flow therethrough in the direction of X, and air compressed in the compression chamber M and a half of the compression chamber N is led once into the low pressure tank 51, from which the air is drawn into the other half of the compression chamber N—that is, low pressure air is drawn into the inlet port 106 of the compression chamber N from the low pressure tank 51—and, after being compressed once again in the said latter half of the compression chamber N, the air passes through the exhaust port 110 to be stored in the high pressure tank 55. In other cases than double compression, three-way magnet valves 129, 130 are opened to lead a flow therethrough in the direction of Y.

In the above embodiment regarding the rotary engine, two compression chambers are divided at the ratio of 1:1, but, in case of three compression chambers, they may be divided at the ratio of 2:1.

Figure 44:
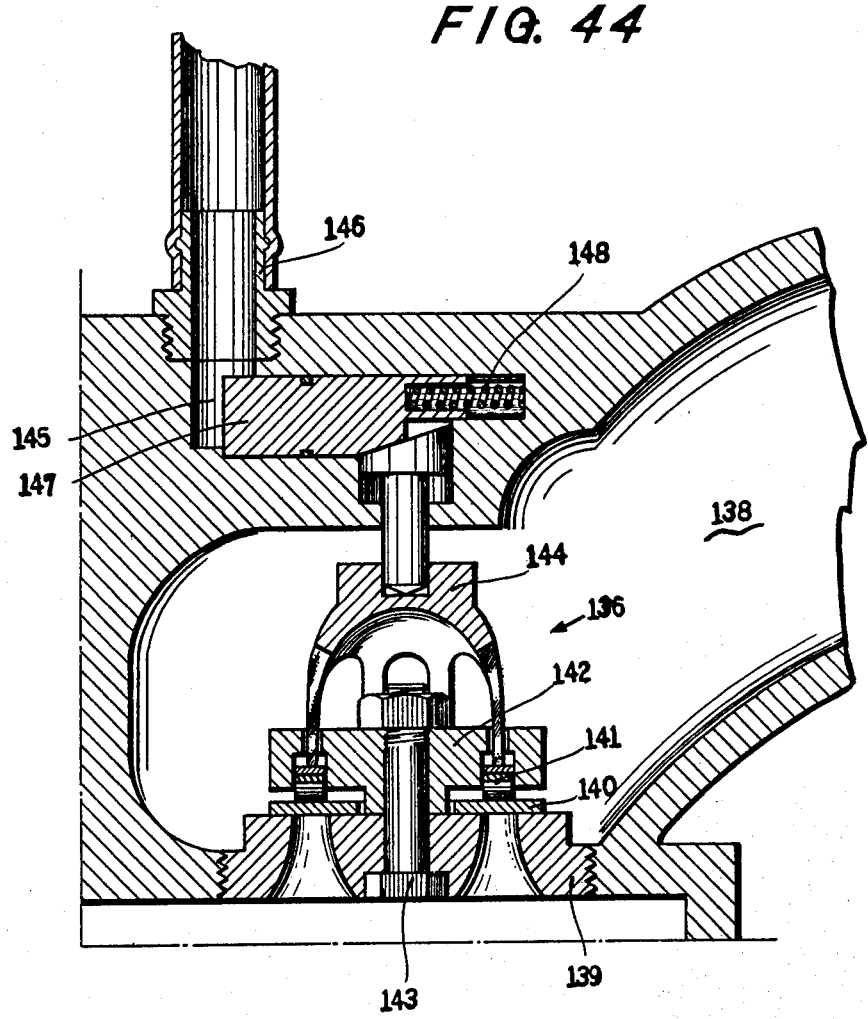
FIG. 44 is a sectional view of an automatic valve for exhaustion.
Figure 46:
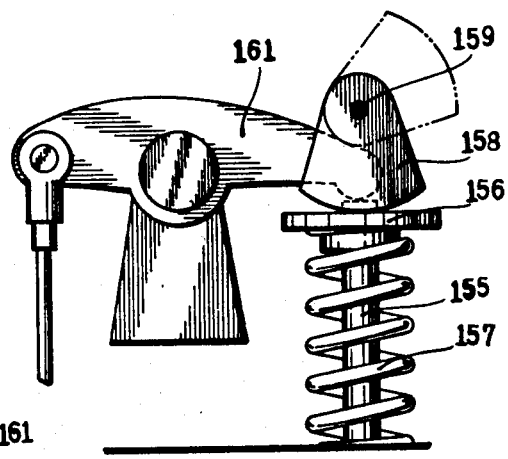
FIG. 46 is a sectional view taken along the line XXXXV—XXXXV of FIG. 45.
Figure 45:
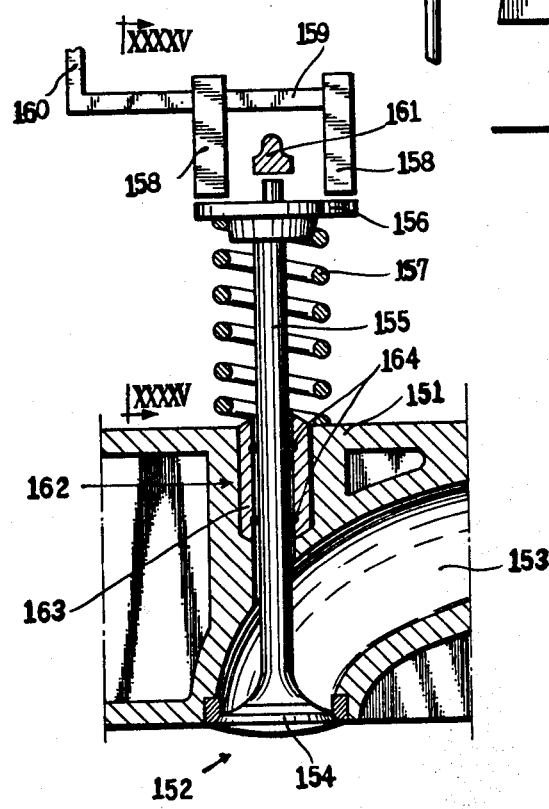
FIG. 45 is a sectional view of a part of a valve mechanism provided with an auxiliary valve-actuating mechanism.

The above-mentioned are the ways and means to make an internal-combustion engine having no valve such as a 2-cycle gasoline engine, a 2-cycle Diesel engine and a rotary engine do compression action by providing them with new valves for driving cams. If an engine is provided newly with such automatic valves instead of the opening and closing valves, the engine will be turned into an air compressor more easily, though the durability and followability of the automatic valves are a little less than those of the opening and closing valves. An example of the automatic valves will be seen in reference to the following description in connection with FIG. 44.

The numeral 136 indicates an automatic valve for exhaustion provided at the exhaust port 138 of the cylinder head 137 (or a housing of a rotary engine) of an engine. The said automatic valve 136 comprises a valve seat 139, a valve plate 140, a valve spring 141 which is a specially manufactured ring-like flat spring, a valve receptacle 142, a bolt 143 and a valve retainer 144, the upper end of the said retainer 144 being inserted into a hook-shaped bore 145 formed in the cylinder head 137, the said bore being connected with a pipe 146 for leading a flow of high pressure therethrough.

The said hook-shaped bore 145 has a slidable stopper 147 and a spring inserted therein. The stopper 147 is moved by the pressure of a high-pressure flow to press the upper surface of the upper end of the retainer 144 and depress the retainer 144. Without the high-pressure flow, the stretching force of the spring moves the stopper 147 back to its original position to release the pressure against the retainer 144.

When an internal-combustion engine does a compression action, compressed air in the compression chamber overcomes the depressing force of the valve spring 141, lifting the valve plate 140 up and then the air is exhausted into the exhaust port 138 through the gap between the valve plate 140 and the valve seat 139. When the engine does an engine action, a flow of high pressure is led from a high pressure tank (not shown) through the pipe 146 into the bore 145 to move the stopper 147 to press the spring 148, and the stopper 147 presses down the retainer 144 which in turn depresses the valve plate 140 against the valve seat 139 so that the exhaustion of waste gas may be stopped.

When it is desired that inlet ports are also provided with automatic valves, automatic valves for suction which are somewhat similar in shape to the automatic valves for exhaustion and are used as a load diminishing mechanism which open its inlet valves to reduce the load (commonly known as a suction unloader) may be employed. When the engine is desired to do an engine action, however, the automatic valves for suction need be provided with means for locking just as is the case with the automatic valves for exhaustion, since the automatic valves should be closed completely.

The following is a description of a mechanism for solving the problems encountered in case that the engine is made to do a compression action. Usually cams press push rods and rocker arms which in turn act on valve stems to open the inlet valves and exhaust valves, whereas these valves are closed by pushing back the valve stems by means of the stretching force of the valve spring. As the exhaust port of this engine is connected with a storage tank of compressed air, a back pressure of the compressed air existing in the exhaust pipe is directed to the exhaust valve, and the stretching force of the valve spring is weakened, and consequently complete closure of the exhaust valve cannot be expected when the said engine is driven as an air compressor. Then, it is necessary to provide means adapted to overcome the back pressure of compressed air and achieving complete closure of the exhaust port.

The following is a description given with reference to FIGS. 45-48 of an example of such an auxiliary valve-driving mechanism as will increase the stretching force of the valve spring to achieve complete closure of the exhaust valve.

The numeral 151 indicates a cylinder head of an engine and the numeral 152 represents an inlet valve or an exhaust valve to open or close the inlet port or exhaust port 153 provided in the said cylinder head. The inlet or exhaust valve 152 comprises a valve head 154 facing the compression chamber of the engine, a valve stem 155 and a plate 156. The said valve head 154 and valve stem 155 are formed integrally with each other, the plate 156 being mounted detachably on the said valve stem 155. In other words, the plate 156 is a retainer which has a bigger trim than a usual retainer. The numeral 157 represents a valve spring which is interposed between the said cylinder head 151 and the plate 156, the said valve spring being mounted on the valve stem 155 which exerts its force in a direction to move the plate from the cylinder head. Numerals 158, 158 represent means for reinforcing valve springs such as permanent magnets or electromagnets. These magnets 158 are mounted on the shaft 159 which is supported rotatably by a supporting member (not shown) provided on the upper face of the cylinder head 151 or the cylinder-head cover (tappet cover), and one end of the shaft 159 is provided with an operation lever 160 through which the said shaft 159 is rotated. The said lever may be operated manually but it will be more efficient to employ electromagnets to actuate the lever simultaneously with the valve-spring reinforcing means. Further, it may be possible to provide the shaft 159 with a driving means such as a chain and sprocket to transmit the rotation of the crank-shaft so that the means may be actuated as a valve-spring reinforcing means only when the valves are closed. The numeral 161 indicates a rocker arm which exerts depression force in a direction contrary to that of the stretching force of the valve spring 157 to open the valve 152. The rocker arm 161 is supported by a valve-rocker shaft and actuated by a cam through a push rod, although the situation thereof is not illustrated.

A supporting member 162 of the cylinder head 151 which supports the said valve stem 155 axially slidably is provided with a supporting member 163 made of a cylindrical oilless metal and two O-rings 164 which are inserted in the ring-like channels of the said supporting member 163 and the said two O-rings 164 seal up completely lubricating oil and compressed air leaking out of the valve-rocker shaft and so on.

Figure 48:
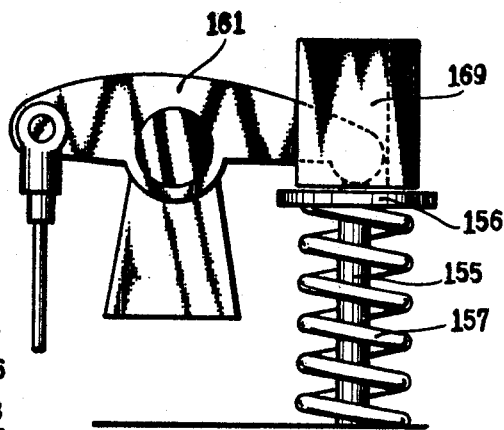
FIG. 48 is a side elevational view of another modified example of the auxiliary valve-actuating mechanism.
Figure 47:
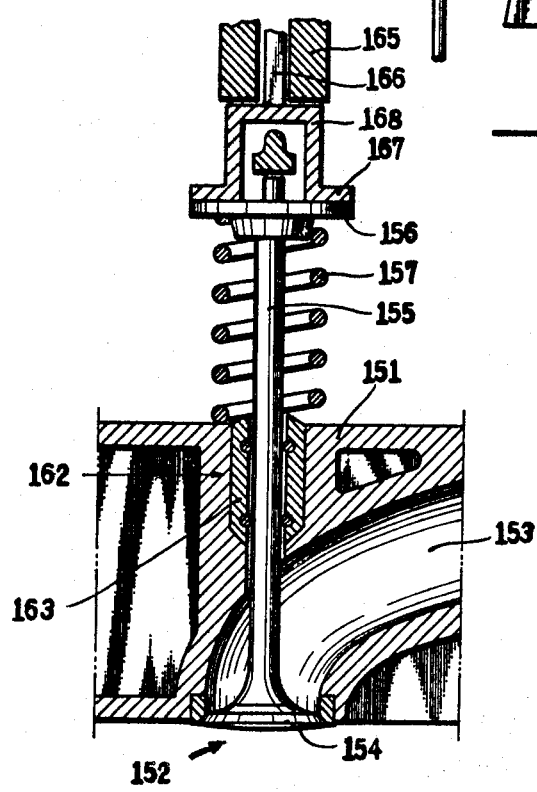
FIG. 47 is a sectional view of a modified example of an auxiliary valve-actuating mechanism provided on the valve mechanism.

FIGS. 47 and 48 show modified embodiments of the valve-spring reinforcing means 158, wherein the reinforcement of the valve spring is arranged to be achieved electrically. Referring to FIG. 47, the valve-spring reinforcing means comprises a solenoid 165, a shaft 166 inserted in the solenoid 165, a mounting member 168 having a flange 167 fixed around the end of the said shaft 166. The valve-spring reinforcing means shown in FIG. 48 comprises a horsefoot-shaped electromagnet 169 located out of contact with the rocker arm 161. When electromagnets are employed in the above embodiments, the means may be so constructed that signals can be fed from a breaker through an electrocic circuit only when the valve is closed.

When the engine is made to do a compression action by means of the auxiliary valve-actuating mechanism constructed as mentioned before, neither compressed air remained in the engine causes the exhaust valves to be closed incompletely nor the valves are opened at the time of closing. And this auxiliary valve-actuating mechanism may be operated at the time of the rotation of an engine at a high speed, improves followability of the motion of the valves and prevents the valves from surging, bouncing and jumping.

When the engine does a compression action, compression chambers are connected to the tank, and therefore there remains high temperature and high pressure air in the clearance volume, namely a slightest gap between the top of an compression chamber and a piston even when the pistons reach their top dead center. Accordingly, even when the suction stroke where the pistons come down from the top dead centers, suction will not be effected until the high temperature and high pressure air left in the clearance volume expands and the air pressure in the compression chambers becomes lower than that in the inlet pipe. In other words, air will not substantially be taken in through the inlet pipes until the pistons move a distance away from their top dead center and accordingly a suction stroke becomes substantially shorter and lowers charging efficiency remarkably in such a degree that the bigger the clearance of an engine is, for example in case of a gasoline engine, the more the degree is.

In order to eliminate such defects, high temperature and high pressure air left in the clearance volume must be exhausted outside in an instant to make a substantial suction stroke longer so that the force of suction inertia having influence on the air in the inlet pipe may be increased.

Referring to FIGS. 49 to 54, a description will be given in connection with a residual-gas exhaust valve which is used for achieving the said function.

Figure 49:
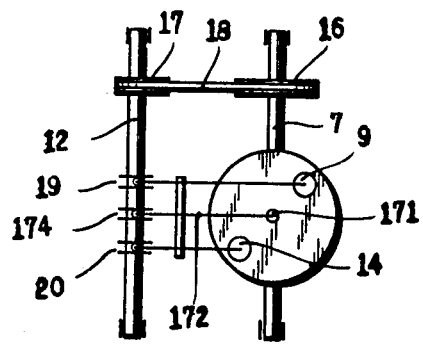
FIG. 49 is a schematical plan view of a compression cylinder provided with a residual-air exhaust valve.
Figure 50:
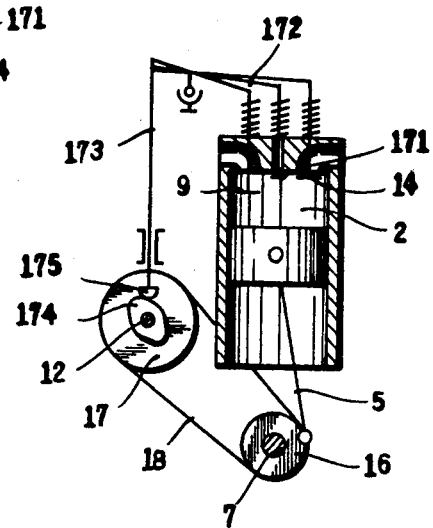
FIG. 50 is a sectional view of a compression cylinder provided with a residual-air exhaust valve.

FIG. 49 shows a residual-gas exhaust valve installed in a cylinder of the engine shown in FIG. 1, and FIG. 50 is a sectional view of FIG. 49.

Figure 51:
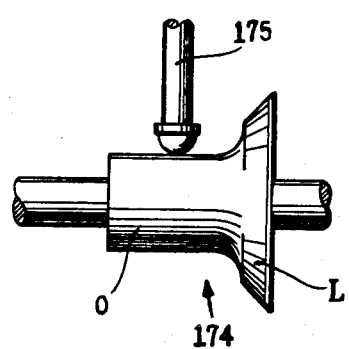
FIG. 51 is a front view of a cam for driving a residual-air exhaust valve for the 4-cycle engine.

The residual-gas exhaust valve 171 is provided appropriately in an intermediate part between the inlet valve 9 and the exhaust valve 14 and the residual-gas exhaust valve 171 is driven by the cam-shaft 12 through a rocker arm 172 and a push rod 173 as is the case with the above-mentioned inlet valves and exhaust valves. The said cam-shaft is provided with a cam 174 for the said residual-gas exhaust valve between the inlet cam 19 and the exhaust cam 20. The said cam 174 for the residual-gas exhaust valve is, as shown in FIG. 51, an inclined cam (the sectional view of which is similar to the one in FIG. 6) just as is the case with the cam 20K of an exhaust valve for an air compressor and drives a tappet 175 twice for one rotation of the cam-shaft. A cylindrical part O is adapted to keep the residual-gas exhaust valve 171 closed and brings the tappet 175 into contact with tye cylindrical part O when the engine is made to do an engine action.

Figure 52:
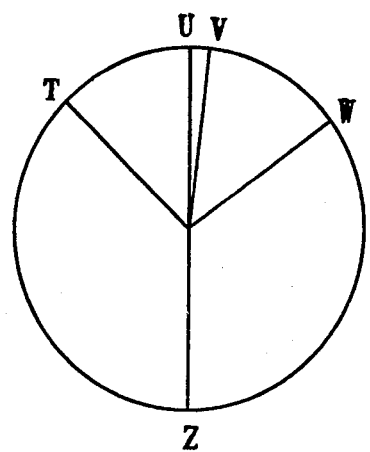
FIG. 52 is a valve timing diagram showing the valve timing of a compression chamber which is provided with a residual air-exhaust valve.

Each of the cams 19, 20 and 174 is so formed that opening and closing timing of the said residual-gas exhaust valve 171 for exhausting residual gas is, as shown in a valve timing diagram in FIG. 52, such that the exhaust valve 14 is opened at the time T when the air in the compression chamber 2 reaches a given pressure and closed when the piston 4 gets near its top dead center, and the residual-gas exhaust valve 171 is opened at the point U at the same time as the exhaust valve 13 is closed, and is closed at the time when or at a later time W than that when the air pressure in the compression chamber 2 becomes equal to the air pressure in the inlet pipe, and the inlet valve 9 opens at W when the air pressure in the compression chamber 2 becomes equal to that in the inlet pipe, . . . at W where a slight overlap may be allowable . . . and is closed on or after the piston's reaching its bottom dead center Z.

Figure 53:
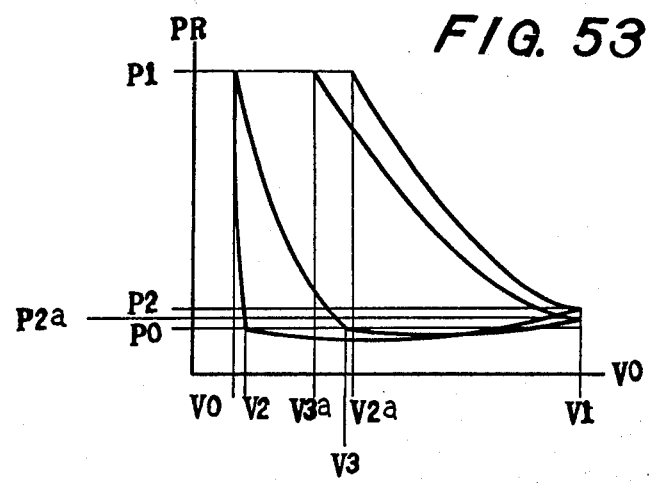
FIG. 53 is a P.V. diagram wherein a residual-air exhaust valve is provided to effect compression action.

Thus the high temperature and high pressure air left in the clearance volume has been exhausted outside by the residual-gas exhaust valve 171 when the engine does a compression action, and consequently, as shown in FIG. 53, the inlet valve of an engine with a residual-gas exhaust valve is opened when the volume is $V_2$ and the piston is slightly gone downward, whereas, in case of a compression action of an engine without a residual-gas exhaust valve, the inlet valve is opened when the residual air in the clearance volume of pressure $P_1$ and volume $V_0$ is adiabatically expanded until the air pressure becomes $P_0$ and the volume $V_{2a}$. Accordingly as the volume obtained by an actual suction stroke of an engine provided with a residual-gas exhaust valve ($V_1$-$V_2$) is larger than that of an engine without a residual-gas exhaust valve, suction inertia to be given to air in the inlet pipe increases and consequently the air pressure $P_2$ of an compression chamber of volume $V_1$ obtained at the end of a suction stroke of an engine provided with a residual-gas exhaust valve, that is, at the time when the piston at its bottom dead center Z closes the inlet valve 9 is higher than the air pressure $P_{2a}$ obtained with an engine without a residual-gas exhaust valve.

Accordingly, as the volume $V_3$ at the time when the air is compressed and reaches a given pressure $P_1$ is larger than the volume $V_{3a}$ of an engine without a residual-gas exhaust valve, the exhaust volume ($V_3$-$V_0$) per stroke is consequently larger than the exhaust volume ($V_{3a}$-$V_0$) of an engine without a residual-gas exhaust valve.

Figure 54:
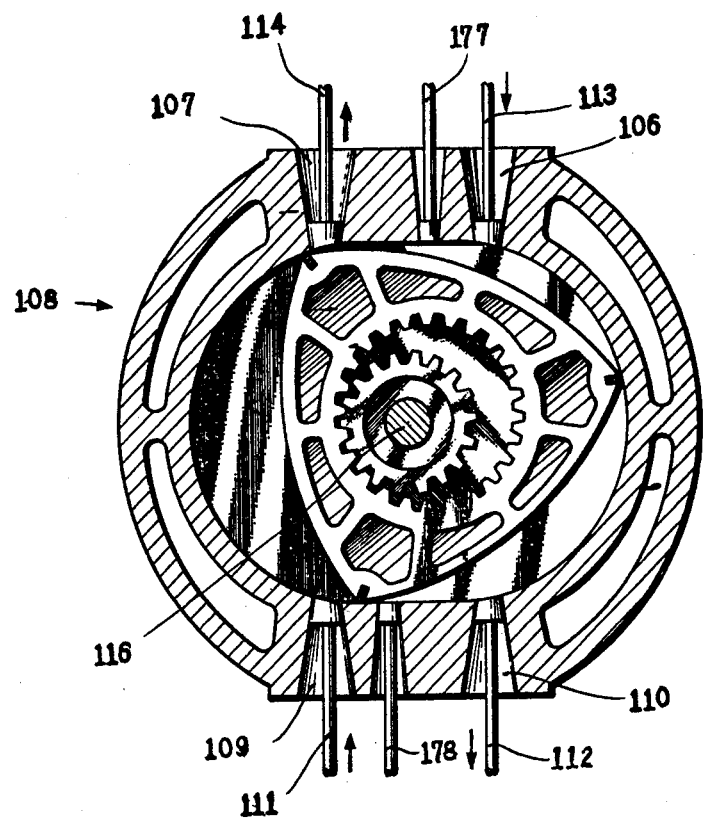
FIG. 54 is a schematical sectional-view of an example of the rotary engine which is provided with a residual-air exhaust valve.

Although the above is a description exclusively given in connection with a 4-cycle engine, a 2-cycle engine as well as a rotary engine can also be provided with a residual-gas exhaust valve when they are provided with an improved valve for compression action. A rotary engine shown in FIG. 54 is a rotary engine which is improved to do a compression action in FIG. 21 and is further provided with residual-gas exhaust valves 177, 178. The said residual-gas exhaust valves 177, 178 are driven once for one rotation of the eccentric shaft as is the case with the inlet and the exhaust valves 111, 112, 113 and 114 by cams which are provided anew for the residual-gas exhaust valves on the cam-shaft 115 for driving the said inlet valves and exhaust valves 111, 112, 113, 114. The inlet valve 113 and the exhaust valve 114 are, as mentioned before, kept opened during an engine action, when, however, the said residual-gas exhaust valve 177 should be kept closed. The opening timing of the residual-gas exhaust valves 177, 178, the valves 177, 178 being driven only when a compression action takes place, coincides almost with the time of the engine ignition during an engine action, most preferably with a time immediately after the rotar locates at the top dead center.

Thus, providing an engine with the residual-gas exhaust valves, an exhaust volume per stroke becomes more and high temperature and high pressure air remaining in the clearance volume is exhausted outside and consequently a rise in temperature in the compression chambers is moderated so that it may be possible to decrease the necessary cooling ability of a cooler. Further, supercharging action may be achieved by leading air to be exhausted into inlet pipes of the other group of the compression chambers.

When the engine is made to do a compression action, there will be no problem with all the compression chambers to be used as an air compressor, but when part of a plurality of compression chambers are employed for a compression action, the timing of the engine ignition may be miscarried and a change in torque is brought about, causing vibration. When part of an engine is expected to do a compression action, therefore, balance may be acquired by, for example, using an adjuster such as a servo-motor to maintain the fluctuation of torque as little as possible, by using a bigger fly-wheel to have a fluctuation of torque less, or by providing a balance parallel to the crank-shaft to interlock them through a gear wheel only when an air compression action takes place.

The engine installed in a motor vehicle constructed as mentioned above can be an air compressor as well as a control mechanism with a part of, or all of its compression chambers employed for compression action.

The following is a description of a control action of an engine whose compression chambers are all employed for a compression action.

When a driver operates the brake pedal (or the hand or finger brake lever) to slow down or stop a motor vehicle, an electric means (not shown) is actuated a while after a play, and some compression chambers of the engine work as an air compressor. In other words, operation of an electric control means causes the cam change-over mechanism to change the cams of some of the compression chambers into cams for a compression action and, at the same time, magnet valves of the carburetor and inlet pipes and exhaust pipes work successively so that some of the compression chambers may be supplied with air only. On further pressure of the brake pedal, the cam change-over mechanism for all the compression chambers works and magnet valves for dividing inlet pipes and exhaust pipes open so that the inlet-/exhaust flow paths leading to all the compression chambers may be converted into the paths for a compression action to slow down the motor vehicle rapidly. When the speed of the motor vehicle is reduced to a given speed, a speed-detecting means (not shown) functionates to forward signals to the electric control means, making the engine go idling and then get it back to do an engine action. In other words, after a considerable amount of kinetic energy of an engine is absorbed by compression action, a compression action is changed into an engine action. On further pressure of the brake pedal, a friction brake is actuated while the speed-detecting means is still working so that the motor vehicle may be stopped by its engine doing engine action.

In the case of an engine having a single compression chamber and a single cam change-over mechanism, simultaneously with the operation of the electric control means, the engine turns into an air compressor, giving a strong control power to the vehicle at a time.

Next, description is made on some usages of compressed air obtained by the compression action of the engine as described in the above.

When an air motor is used as a self-starter in vehicles compressed air may be applied for driving the air motor, while when a hydraulic motor is used it may be applied for driving the hydraulic motor through an hydraulic booster or the like.

Further, compressed air may be used by being injected through a residual-gas exhausting force valve into the engine for, instead of driving a self-starter as mentioned above, starting an engine which has been stopped, or operating continuously the engine, which is helpful to reduce fuel consumption and exhaust gas.

When high pressure air obtained by operating an engine as a double compression air compressor is exerted to an air outlet as back pressure, extremely strong brake power is applied to the engine.

When the air tank is filled completely with compressed air generated in large quantity, excessive air should be ejected directly onto the engine or ejected through the ejector onto it to be used for cooling the engine. Further, excessive air will be stored in a spare tire or a frame of the vehicle or the like, if it is transformed beforehand into an auxiliary tank.

It is also possible that the vehicle is provided with a new ejector unit through which compressed air is flowed to do vacuum action, whereby the auxiliary control unit of the vehicle having inclination to be vacuum-adsorbed onto the surface of roads may be operated. Additionally, when the engine is used as an air compressor, it can be actuated as a vacuum pump and be applied to a fire engine, a vacuum car or the like.

Further, as the compressed air still possesses a little pressure even after having been used for the said vacuum action or air tools, it can be re-used for supercharging the engine of the combination engine and air compressor apparatus.

As for a modified embodiment of a residual gas exhausting force valve or the use thereof, a sub inlet valve of a torch-typed engine is used as a force valve and such a cam as shown in FIG. 20 is used to change strokes of the sub inlet valve and is adapted to open and close the passage between the sub combustion chamber and the main combustion chamber, whereby the cylinder clearance is reduced and the residual gas is exhausted. Further, it is also possible to start up the engine by injecting compressed air through the sub inlet valve into the engine.

With a double-overhead camshaft-typed engine provided with a new residual gas exhausting force valve, it is also possible that the inlet valve and the exhaust valve are both actuated as inlet valves to let the force valve work as an exhaust valve, or the inlet valve and the exhaust valve are both actuated as exhaust valves and compressed air is injected at a proper time through the force valve into the engine to actuate the valves as starting valves which will start up the engine. In the case described hereinbefore, however, the piping and the like should be changed properly to meet the arrangement.

Figure 55:
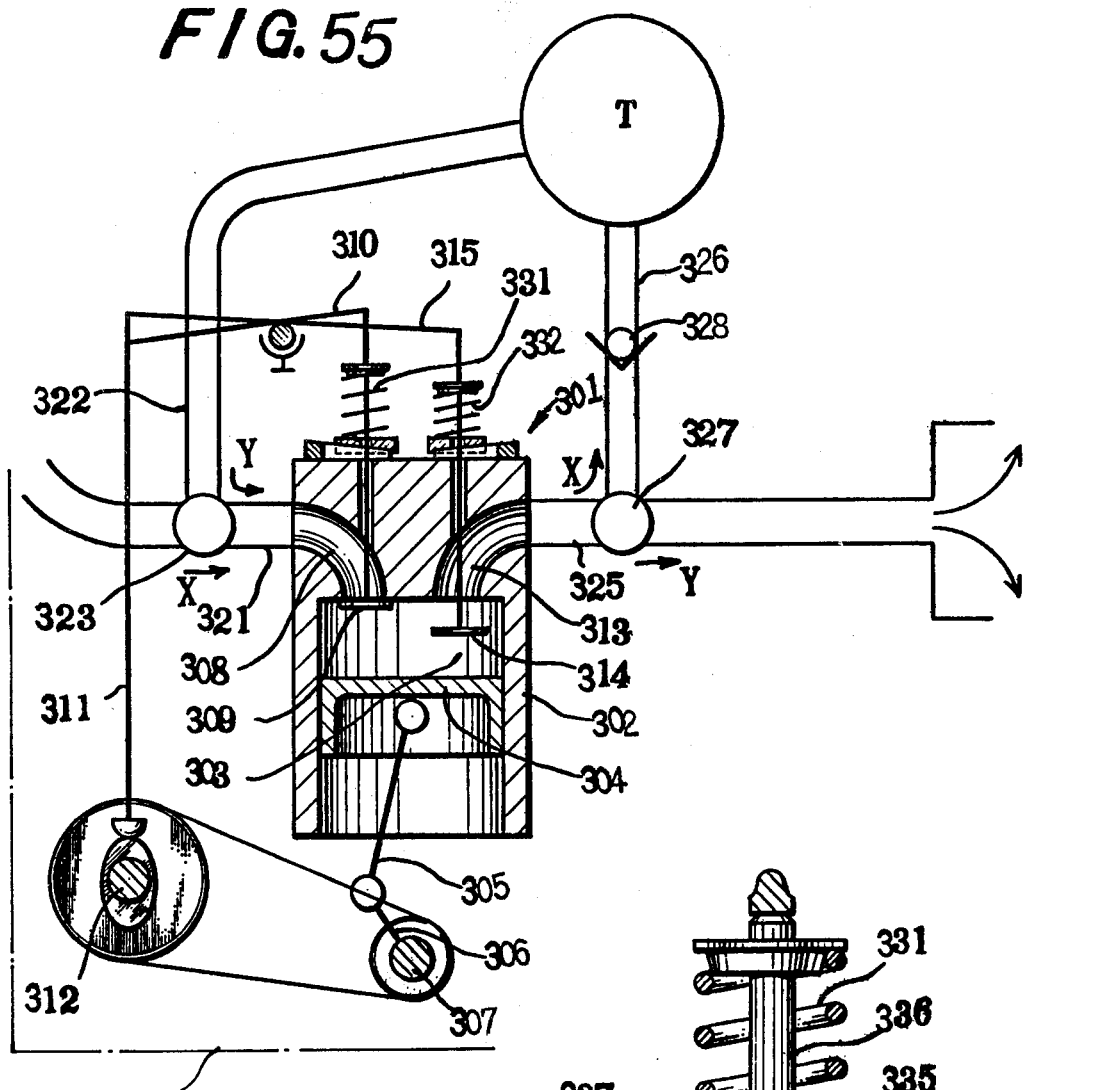
FIG. 55 is a schematic view showing a compression chamber in an engine of the present invention.
Figure 56:
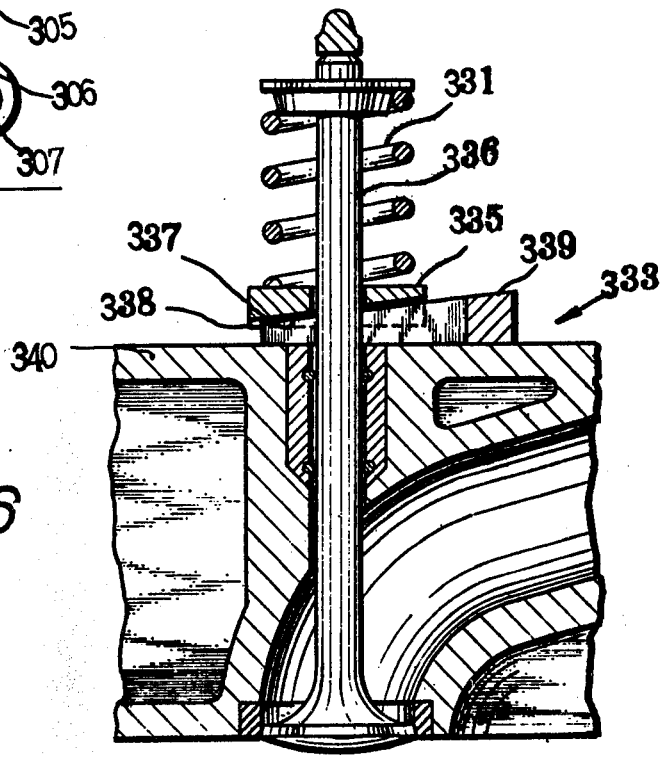
FIG. 56 is a section of a cylinder head showing a means for adjusting spring force.

Referring to the appended drawings, FIG. 55 illustrates a first typical embodiment of an engine mounted on a vehicle V according to the present invention, wherein numeral 301 indicates a 4-cycle gasoline engine with a number of chambers longitudinally sectioned for the purpose of illustration, said engine being adapted to serve as an air-compressor by stopping fuelling, and supplying only air, though such structure is not shown.

Numeral 302 indicates a cylinder providing a compression chamber 303, in which a piston 304 is connected through a connecting rod and a crank arm 306 to a crank shaft 307.

Numeral 308 indicates an inlet port opened and closed by an inlet valve 309 which is driven through a rocker arm 310 and a valve push rod 311 and others by a cam shaft 312. 313 indicates an exhaust port opened and closed by an exhaust valve 314 which is driven through a rocker arm 315 and a valve push rod (not shown) and others by said cam shaft 312, similarly to the inlet valve 309. Said cam shaft 312 can make half a revolution per one revolution of the crank shaft 307 and be axially displaced by a displacing means. Each of a cam for suction and a cam for exhaust provided on the cam shaft 317 has a cam portion for engine action and another cam portion for compression action, and the valve timing can be changed by axially displacing the cam shaft. As said cams for the inlet and exhaust valves, used are, for example, cams similar to a cam 365 for an inlet valve and a cam 366 for an exhaust valve mentioned below in the description of the second embodiment. In this case, however, a cylinder section 369 of the cam 365 is made in the same form with an air motor section 374 of the cam 366. The cam portion for compression action is adapted to change the 4-cycle engine into 2-cycle engine involving suction and exhaust steps, and make overlap to 0 or close to 0. And in case the engine serves as an air-motor, the valve is driven by means of said cam portion for compression action.

A pipe 322 is connected to an inlet pipe 321 which is communicated with the inlet port 308. The pipe 322 is communicated with an air tank T for storage of compressed air obtained by compression action of the engine. In the air tank T, 8–10 kg/cm$^2$ in case of an engine serving as an air-compressor of 1 step compression type, and 20–30 kg/cm$^2$ in case of a Diesel engine serving aas 2 step compression type, of air is contained. The inlet pipe 321 and the pipe 322 are connected through a 3-way magnet valve 323 to each other, and adapted to supply the inlet port 308 with mixed gas of fuel and air, air only or high pressure air. The 3-way magnet valve 323 is operated by an operating means.

A check valve 328 is provided on said pipe 326 so that high pressure air in the air tank T is prevented from flowing to the exhaust port.

The pipe 326 communicated with the air tank T is connected through a 3-way magnet valve to the exhaust pipe 325 communicated with the exhaust port 313.

In case of making the engine 301 to take a compression action, by operating the operating means thus communicating 3-way magnet valves 323, 327 with each other in the X direction and converting the valve-timing to that for compression action.

Air having passed through a carburetor is supplied through the inlet port 308 into the chamber 302, and compressed therein and then supplied through the exhaust port 313 and 3-way magnet valve 327 into the air tank T to be stored therein.

In case that the engine is operated to positively rotate as an air-motor, 3-way magnet valves 323, 327 are communicated in the Y direction by operating the operating means, and the inlet valve and the exhaust valve are operated at the same timing with that of compression action.

When the flow takes Y direction through the 3-way magnet valves 323, compressed air (having pressure of 8–10 kg/cm² or 20–30 kg/cm²) in the air tank T flows to the inlet port 308, and is supplied into the chamber 302 by opening the inlet valve, then pushing down the piston 304. Energy of the high pressure air is consumed for operating the piston, and then discharged out through the exhaust pipe 325 by opening the exhaust valve 314.

Preferably the said selective operating of the engine as an engine, a compressor or as an air-motor is in interlocking connection with an acceleration pedal and a braking pedal or is changed-over by means of finger-lever. In other words, when starting the vehicle by stepping the acceleration pedal, the engine is made to momentarily work as an air-motor thereby starting-up the vehicle, and then to take an engine action, or to continuously work as an air-motor in a short time for travelling in a short distance and then to take an engine action for normal travelling.

And, when the vehicle is braked by stepping the braking pedal, engine is made to momentarily take a compression action, and kinetic energy belonging to the vehicle and the engine is converted into energy for compressing air, thus braking the vehicle and at the same time obtaining compressed air.

Further, during the car stopping or parking, half a plurality of chambers are made to take compression action, thus storing compressed air in the air tank. For this purpose, an operating means is adapted to manually carry out this operation.

Further, in case of using the engine as an air motor, it is possible that half a plurality of chambers are for an air motor action, while the other half are for an engine action. After operating said chambers for an air motor action for a short time, said chambers for an engine action are fuelled to take an engine action, so that the chambers for an engine action are driven at a given rotation rate and the vehicle runs at a low speed, when said air motor section of the engine can be subject to unloaded rotation by stopping supplying said section with high pressure air, air and fuel.

In the abovementioned embodiment, in case of an engine with five or more cylinders, an inlet valve of any one of said cylinder is opened, so that said chamber can be supplied with high pressure air thus easily affording to be operated as an air motor. However, in case of an engine with four or less cylinders, and especially with a single cylinder, a piston sometimes stops at the upper or lower dead point, thus causing an inlet valve to be closed.

Therefore, a decompression device (not shown) is provided for opening such a closed valve so as to make the engine to take an air motor action. In this case, the decompression device is not a device for pressure reduction but for pushing down a valve stem of the inlet valve to introduce air and for momentarily opening the inlet valve of the engine set for an air motor action so as to compulsorily introducing high pressure air into a chamber thus rotating a crank shaft. In case that said crank shaft rotates in the positive direction, the inlet valve can take a normal opening and closing operation thereby immediately working as an air motor. On the contrary, in case that said crank shaft rotates in the reverse direction, said inlet valve is opened during the piston being raised and high pressure air injected through an inlet port causes the piston to be lowered, so that the rotation of the crank shaft turns into the positive direction.

In case of an engine with two or four cylinders, a piston of any one of said cylinders stops at the upper dead point even when the piston stops at a dead point, a crank shaft can be rotated a little. But in case of an engine with a single cylinder, a piston possibly stops at the lower dead point. Therefore, in case of an engine with a single cylinder, said engine is made to have such a construction that a little volume of low pressure air can be injected through an air exhaust port of a crank chamber. And there, a decompression device is operated after a piston is once displaced to the upper dead point. Numerals 331, 332 indicate spring force adjusting means for changing each spring force of a valve spring 333 of the inlet valve 307 and a valve spring of the exhaust valve 314. This is because it is necessary to adjust spring forces for sure opening and closing of the valves, since the engine takes three different forms of actions, i.e. engine action, compression action and air-motor action so that exerted on the inlet and exhaust valves is different force from that in only normal engine action.

In other words, in a compression action and a reversely rotating air-motor action, the exhaust pipe 325 is closed by the 3-way magnet valve 327, so that high pressure air stays between the 3-way magnet valve 327 causing the exhaust valve 314 to open. Further, in positively rotating air-motor action, high pressure air from the air-tank T flows through the pipe 322 into the inlet pipe 331, exerting force to open the inlet valve 309. Therefore, the stretching force of the valve springs 333, 334 is decreased so that full closing of the inlet and the exhaust valves are unobtainable. This results in demand for a means for perfectly closing the valves against such back pressure. Further, on the contrary, in case of changing valve timing, a cam section in contact with a valve tappet have to be changed from a cam section for an engine action into one for a compression action by displacing a cam shaft. Such transferring of the tappet is facilitated by forming said cam section into an inclined cam. But if the valve springs 333, 334 are strong, large force is required for displacing said cam shaft 312. Therefore, in such a case, preferably the spring forces of the valve springs are small. A means for adjusting spring forces is provided so as to make strong the spring forces of the exhaust valve spring during a compression action, and that of inlet valve spring during an air motor action, while making the spring forces of both the valves to be of middle strength during an engine action and of reduced strength during displacement of the cam shaft.

Numeral 335 indicates a circular plate fitted into a valve stem 336 and adapted to receive the valve spring at the upper surface thereof. On the lower surface of said circular plate, provided is a channel 338 having an inclined face 337. Into said channel 338, inserted is a wedge 339 formed into a fork like shape, and movable perpendicularly to the displacement direction of the valve stem 336. Said wedge 339 is adapted to raise and lower said circular plate 335 by being displaced by means of an air cylinder (not shown). Said air cylinder can move said circular plate vertically by three steps. The spring force is adjusted for an engine action when the circular plate is in the middle step, for a cam change-over action when the plate is the lower step and for an compression action or an air motor action when the plate is in the upper step. Air cylinders of the means 331, 332 for adjusting the spring forces are driven simultaneously when the circular plate is displaced to the middle and the lower steps, and separatedly when the plate is displaced to the upper step.

In a modified embodiment of said means for adjusting spring force, said circular plate 335 and said wedge 339 are replaced by a ring-shaped air cylinder fitted to the valve stem 336 and fixed on the cylinder head 340, and the spring forces of the valve springs are changed in accordance with the amount of displacement of a cylinder rod. Further, said means for adjusting spring force may be applied for an engine not adapted to serve as an air compressor, and also may be used as a means for increasing spring force to ensure the opening and closing operation of a valve at the time of an engine rotating at a high speed. The second embodiment of the present invention is shown in FIGS. 57–63, in which compressed air is supplied in a different manner from that of the first embodiment. In other words, in this embodiment the third air port and valve are newly provided for actuating the engine with air, while in the first embodiment the engine is operated as an air motor by supplying compressed air through the inlet port and the exhaust port provided on the engine. Numeral 351 indicates an air port constituting said third air port formed between the inlet port 308 and the exhaust port 313 and adapted to be opened and closed by means of a valve 352. Said air port 351 is also a residual gas exhaust port for exhausting residual gas in the clearance volume.

In a breeches pipe 353 that is connected to said port 351, one branch 354 is connected to either free air or a supercharger, while the other branch 355 to a high pressure tank that contains a compressed air of approximately 20 to 30 kg/cm$^2$ (possibly 8–10 kg/cm$^2$). On the branch 355 provided are an opening and closing valve 357 for supplying high pressure air from the tank T to the air port 351, and a check valve 358 for supplying high pressure air from the air port 351 to the tank T. The compressed air in said tank has been obtained by the compressor action of engine, which can be alternatively supplied from exterior. A three-way magnet valve 356 is provided at the branching of the breeches pipe 353, which switches the air flow between branches 354 and 355.

FIGS. 58 to 61 give a cam 359 actuating the valve 352, which cam comprises a cylindrical segment 360 that never pushes the tappet, a cylindrical segment 361 that always open the valve 352, a start-up segment 362 that actuates the valve 352 during a period corresponding to approximately the explosion stroke in the engine action, an air-motor segment 363 that actuates said valve during a period corresponding to the explosion and suction strokes, and a residual-air exhaust segment 364 that actuates said valve to displace the residual air during a period of engine compressor action.

FIGS. 62 and 63 illustrate a suction cam 365 and an exhaust cam 366. The suction cam 365 comprises an engine action segment 367 with a taper cam profile and a compressor action segment 368, and an additional cylindrical segment 369 that never actuates the suction valve. The exhaust cam 366 comprises an engine action segment 371, cylindrical segments 372, 373 that never actuate the exhaust valve, an air motor segment 374 that opens the exhaust valve in a period corresponding to the engine exhaust and compression strokes as the air motor segment 363 actuates said valve 352, and a compressor action segment 375. It is noted that end surfaces of engine action segments 367, 371 are shaped nearly equivalent to that of the start-up segment 362 of the cam 359 as illustrated in FIG. 59, while end surfaces of compressor action segments 368, 375 and the air motor segment 374 to that of the air motor segment 363 of the cam 359 as illustrated in FIG. 60. And the 3-way magnet valve 356 is opened so as to pass the flow in X direction only when residual air is to be discharged out in the atmosphere.

A magnet valve provided to control the flow of the compressed air injected from the high pressure tank T through the branch 355 into the air port 351 is so designed that such magnet valve is kept open only when the tappet is in contact with the start-up segment 362 and the air motor segment 363.

The cam shaft 376 that is fitted with the cam 369 actuating said valve 352 is provided independent of the cam shaft 377 that if fitted with the suction cam 365 and the exhaust cam 366. Each cam shaft is shifted at five steps by the action of either hydraulic or electric cam change-over mechanism to select proper cams.

During the start-up of engine action, tappets are in contact with the start-up segment 362, the engine action segments 367 and 371.

As soon as the cam 359 is shifted so that the tappet gets in touch with the start-up segment 362, a compressed air of some 20 to 30 kg/cm$^2$ flows into each compressor chamber of the engine to start-up. The cam 369 is shifted back thereafter to switch over to the cylindrical segment 360 for the ordinary engine action.

When the engine is operated as an air motor without supply of fuel (the fuel cannot be supplied in cases of gasoline deficiency or occurrence of inflammable gas), tappets are in contact with the air motor segment 363, the cylindrical segment 369, and the air motor segment 374 so that compressed air is injected into the compression chambers twice as often as it is during the start-up to continuously run the engine.

When the engine is operated as a compressor, tappets are in contact with the residual air exhaust segment 364 and the compressor action segments 368 and 375, so that the 4-cycle engine works as a 2-cycle air compressor with the residual air being displaced through the port 351. When only the cam 369 is shifted in this configuration to make the tappet get in touch with the cylindrical segment 361, the valve 352 is kept only slightly opened to serve as an unloader means.

Further, an air motor action is started-up by momentarily opening the air port 352 by means of a decompression device provided similarly to the first embodiment. Numeral 381 indicates a braking apparatus mounted on the rear bottom surface of a vehicle body. The apparatus 381 comprises a suction device 383 disposed in contact with a trevelling surface 382, a supporting member for pivotally mounting said suction device 383 on a vehicle body, a vacuum means (not shown) for letting out air between said suction device 383 and said travelling surface 382 and a flexible pipe 385 for letting out said air, and a hoisting means 386 for hoisting the suction device 383.

A body of the suction device 383 is provided therein with a plurality of balls 388 and springs for making each of said balls 388 extruded from the lower surface of the body 387. Each of a plurality of holes 390 in the body 387, in which each of said balls is disposed, is a little larger than the ball in diameter, and is so designed that only a part of the ball surface is extruded.

The balls 388 and the holes 390 may be so designed that their diameters are gradually decreased from the front portion to the rear portion of the suction device 383, thereby affording to more effectively absorb shock resulting from dropping of the device 383. Said holes 390 are communicated with a pipe 391 connected through a pipe 391 to the vacuum means.

Referring now to FIG. 66, the suction device is so adapted that the balls 388 can be vertically raised. On the other hand, in FIG. 67, the suction device is so adapted that the balls can move rearwardly and upwardly with respect to the travelling direction of the vehicle, the movement of each ball is within a scope from the position at which a part of the ball is a little extruded from the lower surface of the body of the device 383 to the position at which the ball surface is substantially coplanar with the lower surface of the body 387 of the device 383 (as shown in imaginary line). The balls 388 serves as valves for the pipe 391, and when the balls are raised, the pipe 391 comes into communication with the outside of the suction device.

The supporting member 384 is pivotally mounted at the one end thereof on the vehicle body, while the other end is connected through a pivotal connecting means such as a hinge to the suction device 383.

The vacuum means is connected through an air ejector to an air tank T, and adapted to provide the ejector with compressed air obtained by an air compression action of an engine, and then to take out air from the pipe 385.

According to this method, braking force resulting from a compression action of an engine is exerted on a vehicle, and further a braking device is driven by compressed air obtained in said compression action, so that strong braking can be achieved without any energy source for operating them. Alternatively, by newly providing a vacuum tank and an ejector disposed on a part of an exhaust pipe of the vehicle, and keeping said vacuum tank always in a vacuum state by using exhaust air of the vehicle or air used in an air motor action of the engine, suction force can be applied on the suction device by means of said vacuum tank.

Said vacuum means is provided with means for releasing or locking vacuum state thereof. The hoisting means 386 is adapted to hoist wire rope secured to the body 387 of the suction device 383 by means of a winding device which is preferably able to be operated at the driver's stand and driven by air pressure. Numeral 392 indicates a duct guard provided at the front end of the suction device 383. Numeral 393 indicates a wheel for buffering dropping shock of the device 383. Further, in FIG. 68, illustrated is a supporting means having a modified supporting member and hoisting means. Numeral 400 indicates a linking means, a link 401 of which is pivotally supported at one position by the body 387 and the upper end thereof is connected to a cylinder 402. Said cylinder 402 is adapted to hoist the suction device 383 by introducing high pressure air thereinto and to lower it by letting said air out through a 3-way magnet valve (with a help of extension force of a spring 403).

The operation of the apparatus is as follows.

On putting on a dive brake, the winding means operates and the braking apparatus 381 drops onto the travelling surface 382. Firstly the balls 388 come into contact with the travelling surface 382, and then the lower surface of the suction device 383 contacts with said travelling surface, while dropping shock is absorbed by the spring 389, so that the pipe 391 becomes communicated with a space defined between the suction device and the travelling surface. Simultaneously with the dive brake put on, the engine takes an compression action and compressed air operates the vacuum means to take air out of the pipe 385, the pipe 391 and the space between the suction device and the travelling surface thereby bringing them into a substantially vacuum state. Thus suction force is exerted and the suction device is suckedly attached to the travelling surface, so that braking force and body lowering force are exerted on the vehicle. The suction device is dragged on the surface till the braking force causes the vehicle to stop.

Referring to FIGS. 69-72, the structure of an engine adapted to serve as an air compressor according to the present invention is shown by way of an engine provided with double overhead cam shaft and an example and mounted on a vehicle V.

An engine 501 is provided with a known transmitting means 504 for transmitting rotation of a crank shaft to cam shafts for an engine action, and besides, another transmitting means 505 for transmitting rotation of the crank shaft to the cam shafts for an air compression action, further a means for changing over said two transmitting means and changing inlet and exhaust passages and others. Each of said transmitting means 504, 505 is adapted to operate a cam shaft 6 for an inlet valve or a cam shaft 57 for an exhaust valve respectively.

An engine provided with double overhead cam shafts is usually used for high speed travelling, in which engine, valve opening angle of the cam is very large e.g. 140° and overlapping angle is about 50°. Said transmitting means 505 is a means for eliminating such an overlapping and changing valve-timing at a desired time.

Said transmitting means 504 for an engine action comprises sprockets 509, 510, 511 each of which is rotatably fitted into a crank shaft 508, a cam shaft 506 or a cam shaft 507 respectively, electromagnetic clutches 512, 513, 514 for engaging said sprockets 509, 510, 5111 with the corresponding shaft 508, 506, 507 at a predetermined position respectively and a chain 515 for simultaneously rotating said sprockets 509, 510, 5111 in one direction. By passing electric current through said magnetic clutches 512, 513, 514, said cam shafts 506, 507 are operated, the rotation angle of said cam shafts with respect to said crank shaft 508 being the same with that of each cam shaft of the conventional engine. In other words, the transmitting means 504 for an engine action provides the cam shafts 506, 507 with valve-timing for an engine action.

Similarly to the transmitting means 504 for an engine action, the transmitting means 505 for an air compression action comprises sprockets 516, 517, 518, electromagnetic clutches 519, 520, 521 and a chain 522.

Two embodiments can be referred to here for achieving an air compression action of the engine 501. In the first embodiment, compressed air is taken out through an exhaust pipe 525 of the engine 501 as shown in FIG. 70, while in the second embodiment, an air port 528 is formed between an inlet port 526 and an exhaust port 527 and compressed air is taken-out through an automatic exhaust valve 529 provided in said air port 529.

Referring to FIG. 70, the first embodiment is now described below. The sprocket 516 of the transmitting means 505 has the same diameter with the sprockets 517, 518, and adapted to rotate each of the cam shafts 506, 507 with the same rotation frequency with that of the crank shaft 508. Thereby the inlet and exhaust valves are opened and closed once per a rotation of the crank shaft 508, so that the 4-cycle engine is given a valve-timing of a 2-cycle air compressor. Said valve timing is controlled by means of the electromagnetic clutches 520, 521. The electromagnetic clutch 520 is adapted to mount the sprocket 517 on the cam shaft 506, so that exhaust step is carried out at a timing a little delayed with respect to the corresponding timing in an engine action and after a piston is brought into a lowering action from the upper dead point.

On the other hand, the magnetic clutch 521 provided on the cam shaft 507 for the exhaust valve 532 is adapted to mount the sprocket 518 on the cam shaft 507, so that the exhaust valve 532 is closed when the piston reaches the upper dead point.

Further, the engine of the first embodiment may be so adapted that the difference between an engine action and an air compression action is made to consist only in their rotation frequencies, by providing only two electromagnetic valves 512, 519 and fixing the sprockets 511, 513, 517, 518 on the cam shaft 506, 507, 512 respectively.

An inlet pipe 524, which is communicated with an inlet port 526, is connected to a pipe 535 which leads to an air tank T for storing compressed air obtained by a compression action of the engine, said air tank T being able to store therein 8–16 kg/cm$^2$ of air in case of making the engine serve as a 1-step air compressor, and 20–30 kg/cm$^2$ of air in case of making the engine serve as a 2-step air compressor and in case of the engine being a Diesel engine.

Said pipe 535 is connected through a 3-way magnet valve 536 to said inlet pipe 524, and adapted to supply therethrough the inlet port 526 with mexed gas of fuel and air, air only or high pressure air. The 3-way magnet valve 536 is operated by an operating means.

A pipe 537 communicated with the air tank T is connected through a 3-way magnet valve to the exhaust pipe 525 communicated with the exhaust port 527.

A check valve 539 is provided on said pipe 537 so that high pressure air in the air tank T is prevented from flowing to the exhaust port.

In case of the engine taking a compression action, by operating the operating means, the 3-way magnet valves 536, 538 are so opened that air flows in the X direction, and by demagnetizing the electromagnetic clutch 512 and magnetizing the electromagnetic clutch 519, the valve timing is converted into that of compression action.

Air having passed through a carbureter is supplied through the inlet port 526 into a chamber, and compressed therein and then supplied through the exhaust port 527 and 3-way magnet valve 538 into the air tank T to be stored therein.

Besides such an air compression action, the engine of the first embodiment of the present invention provided with the abovementioned structure can also be operated as an air motor for driving a crank shaft.

In case of the engine being operated to rotate in the normal direction as an air motor, 3-way magnet valves 536, 538 are opened so that air flows in the Y direction by operating the operating means and the inlet and exhaust valves are operated at the same timing with that of compression action.

When the flow takes Y direction through the 3-way magnet valves 536, compressed air (having pressure of 8–16 kg/cm$^2$ in case of a gasoline engine or 20–50 kg/cm$^2$ in case of a Diesel engine) in the air tank T flows to the inlet part 526, and is supplied into the chamber 502 by opening the inlet valve, then pushing down the piston. Energy of the high pressure air is consumed for operating the piston, and then discharged out through the exhaust pipe 525 by opening the exhaust valve 532.

On the other hand, in case of operating the engine to rotate in the reverse direction as an air motor, the 3-way magnet valves 536, 538 are opened in the X direction and compressed air is supplied through the pipe 537 and the exhaust port 527 into the chambers and then discharged out through the inlet pipe 524.

Referring now to FIG. 71, the second embodiment is now described below.

Similarly to the first embodiment, the magnet clutch 520 of the transmitting means 505 is adapted to mount the sprocket 517 on the cam shaft 506 so that the inlet valve 531 is opened when the piston is lowered from the upper dead point.

The sprocket 518 of the cam shaft 507 opens the exhaust valve when the piston is lowered from the upper dead point at the time in correspondence with the explosion step of an engine action, said sprocket 518 being engaged with the magnet clutch 521 at the position suitable for such valve-opening.

The sprocket 516 has a diameter of half a diameter of the sprocket 517 or 518. In an air compression action, the inlet and exhaust valves are alternatively opened once per two rotations of the crank shaft 508 while the piston is being lowered. However, by making the gear ratio between the sprocket 516 and each of the sprocket 517, 518 1:1, thus rotating each cam shaft once per a rotation of the crank shaft, the inlet and exhaust valves are simultaneously opened at the times in correspondence with suction step and explosion step of an engine action, so that increased amount of air can be sucked.

In an air compression action, the exhaust valve is supplied with air only through an altered suction passge mentioned below and take a suction action.

The automatic exhaust valve 529 is provided on each cylinder head of the engine 501, adapted to be closed by means of an oil pressure, air pressure or electric means in an engine action and to automatically exhaust air compressed to a predetermined pressure in the cylinder in an air compression action, an exhaust port 528 of said automatic exhaust valve being connected through a duct to the air tank T. As said automatic exhaust valve, for example, an air charge valve can be applied.

Referring now to FIG. 72, operation and inlet and exhaust passages of the second embodiment are described below. During an engine action, in the engine 501, the transmitting means for an engine action is operated, a mixed gas sucked through a carburetor 540 and the inlet pipe 524 into each of the cylinders is combusted and then discharged through the exhaust pipe 525 and an exhaust gas port 541.

On changing-over an engine action to an air compression action, the magnetic clutches 512, 513, 514 are demagnetized and instead thereof the magnetic clutches 519, 520, 521 are magnetized to change rotation angle of the cam shafts for inlet and exhaust valves, thus opening a 2-way magnet valve 542, then closing a 2-way magnet valve 543 and a magnet valve (not shown) for closing a fuelling pipe in the carburetor 540 so that the inlet passage is changed and the pressure of a pressing means 544 having closed the automatic exhaust valve 529 by oil or air pressure is released. In such a state, air having passed through the carburetor 540 and the inlet and exhaust pipes 524, 525 is sucked through the inlet and exhaust ports into the cylinder till the predetermined pressure is obtained, and then exhausted through the automatic exhaust valve 529, a manifold and a check valve 546 into the air tank T then to be stored therein.

In the second embodiment, a magnetic clutch is provided at each position of a sprocket in order to decrease rotation noise and torque consumption of sprockets out of use during an action, but at least three sprockets are sufficient for such purpose and the positions of said sprockets may be variously changed. Further, by dividing both of the cam shafts into two in a proper proportion (for example, 3:3 in case of 6 cylinders), and providing a magnetic clutch (as shown in imaginary line in FIG. 69) at such divided position for free connection with each other, a part of the engine (the left three cylinders in FIG. 69) can be operated to take an engine action with the other parts (the right three cylinders in FIG. 69) operated to take an air compression action. In such a case, the inlet and exhaust passages are suitably changed.

The structures of the first and second embodiments can be applied to all the engines with double cam shafts of either a side valve type or an overhead valve type, and also to gasoline engines and Diesel engines.

Further, an engine provided with double overhead cam shafts if of a high speed travelling type and has small inertial mass, so that in case of the engine being operated as an air compressor inlet and exhaust valves are opened and closed two times in number the opening and closing operations in an engine action, but jumping, bouncing, surging or the like is prevented.

Referring now to FIGS. 73-80, the third embodiment of the present invention is shown for illustration of operation of an engine mounted on a vehicle for an air compression action.

An engine 551 is so adapted that only the right three cylinders are operated for an air compression action by supplying them with air only.

The engine 551 operates in five forms—all cylinders being operated for an engine action, the left three (the first set of) cylinders 552 being for an engine action with the right three (the second set of) cylinders 553 for an air compression action, said first set being operated as an engine to be supercharged with said second set as a supercharger for supercharging said first set, and the first set being operated as an engine with the second set in a no-load state.

A cam shaft 554 of said first set of cylinders 352 is adapted to be axially moved by a means for changing-over the position of the shaft by three steps while the second set 553 is axially moved by a two step change-over means. Further, the end portion of the cam shaft 554 adjacent to said cam shaft 555 is cylindrical and rotatably and slidably supported through a bearing by the engine body. On said cylindrical end portion of the cam shaft 554, the cam shaft 555 is rotatably and slidably supported.

Referring to FIGS. 74, 75, shown are a cam 557 for an inlet valve and a cam 558 for an exhaust valve provided on the cam shaft 554 of the first set 552.

The cam 557 for the inlet valve is provided with a normal cam section 559 for normal overlapping and a supercharging cam section 560 with increased overlapping. In other words, said supercharging cam section 560 is provided for the purpose of making an overlapping angle relatively large so as to open the inlet valve before the exhaust valve being closed, blowing away residual gas in the clearance volume at the end of exhaust step with newly introduced air to replace the former by the latter for increasing sucked air in amount, increasing the mean effective pressure and thus increasing power.

The cam 558 for the exhaust valve is also provided with a normal cam section 561 and s supercharging section 562. Said four cam sections 559, 560 561 562 have a different valve-timing respectively, but all substantially in the same form as the supercharging cam section 560 shown in FIG. 75.

Referring to FIG. 76, shown is a modification of the cam 557 for the inlet valve or the cam 558 for the outlet valve, in which a normal cam section is adjacent to an supercharging cam section.

Referring to FIGS. 77-84, shown are a cam 565 for the inlet valve and a cam 566 for the exhaust valve provided on the cam shaft 555 for said first set of cylinders.

The cam 565 for the inlet valve comprises, as shown in FIG. 78, an engine action segment 565E (with the same sectional form of said normal cam section 559) which is adapted to open the inlet valve once per a rotation of the cam shaft, and an air compression action segment 565C adapted to open the inlet valve two times per a rotation of the cam shaft.

The cam 566 for the exhaust cam is provided with an engine action segment 566E, a 1-step compression action segment 566C, a 2-step compression action segment 566S and a no-load action segment, and only the engine action segment 566E operates the exhaust valve once a rotation of the cam shaft while the others operate the same twice a rotation of the cam shaft. The engine action segment 566E makes the same action with said normal cam section 561, and the 1-step air compression action segment 566C opens the exhaust valve a little before a compression and an exhaust steps of an engine action of the first set of cylinders end, to exhaust high pressure air. The 2-step compression action segment 566S opens the exhaust valve after a compression and exhaust actions of the engine start thus exhausting low pressure air. The no-load action segment 566U opens and closes the exhaust valve to blow air with overlapping the opening and closing operation of the inlet valve.

It is the most important feature of this embodiment that the action carried out by supplying the second set of cylinders with air is divided into three steps. The 1-step compression action segment 566C produces high pressure air (8–10 kg/cm$^2$ in case of a gasoline engine and 8–16 kg/cm$^2$ in case of a Diesel engine) used for operating a compressed air machine such as a cooler. The 2-step compression action segment 566S produces high pressure air similarly to the 1-step compression segment by compressing air by two steps, thus reducing the load of the first set 552 in starting the engine to smoothen the transition to an 1-step compression action. The no-load action segment 566U makes the vehicle travel only by an engine action of the first set 552 thus saving about 50% of fuel expense.

Further, high pressure air produced by the second set of cylinders is supplied to the first set as supercharging amount through a pressure adjusting valve or after used in a compressed air machine, and then the power raising of the engine action of the first set is measured, so that a compression action of the first set is carried out with sufficient driving power.

The middle portion between the engine action segment 566E and the 1-step compression action segment 566C can keep the exhaust valve closed, and therefore can be used instead of the no-load action segment 566U.

The operation of the engine 551 with the abovementioned construction and exhaust passages are described below with reference to FIG. 80.

In case of making the second set of cylinders take an air compression action with the vehicle stopping, the segments are so arranged that the inlet and outlet valves of the first set 552 is driven by the normal cam section, while the inlet valve of the second set 553 is driven by the compression action segment 565C and the outlet valve thereof is driven by the 2-step compression action segment 566S.

When chambers X, Y, Z of the first set 552 is actuated as an engine, a piston of the second set 553 connected to the same crank shaft operates, so that air is introduced through the inlet ports 526A, 526B and the inlet pipe 524 into the chambers, compressed therein substantially to 4 kg/cm$^2$, then exhausted through exhaust ports 527A, 527B and introduced through the exhaust pipe 525 and a duct 570 into a chamber C. The air introduced into the chamber C is compressed substantially to 8 kg/cm$^2$, then exhausted through an exhaust port 527C of the chamber C to be once stored in the air tank T. At that time, a 2-way magnet valve 571 is opened with a 2-way magnet valve 572 being opened and 3-way magnet valves 573, 579 being opened in the X direction.

When the turning force increases to bring the operation into a constant operation, the cam shaft 554 is displaced thereby operating the inlet and exhaust valves of the second set by means of the supercharing cam segment, and the cam shaft 555 is displaced thereby operating the exhaust valve of the second set 553 by means of the 1-step compression action segment 566C, and further the 2-way magnet valve 571 is closed, the 2-way magnet valve 572 is opened and the 3-way magnet valve 573 is opened in the Y direction.

In this state, air introduced into the chambers A, B, C is compressed at a time substantially to 8 kg/cm$^2$ and supplied into the air tank T. An air take-out pipe 574 is connected to the tank T, so that by opening the 3-way magnet valve 578 in the X direction, compressed air is supplied into a compressed-air machine 575 such as a cooler. From compresssed-air machine 575 adapted to exhaust used air through one place, used low pressure air is lead through a restoration pipe 576 and introduced into the inlet pipe (ahead of the carbureter) of the first set 552 to be used for supercharging. Preferably, a rectifier is provided on said restoration pipe 576 for rectifying intermittently discharged air. Further, though not shown, the connected portion between the restoration pipe 576 and the inlet pipe is so adapted that back blow against the sucked air is prevented by opening the top port in the direction of sucked gas flowing through the inlet pipe.

Numeral 577 indicates the pressure adjusting valve. In case of using high pressure air in the tank T directly for supercharging by opening the 3-way magnet valve 578 in the Y direction, the pressure of said air is suitably lowered by means of said valve 577.

Said tank T can contain therein 8 kgs/cm$^2$ of compressed air, and in case of air having pressure above 8 kg/cm$^2$, the pressure thereof is reduced for the purpose of its storage in the tank.

In case of making the vehicle travelling, the 2-way magnet valves 572, 580 are opened, the 2-way magnet valve 571 is closed and the 3-way magnet valves 573, 579 are opened in the Y direction. It is so arranged that the carburetor is fuelled and at the same time the inlet and exhaust valves of the first set are operated by the normal cam section while the inlet and exhaust valves of the second set are operated by the engine action segment.

Mixed gas is supplied from the carburetor 540 into all the cylinders and combusted in the chambers to become exhaust gas, and then exhausted through the exhaust port 541. In this case, the inlet pipe can be supercharged directly or through the compressed-air machine from the tank T.

When the vehicle is subject to idle rotation and cruising, it is not necessary for all the cylinders to take an engine action, but only the first set can take an engine action with the second set being in no-load operation. In such a case, the inlet and exhaust passages of the first and the second sets of the engine 551 are arranged for said air compression action, while the inlet valve of the second set is operated by the compression action segment 565C with the exhaust valve thereof operated by the no-load action segment 566U. Combusion action takes place in the chambers of the first set, but only air is blown into the chambers of the second set without either of combustion or compression action. However, such air blow takes place only in case of the 3-way magnet valve 579 being opened in the Y direction. If it is opened in the X direction no air is blown thereinto.

Further, at the time of reduction of the vehicle, the second set is made to take an air compression action using kinetic energy of the vehicle to produce compressed air substantially without consuming fuel.

In said embodiments all cylinders are adapted to take an engine action, but a part of cylinders may be adapted not to take an engine action but to take only an air compression action (including 2-step compression action) and an air motor action. Further, at the time of starting and acceleration of the vehicle, half a chambers is made to take an air motor action and the whole or a part of air used for said air motor action is used for supercharging in an engine action so as to make the vehicle travel, while during the vehicle travelling at a constant velocity half a cylinders are subject to unloading operation.

For the purpose of increasing durability of the engine, each cylinder is made to take an alternative action so that a chamber having taken an engine action is made to take a compression action with a chamber having taken a compression action made to take an engine action, every certain time, for example, every time after 40,000 km travelling of the vehicle.

Further, in a particular embodiment, by connecting a displacement compressor to an engine for travelling the vehicle, said engine is made to take only an engine action with said displacement compressor made to take an air compression action (including unloading operation) or an air motor action. In this case, the engine may have any numebr of cylinders, and the displacement compressor is selected to have a volume in correspondence with the power of said engine. As a displacement compressor, used can be an engine adapted for an air compressor.

Further, during travelling of a vehicle having thereon an engine with 4, 6, 8 or 12 cylinders, by making half of cylinders take an engine action to travel the vehicle, with making the remaining cylinders take an air compression action to store compressed air obtained thereform in the tank, said tank is cooled using air blow caused by the travelling. And the compressed air at low temperature is made to expand in the tank through an expanding valve and utitized for cooling inside of the vehicle. The exhaust air from said cooler can be used for supercharging the engine action section. In case that the tank is filled with compressed air obtained by an compression action of the engine, the compression action section is subject to unloading operation, such a changing-over being easily effected by operating a valve for controlling an exhaust valve. Consequently, it is not necessary to always rotate the engine for operating the cooler, and to provide the cooler with an air compressor. As the result, fuel and resources can be saved. This system is effective when applied to engines, especially rotary engines which consume a large amount of fuel thus tending to cause environmental pollution. According to this system exhaust gas after being used in compressed air machines and apparatus is not dispersed in the atmosphere but introduced into the engine section, so that exhaust gas noise can be prevented by the masking effect.

Further, in case that after braking the vehicle (said braking is effected by a finger-brake system) by operating the second set of cylinders as a compressor brake or an ordinaly exhaust brake the vehicle is immediately accelerated, the second set is supplied with compressed air so as to take an air motor action and then the first set is made to take an engine action. Even in this case, prevented can be bad feeling in travelling which is apt to be caused by fuel-cut in the vehicle with the convertional engine.

Usually, a supercharger is used for increasing the maximum power of an engine. However, a supercharger requires much expense, so that it is hardly used in a gasoline engine. On the contrary, according to the present invention, high pressure air obtained by an air compression action of an engine is reduced in pressure and cooled, and used for supercharging the engine section, thereby affording to lower necessary expense.

Such a mild supercharging is extremely effective and can contribute to prevention of atmosphere pollution tending to be caused at the time of increasing power of engine for starting or acceleration.

Further, in case of an engine with a supercharger, for example, a Diesel engine, the supercharger may be supplied with air at low temperature and low pressure, so that power is increased by a multiplied effect.

In case of an engine with double cam shafts as described in the first embodiment, each cam has a large overlapping in profile thereof and therefore is suitable for supercharging so that a separate means is not required to be mounted thereon for supercharging, and that frequent gear-changings are not necessary at the time of increasing power.

FIGS. 81 to 90 show the fourth embodiment of the present invention that is an engine wherein valve timing of the inlet and exhaust valves is changed so as to serve as an air-compressor and the third air port and valve are provided between the inlet and exhaust valves for exhausting the high pressure residual air during the engine effecting compressor action, and further high pressure air is charged through the third air port to rotate the engine per se normally or reversely. This embodiment is particularly useful for vessel engines.

Numeral 582 indicates a residual gas exhaust port to be used in case of making the engine take an air compression action, in which port provided is a valve 583 for opening and closing said residual gas exhaust port 582.

In a manifold 584 that is connected to said port 582, one branch 585 is connected to either free air or a supercharger, while the other branch 586 to a high pressure tank that contains a compressed air of approximately 20 to 50 kg/cm$^2$ (possibly 8–10 kg/cm$^2$). On the pipe 586 provided are an opening and closing valve 587 for supplying high pressure air from the tank T to the exhaust port 582, and a check valve 588 for supplying high pressure air from the exhaust port 582 to the tank T. The compressed air in said tank has been obtained by the compressor action of the engine, which can be alternatively supplied from exterior. A three-way magnet valve 589 is provided at the branching point of the manifold 584, which switches the air flow between branches 585 and 586.

FIGS. 82 to 84 respectively show a driving cams 91 for the valve 583, the cam comprising a cylindrical segment 592 for engine action which does not drive a tappet, a normal rotation starting segment 593 which drives at the time approximately corresponding to the starting of the explosion stroke in the engine action, a residual air exhaust segment 594 which drives for exhausting the residual air during the engine effecting normally rotating compressor action, a reverse rotation starting segment 595 which drives at the time approximately corresponding to the end of compression stroke during the engine effecting normal engine action, and a residual air exhaust segment 596 which opens during the engine effecting reversely rotating compressor action.

As a modification of the driving cam 591, the residual air exhaust portions 594, 596 may, as shown in FIG. 82 by imaginary lines, each form an air motor portion, shaped substantially similar to the sharting segments, at a phase position of 180° between each residual air exhaust portion (lower portion of imaginary lines) and each starting segment, so that when the starting segment is operated to air start, the tappets are moved to the air motor portion, thus effecting the air revolution of the engine.

Said 3-way electromagnetic valve 589 opens to the direction of the arrow X to communicate the pipe 586 with the air port 582 only when the tappet of the valve 583 is in contact with the normal rotation starting segment 593 and the reverse rotation starting segment 595, while otherwise opens to the direction of the arrow Y.

The cam 601 for intake valve comprises, as shown in FIGS. 85 to 87, a normally rotating engine action segment 602, a normally rotating compressor action segment 603 which drives the tappet at the time approximately corresponding to air-intake and explosion strokes in the engine action, a reversely rotating engine action segment 604 which opens the valve in the exhaustion stroke in normal rotation of the engine, a reversely rotating compressor action segment 605 which drives the tappet at the time approximately corresponding to exhaustion and compression strokes in normal rotation of the engine (namely air-intake and explosion strokes in reverse rotation of the engine), and a cylindrical segment 606 connecting the segment 602 to the segment 604.

The cam 611 for exhaust valve is represented in FIGS. 88 to 90 in the same shape as the cam 601 for inlet valve but is of course different therefrom in the time to start the tappet. The cam 611 comprises a normally rotating engine action segment 612, a normally rotating compressor action segment 612 which drives the tappet at the time approximately corresponding to exhaustion and compression strokes in engine action, a reversely rotating engine action segment 614 which drives the tappet at the time approximately corresponding to inlet strokes in normal rotation of the engine, a reversely rotating compressor action segment 615 which drives the tappet at the time approximately corresponding to air-intake and explosion strokes in normal rotation of the engine (namely exhaustion and compression strokes in reverse rotation of the engine), and a cylindrical segment 616 connecting the segment 612 and the segment 614.

In the cams 591, 601, 611 as shown in FIGS. 82 85 and 88 the segments for reverse rotation and the segments for normal rotation are represented in the condition displaced by 180° with each other and each segments exist in the approximately symmetrical position with respect to the center line connecting the top dead centers as shown in FIGS. 83, 84, 86, 87 and 89. Further in the drawings, the first, second, third and fourth quadrants are corresponding respectively, to the intake, exhaustion, explosion and compression strokes, and the imaginary lines represent compressor action segments.

The cam shaft 599 having the driving cam 591 for the valve 583 is provided separately from the cam shaft 609 having the cam 601 for intake valve and the cam 611 for exhaust valve, each of the cam shafts being changed-over by sliding in five stages through hydraulic or electric means for changing-over the shafts.

Upon starting of normal rotation of the engine, the tappet of each of the valves is brought in contact with the starting segment 593, and the normally rotating engine action segment 602, 612.

As soon as the cam is moved to bring the starting segment in contact with the tappet, high pressure air of about 20–50 kg/cm² (or 8–16 kg/cm²) flows into the air chamber through the air port 582 and the engine is started. Then by moving the cam 591 reversely to switch the tappet so as to be in contact with the cylindrical segment 592, the engine effects usual engine action.

In order to make the engine act as a normally rotating compressor the tappet is brought in contact with the residual air exhaust segment 594 and the compressor action segment 603, 613 thus the four cycle engine serving as a two cycle air-compressor, and residual air at the time is discharged from the air port 582 through the pipe 585.

In case of rotating the engine reversely, the normally rotating engine is changed once into normally rotating compressor action and braked, and after the engine stops the cam shaft 599, 609 is moved to bring the tappet in contact with the reverse rotation starting segment 595 and the reversely rotating engine action sigment 604, 614.

Also in case of returning the reversely rotating engine to normally rotate, the engine is once made to serve as a reversely rotating compressor.

In the abovementioned fourth embodiment, in case of an engine with five or more cylindrrs, an air port valve 583 of any one of the cylinders is opened when the cam shaft 599 is moved and set so as to work the air port 583 by means of the normal rotation starting segment 593, so that the chamber can be supplied with high pressure air, thus easily affording to start the engine with air.

However, in case of an engine with four or less cylinders, and especially with a single cylinder, a piston sometimes stops at the top or bottom dead center, thus causing an air port valve to be closed.

Therefore, a decompression device (not shown) is provided for opening such a closed valve so as to make the engine to take an air motor action. In this case, the decompression device is not a device for pressure reduction but for pushing down a valve stem of the inlet valve to introduce air and for momentarily opening the air port valve of the engine set for an air motor action so as to compulsorily introducing high pressure air into a chamber thus rotating a crank shaft. In case that said crank shaft rotates in the positive direction, the air port valve can take a normal opening and closing operation thereby immediately working as an air motor. On the contrary, in case that said crank shaft rotates in the reverse direction, said air port valve is opened during the piston being raised and high pressure air injected through an inlet port causes the piston to be lowered, so that the rotation of the crank shaft turns into the positive direction. Also in case that the engine is set for reversely rotating operation, the engine if rotates undesirably in the normal direction will return to reverse rotation since valve timing of the air port valve is disturbed.

In case of an engine with two or four cylinders, a piston of any one of said cylinders stops at the top dead point even when the piston stops at a dead point, a crank shaft can be rotated a little. But in case of an engine with a single cylinder, a piston possibly stops at the lower dead point. Therefore, in case of an engine with a single cylinder, said engine is made to have such a construction that a little volume of low pressure air can be injected through an air exhaust port of a crank chamber. And there, a decompression device is operated after a piston is once displaced to the upper dead point.

The advantages of using an engine with the above-mentioned construction in a ship are that a strong braking of the engine can be achieved in a very short time by an air compression action of the engine, that the compression action of the engine is influenced only by the compression ratio thereof and prevented to become destructive by a cushioning effect of air, and that in case of further increasing back pressure exerted on a piston, high pressure air compressed by two steps can be used for increasing back pressure for a compression action of each cylinder, thus affording making the engine rotation close to zero. In such a case, for example, the first set of cylinders are changed over into the state for reversely rotating engine action and at the same time other cylinders, for example, the second set of cylinders, are supplied with compressed air and operated as a reversely rotating air motor, and then brought into a high speed rotation at a stroke so as to take a reversely rotating engine action. And then, the second set of cylinders can be made to take a reversely rotating engine action similarly to the first set. Such a variety of applications of an engine, which have been impossible in the conventional engine, can be obtained according to the present invention.

After the engine is actuated and rotated by air, consumed compressed air has to be supplemented into the tank. For this purpose, compressed air can be obtained by operating the second set of cylinders as an air compressor. In this case, however, compressed air which is residual air in the second set has only to be used for superchargint the first set.

According to the present invention, compressed air can be obtained by a variety of combinations of actions of plural cylinders, so that a compressor provided on the conventional engine can be dispensed with.

In case that a compressor is required for double safety, attached to the main engine can be a normally and reversely rotatable combination engine and air compressor apparatus with a single or a plurality of cylinders as a starter, which has a suitable torque. Also for this purpose, a second-hand engine can be used after reconditioning in case of a low frequency of applications. In particular, the reconditioning expense can be lowered by utilizing a gasoline engine with double overhead cam shafts.

Further, also in such an engine with double cam shafts as described in said first embodiment, an engine action and an air compression action can be changed-over to each other by providing cams each for an engine action and for an air compression action on a cam shaft, and sliding said cam shaft similarly to the third embodiment. And with such an arrangement, even an engine with a small volume of cylinders can be easily operated as an air compressor, and at the same time the engine can be easily subject to an interlocking operation with the spring force adjusting means which has been already suggested by the inventor.

In a method according to the present invention for driving a vehicle driven by an internal combustion engine having a plurality of compression chambers divided into a first set and a second set, each of said sets can be made to take each of an engine action (E), a compression action (C), an unloaded state (U) and a supercharging action, whereby operations by the following combinations shown in the list can be achieved.

Further, though not shown in the list, when the engine is in such a condition that the first set is taking a compression action or in an unloaded state and the second set is taking a compression action, the vehicle during travelling can be suddenly stopped by supplying high pressure air to one set or two sets taking a compression action, or the vehicle at a stop can be air started also by supplying high pressure air to one set or two sets taking a compression action, and further the vehicle can be made to travel by operating the engine as an air motor with maintaining high pressure air supply.

| first set | second set | operation condition |
|---|---|---|
| E | U | start, low speed travel- |
| S | U | ling idling |
| E | E | cruising |
| S | E | |
| E | U | reduction of fuel consump- |
| S | U | tion during cruising |
| S | S | high speed travelling acceleration |
| E | U | low deceleration |
| E | C | |
| U | U | high deceleration |
| U | C | |
| C | C | |
| E | U | temporary stop |
| E | C | |
| S | C | |

The main effects of the present invention may be summarized as follows:
(1) Simultaneously with the control operation of a motor vehicle, it is possible to compress air in the compression chambers of the engine and consequently a control power is conveyed onto the engine as well as the motor vehicle so that kinetic energy possessed by the engine and the vehicle itself can be diverted effectively.

(2) The engine, being adapted to do a compression action, may play roles as a motor, an air compressor and an engine brake.
(3) The engine, as an engine brake, works more efficiently than a conventional engine brake and plays no role in environmental pollution.
(4) Referring to the engine having a plurality of compression chambers, it is possible to use some of the chambers as an air compressor and others as an engine so that compressed air can be obtained successively from the air compressor: there is not necessity to install conventionally an air compressor in addition to an engine.
(5) The engine according to the invention is of utility value since compressed air obtained by an engine which is worked as an air compressor may be employed for a means for producing siren, a supercharger, a vacuum device, a compressed air brake mechanism and so on.
(6) A load-diminishing mechanism provided on a camshaft diminishes easily and readily the load of an engine at the time of starting the engine, at the time of turning the engine into an air compressor and at the time when there is no need for compressed air.
(7) The auxiliary valve-actuating mechanism provided can ensure an exact opening-closing action of valves even when the engine is converted into an air compressor, and can improve the followability of the valve action at the time of high rotation of the engine, and can prevent the valves from surging, bouncing and jumping.
(8) As the location of a tappet which is in contact with the inclined cam can be moved to change a valve stroke, suction and exhaustion of high efficiency can be achieved when the engine is worked at a high-speed rotation.
(9) By introducing through an inlet port into chambers compressed air obtained by an air compression action of an engine, the engine can serve as an air motor rotating in the positive direction, thus affording not only to actuate the engine but to make the vehicle run in a short distance.
(10) By introducing through a newly provided residual air exhaust port into chambers compressed air obtained by an air compression action of an engine, the engine can easily serve as an air motor.
(11) By providing a means for adjusting spring force, valves are operated by suitable spring forces each for all actions such as an engine action a compression action and an air motor action thus ensuring opening and closing the valves, and spring forces are reduced at the time of cam change-over thus facilitating the displacement of cams.
(12) A quick start-up with large torque can be expected with greater driver's handling convenience, which is more convenient than the slow start-up available with the electric cell motor.
(13) The engine can be stopped at stays on a jammed road or at signal stops that are very often encountered in city and restarted immediately for driving the vehicle. Thus, the pollution with exhaust will be reduced and the fuel consumption will be lowered to contribute to the energy saving.
(14) The apparatus involves the residual-air exhaust port and its valve, so that it can serve as an air-charging-efficiency improving means at the same time.
(15) The compressed air can be continuously injected into the engine to drive the vehicle at a little distance, which will be useful for shifting the vehicle to the roadside on gasoline shortage, escaping from the area filled with inflammable gas or passing across the river, when the engine doesn't work.

(16) To avoid the engine stop in summer which is often encountered with the vehicle of gasoline engine to which anti-air-pollution measures are applied, the apparatus is provided in combination with a cell motor to give a duplicate start-up system.

(17) The compressed air to be supplied to start up and run the engine can be obtained by the compressor action of the engine, so that the complete release of compressed air hardly occurs, assuring the reliable operation of the apparatus.

(18) Charging with a compressed air source can be accomplished within a very short time in comparison with charging the excessively discharged battery.

(19) As the suction device is tightly suckedly attached to the travelling surface, strong braking is achieved by friction between the suction device and the travelling surface.

(20) Due to sucked attachment of the suction device onto the travelling surface, the rear portion of the vehicle is lowered down thus strengthening the braking force by friction of tyres, and further preventing nose-dive and lateral slipping resulting from the displacement of the center of gravity when a dive brake of the vehicle is put on.

(21) By using the apparatus in combination with a compression brake, surprising braking force can be obtained and at the same time it is very economical that compressed air obtained by the compression brake can be used in this apparatus.

(22) The double cam shaft engine can serve as an air compressor easily by changing the rotation angle of the cam shaft for exhaust valve and rotating the two cam shafts in the same velocity with the crank shaft.

(23) The engine can be worked as an air compressor simply and easily by providing a constant position electromagnetic clutch on the cam shaft on the engine and an automatic exhaust valve on the cylinder head.

(24) During the vehicle's running, compressed air can be obtained by making a part or the whole of the engine serve as an air-compressor upon reduction of velocity.

(25) During the vehicle stopping, compressed air can be obtained continuously by making a part of the engine serve as an air-compressor while making the other part serve as an engine.

(26) Even an engine with four, six or eight cylinders or with an uneven number of cylinders can make a half of the cylinders serve as an air-compressor or do no-load operation during the vehicle's running, and thereby fuel consumption may be reduced and air pollution may be prevented.

(27) Since the plural cylinders are divided into two parts, one for an engine and the other for an air-compressor, so that the air-compressor part compresses the air in two stages into a predetermined pressure upon starting of the engine part, compressive load is so small that the engine part can be easily started.

(28) Compressed air directly supplied from the tank and compressed air used in the compressed air machine are extremely low in temperature and are effective in utility as they are used for supercharging of the engine part, whereby even if the number of cylinders of the engine part is the same with that of the air-compressor part, driving power of the engine part is increased and the air-compressor part can be well started.

(29) Since air exhausted from the compressed air machine is not discharged into the atmosphere but led into the engine part through a pipe, the compressed air machine is avoided from emitting noises.

(30) By supplying the air chamber with high pressure air through the third air port newly provided, rapid starting of the engine with large torque can be effected, which increases effectiveness of the driver's operation.

(31) Since upon conversion of rotating direction the engine is once braked, serving as an air-compressor, the rotating direction can be converted rapidly and kinetic energy of the engine can be used effectively.

(32) Normal and reverse conversion of rotation of the engine can be effected easily and simply by providing a driving cam for reverse rotation on each of the inlet valve, the exhaust valve and the air port valve for exhausting residual air, and which mechanism is applicable to every engine, large-sized or small-sized.

(33) Even as engine with four or less cylinders or a single cylinder can be started in normal or reverse rotation by providing decomp means.

What I claim is:

1. A method for driving a vehicle driven by an internal combustion engine having a plurality of compression chambers divided into a first set and a second set, each of said sets being able to be separately operated and to be convertible in operation so as to take a two-step compression action, comprising starting the engine by making at least said first set take an engine action, making the vehicle run with said first and second sets taking an engine action, putting said second set into an unloaded state during the vehicle running and controlling the engine by making at least said second set take a two-step compression action.

2. A method for driving a vehicle as claimed in claim 1, comprising starting the engine by making said first set take an engine action and by putting said second set into unloaded state.

3. A method for driving a vehicle as claimed in claim 1, comprising controlling the engine by converting said first and second sets from an engine action to a two-step compression action.

4. A method for driving a vehicle as claimed in claim 1, comprising controlling the vehicle by converting said second set from unloaded state to taking a two-step compression action during the vehicle running.

5. A method for driving a vehicle as claimed in claim 1, comprising increasing speed of the vehicle by converting said second set from unloaded state to taking an engine action during the vehicle running.

6. A method for driving a vehicle driven by an internal combustion engine having a plurality of compression chambers divided into a first set and a second set, each of sets being able to be separately operated and to be convertible in operation so as to take a two-step compression action, comprising starting the engine by making at least first set take an engine action, idling the engine by keeping the engine action of said first set and by putting said second set into an unloaded state, making the vehicle run by making said first and second sets take an engine action, making the vehicle run by putting said second set into an unloaded state, controlling the engine by making at least said second set take a two-step compression action and supercharging at least one set taking an engine action.

7. A method for driving a vehicle as claimed in claim 6, comprising supercharging said first set when putting said first set into an engine action and putting said second set into unloaded state.

8. A method for driving a vehicle as claimed in claim 6, comprising idling the engine by converting said first set from a two-step compression action to an engine action and by converting said second set from a two-step compression action into an unloaded state.

9. A method for driving a vehicle driven by an internal combustion engine having a plurality of compression chambers divided into a first set and a second set, each of said sets being able to be separately operated and to be convertible in operation so as to take a compression action, comprising starting the engine to operate as an air motor by supplying high pressure air to each chamber of at least the first set, making the vehicle travel by maintaining high pressure air supply to at least the first set, making the vehicle travel by making the first and second sets take an engine action and controlling the engine by making at least the second set take a two-step compression action.

* * * * *